(12) United States Patent
Vivona et al.

(10) Patent No.: US 12,039,012 B2
(45) Date of Patent: Jul. 16, 2024

(54) SYSTEMS AND METHODS FOR HETEROGENEOUS FEDERATED TRANSFER LEARNING

(71) Applicant: Sharecare AI, Inc., Palo Alto, CA (US)

(72) Inventors: Salvatore Giuliano Vivona, Toronto (CA); Marina Titova, Menlo Park, CA (US); Srivatsa Akshay Sharma, Santa Clara, CA (US); Gabriel Gabra Zaccak, Cambridge, MA (US)

(73) Assignee: Sharecare AI, Inc., Palo Alto, CA (US)

( * ) Notice: Subject to any disclaimer, the term of this patent is extended or adjusted under 35 U.S.C. 154(b) by 356 days.

(21) Appl. No.: 17/508,985

(22) Filed: Oct. 23, 2021

(65) Prior Publication Data

US 2022/0129706 A1 Apr. 28, 2022

Related U.S. Application Data

(60) Provisional application No. 63/104,794, filed on Oct. 23, 2020.

(51) Int. Cl.
*G06F 18/214* (2023.01)
*G06F 18/213* (2023.01)
(Continued)

(52) U.S. Cl.
CPC ........ *G06F 18/2155* (2023.01); *G06F 18/213* (2023.01); *G06F 18/24* (2023.01); *G06N 5/04* (2013.01)

(58) Field of Classification Search
CPC .... G06F 18/2155; G06F 18/213; G06F 18/24; G06N 5/04; G06N 3/045; G06N 3/047; G06N 3/08; G06V 10/95; G06V 10/82
See application file for complete search history.

(56) References Cited

U.S. PATENT DOCUMENTS 5,920,644 A 7/1999 Fujimoto et al.
8,275,175 B2 9/2012 Baltatu et al.
(Continued)

FOREIGN PATENT DOCUMENTS

CN 111680798 A 9/2020
EP 2854059 A2 4/2015
(Continued)

OTHER PUBLICATIONS

Yang et al., ("A Secure Federated Transfer Learning Framework", Digital Object Identifier 10.1109/MIS.2020.2988525, IEEE, Date of publication Apr. 22, 2020) (Year: 2020).*
(Continued)

*Primary Examiner* — Amara Abdi
(74) *Attorney, Agent, or Firm* — HAYNES BEFFEL & WOLFELD LLP; Ernest J. Beffel, Jr.; Korbin S Van Dyke

(57) ABSTRACT

The technology disclosed relates to a system and method of exporting learned features between federated endpoints whose learning is confined to respective training datasets. The system includes logic to access a first training dataset to train a first federated endpoint and a second training dataset to train a second federated endpoint. The first and second training datasets have first and second sample sets that share one or more shared sample features. The shared sample features are common between the first and second sample sets. The system includes logic to train a first generator on the first federated endpoint. The system includes logic to use the first trained generator for a second inference on a second performance task executed on the second federated endpoint.

20 Claims, 45 Drawing Sheets

(51) Int. Cl.
*G06F 18/24* (2023.01)
*G06N 5/04* (2023.01)

(56) References Cited

U.S. PATENT DOCUMENTS

| | | | |
|---|---|---|---|
| 8,543,428 | B1 | 9/2013 | Jones, III et al. |
| 9,147,133 | B2 | 9/2015 | Fujimura |
| 9,839,376 | B1 | 12/2017 | Ross et al. |
| 10,423,773 | B1 | 9/2019 | Huang |
| 10,938,852 | B1 | 3/2021 | Streit |
| 11,145,421 | B2 | 10/2021 | De Brouwer et al. |
| 11,177,960 | B2 | 11/2021 | Sly et al. |
| 2006/0206724 | A1 | 9/2006 | Schaufele et al. |
| 2011/0172499 | A1 | 7/2011 | Simons-Nikolova et al. |
| 2011/0291834 | A1 | 12/2011 | Boldyrev et al. |
| 2012/0162404 | A1 | 6/2012 | Howell et al. |
| 2013/0046761 | A1 | 2/2013 | Soderberg et al. |
| 2013/0266195 | A1 | 10/2013 | Shiell et al. |
| 2014/0089954 | A1 | 3/2014 | Sampathkumaran et al. |
| 2014/0115515 | A1 | 4/2014 | Adams et al. |
| 2015/0178590 | A1 | 6/2015 | Noma et al. |
| 2015/0213207 | A1 | 7/2015 | Amarasingham et al. |
| 2015/0254890 | A1 | 9/2015 | Noma et al. |
| 2015/0324686 | A1 | 11/2015 | Julian et al. |
| 2015/0339523 | A1 | 11/2015 | Tsunematsu |
| 2015/0363709 | A1 | 12/2015 | Kamei et al. |
| 2016/0253549 | A1 | 9/2016 | Ramic |
| 2016/0328253 | A1 | 11/2016 | Majumdar |
| 2017/0011280 | A1 | 1/2017 | Soldevila et al. |
| 2017/0206691 | A1 | 7/2017 | Harrises et al. |
| 2018/0018590 | A1 | 1/2018 | Szeto et al. |
| 2018/0289334 | A1 | 10/2018 | De Brouwer et al. |
| 2018/0330061 | A1 | 11/2018 | Amiel et al. |
| 2019/0082211 | A1 | 3/2019 | Vats |
| 2019/0244108 | A1 | 8/2019 | Meyerson et al. |
| 2019/0244683 | A1 | 8/2019 | Francois |
| 2019/0319977 | A1 | 10/2019 | Gottschlich et al. |
| 2019/0354846 | A1 | 11/2019 | Mellempudi et al. |
| 2020/0027022 | A1 | 1/2020 | Jha et al. |
| 2020/0082062 | A1 | 3/2020 | Mequanint et al. |
| 2020/0098446 | A1* | 3/2020 | Trooskens .......... G06F 16/2255 |
| 2020/0105380 | A1 | 4/2020 | Ennist et al. |
| 2020/0110968 | A1 | 4/2020 | Onodera |
| 2020/0152330 | A1 | 5/2020 | Anushiravani et al. |
| 2020/0153843 | A1* | 5/2020 | Aksela .................. G06N 20/00 |
| 2020/0221191 | A1 | 7/2020 | Baughman et al. |
| 2020/0251213 | A1 | 8/2020 | Tran et al. |
| 2020/0293887 | A1* | 9/2020 | De Brouwer .......... G06N 3/084 |
| 2020/0327252 | A1* | 10/2020 | McFall .................. G06F 21/78 |
| 2020/0342987 | A1 | 10/2020 | De Brouwer et al. |
| 2020/0351344 | A1 | 11/2020 | Das Gupta et al. |
| 2020/0394552 | A1* | 12/2020 | Ganapavarapu .......... H04L 9/50 |
| 2020/0410614 | A1 | 12/2020 | Bonageri et al. |
| 2020/0411199 | A1 | 12/2020 | Shrager et al. |
| 2021/0007603 | A1 | 1/2021 | Huddleston et al. |
| 2021/0057106 | A1 | 2/2021 | Chin et al. |
| 2021/0073677 | A1* | 3/2021 | Peterson ................ G06N 20/00 |
| 2021/0110417 | A1 | 4/2021 | Lade |
| 2021/0125732 | A1 | 4/2021 | Patel et al. |
| 2021/0141896 | A1 | 5/2021 | Streit |
| 2021/0312336 | A1* | 10/2021 | Sinn ....................... G06N 3/084 |
| 2021/0326422 | A1 | 10/2021 | Sly et al. |
| 2021/0326433 | A1 | 10/2021 | Sly et al. |
| 2021/0328801 | A1 | 10/2021 | Sly et al. |
| 2022/0012637 | A1* | 1/2022 | Rezazadegan Tavakoli ................ G06N 3/088 |
| 2022/0078626 | A1* | 3/2022 | Doshi ..................... G06N 3/088 |
| 2022/0188659 | A1 | 6/2022 | Krasnoslobodtsev et al. |
| 2022/0414464 | A1 | 12/2022 | Krishnaswamy et al. |

FOREIGN PATENT DOCUMENTS

| | | | |
|---|---|---|---|
| JP | 2020149656 | * 9/2020 | ............ G06Q 10/04 |
| JP | 2020149656 A | 9/2020 | |
| WO | 2014105752 A1 | 7/2014 | |
| WO | 2019018732 A1 | 1/2019 | |
| WO | 2021158313 A1 | 8/2021 | |

OTHER PUBLICATIONS

Chen et al., ("FedHealth: A Federated Transfer Learning Framework for Wearable Healthcare, IEEE, Sep. 3, 2020") (Year: 2020).*
WWeBank, Federated Learning White Paper V1.0, dated Sep. 2018, 22 pages. (Year: 2018).*
Xu et al., Modeling Tabular Data Using Conditional GAN, 33rd Conference on Neural Information Processing Systems (NeurIPS 2019), Vancouver, Canada, dated Oct. 28, 2019, 15 pages. [arXiv:1907.00503v2].
Lin et al., PacGAN: The power of two samples in generative adversarial networks, arXiv, dated Nov. 2, 2018, 49 pages. [arXiv:1712.04086v3].
Xie et al., On Scalable and Efficient Computation of Large Scale Optimal Transport, arXiv, dated Jun. 24, 2019, 21 pages. [arXiv:1905.00158v3].
Cuturi, Sinkhorn Distances: Lightspeed Computation of Optimal Transportation Distances, Advances in Neural Information Processing Systems 26, pp. 2292-2300, dated Jun. 4, 2013, 13 p. [https://doi.org/10.48550/arXiv.1306.0895].
Bodonyi et al. Efficient object location determination and error analysis based on barycentric coordinates, Visual Computing for Industry, Biomedicine, and Art, vol. 3, No. 18 dated 2020, 7 pages, available at 140 vciba.springeropen.com/articles/10.1186/s42492-020-00052-y«.
Hughes et al., "Computer Graphics: Principles and Practice", Third Edition, Addison-Wesley, 2014 Pearson Education, Inc., 1262 pages.
Dwork, et al., "The Algorithmic Foundations of Differential Privacy", 2014, 281 pages.
McMahan, et. al., "A General Approach to Adding Differential Privacy to Iterative Training Procedures", Mar. 4, 2019, 8 pages.
Bonawitz, et. al., "Practical Secure Aggregation for Federated Learning on User Held Data", Nov. 14, 2016, 5 pages.
Thakkar, et. al., "Differentially Private Learning with Adaptive Clipping", May 9, 2019, 9 pages.
Abadi, et. al., "Deep Learning with Differential Privacy", Oct. 24, 2016, 14 pages.
Bonawitz, et. al., "Towards Federated Learning at Scale: System Design", Mar. 22, 2019, 15 pages.
McMahan, et. al., "Communication Efficient Learning of Deep Networks from Decentralized Data", Feb. 28, 2017, 11 pages.
WeBank, Federated Learning White Paper V1.0, dated Sep. 2018, 22 pages.
Anonymous, Differential privacy, Wikipedia, retrieved on Apr. 4, 2022, 12 pages. Retrieved from the internet [URL: https://en.wikipedia.org/wiki/Differential_privacy#%CE%B5-differentially_private_mechanisms ].
Abadi et al., Deep Learning with Differential Privacy, Carnegie Mellon University—Fall 2016, 53 pages.
Ardagna et al., "Generalized nash equilibria for the service provisioning problem in cloud systems", IEEE Transactions on Services Computing, vol. 6, No. 4, Oct.-Dec. 2013, pp. 429-442.
Zhao et al., "A cloud computing security solution based on fully homomorphic encryption", In 16th international conference on advanced communication technology, Feb. 2014, pp. 485-488.
PCT/US2021/045725—International Search Report and Written Opinion, dated Nov. 26, 2021, 17 pages.
Goyal, Introduction to Cryptography, Lecture 23—Secure Computation II, dated Apr. 27, 2018, 6 pages.
PCT/US2021/014785—International Search Report and Written Opinion dated May 3, 2021, 14 pgs.
Thakore, Spark Accelerated Genomics Processing, doc.ai, dated May 7, 2019, 17 pages.
PCT/US2020/022200 International Preliminary Report on Patentability, dated Sep. 23, 2021, 10 pages.
Kocabey, Enes, et al., "Face to BMI Using Computer Vision to Infer Body Mass Index on Social Media", 2017, 4 pages.

(56) References Cited

OTHER PUBLICATIONS

Wen, Lingyun, et al., "A computational approach to body mass index prediction from face images", Feb. 9, 2013, 9 pages.
Parkhi, Omkar M., et al., "Deep Face Recognition", 2015, 12 pages.
Parkhi, Omkar M., et. al., Visual Geometry Group, 4 pages, [Retrived on Apr. 18, 2021], Retrieved from the Internet < URL: https://www.robots.ox.ac.uk/~vgg/software/vgg_face/>.
Wikipedia, "Diffie-Hellman key exchange", 12 pages [Retrieved on Apr. 18, 2021], Retrieved from the Internet < URL: https://en.wikipedia.org/wiki/Diffie-Hellman_key_exchange>.
WhatIs.com, "What is Diffie-Hellman Key Exchange?", Mar. 2019, 5 pages, [Retrieved on Apr. 18, 2021], Retrieved from the Internet < URL: https://searchsecurity.techtarget.com/definition/Diffie-Hellman-key-exchange>.
Kallam, Sivanagaswathi, "Diffie-Hellman: Key Exchange and Public Key Cryptosystems", Sep. 30, 2015, 27 pages.
Xie, Renjie et al., "A Deep Information-theoretic Framework for Robust Biometric Recognition", Feb. 23, 2019, 7 pages.
"Diffie-Hellman Key Exchange", 1 page, [Retrived on Mar. 18, 2021], Retrieved from the Internet < URL: https://i.stack.imgur.com/AEx0X.png>.
Abozaid Anter et al, "Multimodal biometric scheme for human authentication technique based on voice and face recognition fusion", Multimedia Tools and Applications, Kluwer Academic Publishers, Boston, US, vol. 78, No. 12, Dec. 15, 2018 (Dec. 15, 2018), pages.
Suwon Shon et al, "Noise-tolerant Audio-visual Online Person Verification using an Attention-based Neural Network Fusion", arxiv.org, Cornell University Library, 201 Olin Library Cornell University Ithaca, NY 14853, Nov. 27, 2018 (Nov. 27, 2018).
Marras Mirko et al, "Deep Multi-biometric Fusion for Audio-Visual User Re-Identification and Verification", Jan. 25, 2020 (Jan. 25, 2020), Advances in Intelligent Data Analysis XIX; [Lecture Notes in Computer Science; Lect.Notes Computer], Springer International Publishing, Cham, pp. 136-157,.
Oloyede Muhtahi R O. et al, "Unimodal and Multimodal Biometric Sensing Systems—A Review", IEEE Access, vol. 4, Sep. 16, 2016 (Sep. 16, 2016), pp. 7532-7555.
PCT/US2021/028470 Partial Search Report dated Jul. 23, 2021, 12 pages.
PCT/US2020/045018—International Search Report and Written Opinion dated Dec. 14, 2020, 17 pages.
PCT/US2020/062906—International Search Report and Written Opinion dated Apr. 8, 2021, 10 pages.
Bertoldi et al, "QueryOR: a comprehensive web platform for genetic variant analysis and prioritization", BMC Bioinformatics, Biomed Central Ltd., London, UK, vol. 18, No. 1, Apr. 28, 2017, pp. 1-11, XP021244576, DOI: 10.1186/S12859-017-1654-4.
PCT/US2021/028470 International Search Report and Written Opinion, dated Sep. 13, 2021, 17 pages.
PCT/US2020/045018—International Preliminary Report on Patentability, dated Feb. 17, 2022, 11 pages.
PCT/US2021/028470 International Preliminary Report on Patentability, dated Nov. 3, 2022, 12 pages.
Shi et al., "Robust Head Detection in Collaborative Learning Environments Using AM-FM Representations," 2018 IEEE Southwest Symposium on Image Analysis and Interpretation (SSIAI), 2018, pp. 1-4.
Fiume—"System for Interpretation of Personal Genomes," Jan. 1, 2015, XP055494359, ISBN: 978-1-339-35927-4, retrieved from the Internet: URL: https://tspace.library.utoronto.ca/bitstream/1807/69278/3/ Fiume_Marc-201506_PhD_thesis.pdf.

* cited by examiner

SYSTEMS AND METHODS FOR HETEROGENEOUS FEDERATED TRANSFER LEARNING

PRIORITY APPLICATION

This application claims the benefit of U.S. patent application Ser. No. 63/104,794, entitled "HETEROGENEOUS TRANSFER LEARNING FOR CLOUD," filed Oct. 23, 2020. The provisional application is incorporated by reference for all purposes.

INCORPORATIONS

The following materials are incorporated by reference as if fully set forth herein:

U.S. Provisional Patent Application No. 62/883,070, titled, "ACCELERATED PROCESSING OF GENOMIC DATA AND STREAMLINED VISUALIZATION OF GENOMIC INSIGHTS," filed Aug. 5, 2019;

U.S. patent application Ser. No. 16/985,183, titled, "ACCELERATED PROCESSING OF GENOMIC DATA AND STREAMLINED VISUALIZATION OF GENOMIC INSIGHTS," filed Aug. 4, 2020;

U.S. Provisional Patent Application No. 62/734,840, titled, "HASH-BASED EFFICIENT COMPARISON OF SEQUENCING RESULTS," filed Sep. 21, 2018;

U.S. Provisional Patent Application No. 62/734,872, titled, "BIN-SPECIFIC AND HASH-BASED EFFICIENT COMPARISON OF SEQUENCING RESULTS," filed Sep. 21, 2018;

U.S. Provisional Patent Application No. 62/734,895, titled, "ORDINAL POSITION-SPECIFIC AND HASH-BASED EFFICIENT COMPARISON OF SEQUENCING RESULTS," filed Sep. 21, 2018;

U.S. patent application Ser. No. 16/575,276, titled, "HASH-BASED EFFICIENT COMPARISON OF SEQUENCING RESULTS," filed Sep. 18, 2019;

U.S. patent application Ser. No. 16/575,277, titled, "BIN-SPECIFIC AND HASH-BASED EFFICIENT COMPARISON OF SEQUENCING RESULTS," filed Sep. 18, 2019;

U.S. patent application Ser. No. 16/575,278, titled, "ORDINAL POSITION-SPECIFIC AND HASH-BASED EFFICIENT COMPARISON OF SEQUENCING RESULTS," filed Sep. 18, 2019;

U.S. Provisional Patent Application No. 62/942,644, titled, "SYSTEMS AND METHODS OF TRAINING PROCESSING ENGINES," filed Dec. 2, 2019;

U.S. patent application Ser. No. 17/109,118, titled, "SYSTEMS AND METHODS OF TRAINING PROCESSING ENGINES," filed Dec. 1, 2020;

U.S. Provisional Patent Application No. 62/964,586, titled, "SYSTEM AND METHOD WITH FEDERATED LEARNING MODEL FOR MEDICAL RESEARCH APPLICATIONS," filed Jan. 22, 2020;

U.S. patent application Ser. No. 17/155,078, titled, "SYSTEM AND METHOD WITH FEDERATED LEARNING MODEL FOR MEDICAL RESEARCH APPLICATIONS," filed Jan. 21, 2021;

U.S. patent application Ser. No. 17/006,743, titled, "ARTIFICIAL MEMORY FOR USE IN COGNITIVE BEHAVIORAL THERAPY CHATBOT," filed Aug. 28, 2020;

U.S. patent application Ser. No. 17/006,749, titled, "SYSTEMS AND METHODS FOR TANGENTIAL CONVERSATIONS IN A COGNITIVE BEHAVIORAL THERAPY CHATBOT," filed Aug. 28, 2020;

U.S. Provisional Patent Application No. 62/975,177, titled, "ARTIFICIAL INTELLIGENCE-BASED DRUG ADHERENCE MANAGEMENT AND PHARMACOVIGILANCE," filed Feb. 11, 2020;

U.S. patent application Ser. No. 17/174,323, titled, "ARTIFICIAL INTELLIGENCE-BASED DRUG ADHERENCE MANAGEMENT AND PHARMACOVIGILANCE," filed Feb. 11, 2021;

U.S. Provisional Patent Application No. 62/481,691, titled, "METHOD OF BODY MASS INDEX PREDICTION BASED ON SELFIE IMAGES," filed Apr. 5, 2017;

U.S. patent application Ser. No. 15/946,629, titled, "IMAGE-BASED SYSTEM AND METHOD FOR PREDICTING PHYSIOLOGICAL PARAMETERS," filed Apr. 5, 2018;

U.S. patent application Ser. No. 17/339,887, filed Jun. 4, 2021, entitled "IMAGE-BASED SYSTEM AND METHOD FOR PREDICTING PHYSIOLOGICAL PARAMETERS;"

U.S. Provisional Patent Application No. 62/810,549, titled, "SYSTEM AND METHOD FOR REMOTE MEDICAL INFORMATION EXCHANGE," filed Feb. 26, 2019;

U.S. patent application Ser. No. 16/802,485, titled, "SYSTEM AND METHOD FOR REMOTE MEDICAL INFORMATION EXCHANGE," filed Feb. 26, 2020;

U.S. patent application Ser. No. 17/498,724, filed Oct. 11, 2021, entitled "MACHINE LEARNING-BASED PREDICTION OF PHYSIOLOGICAL PARAMETERS IN REMOTE MEDICAL INFORMATION EXCHANGE;"

U.S. Provisional Patent Application No. 62/816,880, titled, "SYSTEM AND METHOD WITH FEDERATED LEARNING MODEL FOR MEDICAL RESEARCH APPLICATIONS," filed Mar. 11, 2019;

U.S. patent application Ser. No. 16/816,153, titled, "SYSTEM AND METHOD WITH FEDERATED LEARNING MODEL FOR MEDICAL RESEARCH APPLICATIONS," filed Mar. 11, 2020;

U.S. Provisional Patent Application No. 62/839,151, titled, "SYSTEM AND METHOD FOR INFORMATION EXCHANGE WITH A MIRROR," filed Apr. 26, 2019;

U.S. patent application Ser. No. 16/858,535, titled, "SYSTEM AND METHOD FOR INFORMATION EXCHANGE WITH A MIRROR," filed Apr. 24, 2020;

U.S. Provisional Patent Application No. 63/013,536, titled, "ARTIFICIAL INTELLIGENCE-BASED GENERATION OF ANTHROPOMORPHIC SIGNATURES AND USE THEREOF," filed Apr. 21, 2020;

U.S. patent application Ser. No. 17/235,871, titled, "ARTIFICIAL INTELLIGENCE-BASED GENERATION OF ANTHROPOMORPHIC SIGNATURES AND USE THEREOF," filed Apr. 20, 2021;

U.S. patent application Ser. No. 17/235,876, titled, "SYSTEMS AND METHODS FOR GENERATING AND USING ANTHROPOMORPHIC SIGNATURES TO AUTHENTICATE USERS," filed Apr. 20, 2021;

U.S. patent application Ser. No. 17/235,889, titled, "SYSTEMS AND METHODS TO VERIFY IDENTITY OF AN AUTHENTICATED USER USING A DIGITAL HEALTH PASSPORT," filed Apr. 20, 2021;

U.S. Provisional Patent Application No. 63/023,854, titled, "PRIVACY INTERFACE FOR DATA LOSS PREVENTION VIA ARTIFICIAL INTELLIGENCE MODELS," filed May 12, 2020;

U.S. patent application Ser. No. 17/319,025, filed May 12, 2021, entitled "PRIVACY INTERFACE FOR DATA LOSS PREVENTION VIA ARTIFICIAL INTELLIGENCE MODELS;"

U.S. Provisional Patent Application No. 63/064,624, titled, "SYSTEMS AND METHODS FOR VIRTUAL CLINICAL TRIALS," filed Aug. 12, 2020;

U.S. patent application Ser. No. 17/400,079, filed Aug. 11, 2021, entitled "SYSTEMS AND METHODS FOR VIRTUAL CLINICAL TRIALS;"

U.S. Provisional Patent Application No. 62/883,639, titled, "FEDERATED CLOUD LEARNING SYSTEM AND METHOD," filed Aug. 6, 2019;

U.S. patent application Ser. No. 16/987,279, titled, "TENSOR EXCHANGE FOR FEDERATED CLOUD LEARNING," filed Aug. 6, 2020;

U.S. Provisional Patent Application No. 62/775,782, filed Dec. 5, 2018, entitled "SYSTEM AND METHOD FOR PROVIDING PERSONALIZED HEALTH DATA;"

U.S. patent application Ser. No. 16/705,076, filed Dec. 5, 2019, entitled "SYSTEM AND METHOD FOR PROVIDING PERSONALIZED HEALTH DATA."

U.S. Provisional Patent Application No. 62/671,823, filed May 15, 2018, entitled "SYSTEM AND METHOD FOR MEDICAL INFORMATION EXCHANGE ENABLED BY CRYPTO ASSET;"

U.S. Nonprovisional patent application Ser. No. 16/167,338, filed Oct. 22, 2021, entitled "SYSTEM AND METHOD FOR DISTRIBUTED RETRIEVAL OF PROFILE DATA AND RULE-BASED DISTRIBUTION ON A NETWORK TO MODELING NODES;"

FIELD OF THE TECHNOLOGY DISCLOSED

The disclosed system and method are in the field of machine learning. To be more specific, technology disclosed relates to using artificial intelligence and machine learning for federated transfer learning.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Insufficient data can result in weak performance by machine learning models. In many applications such as healthcare, data related to same users or entities such as patients are maintained by separate departments in one organization or separate organizations resulting in data silos. A data silo is a situation in which only one group or department in an organization can access a data source. Raw data regarding the same users from multiple data sources cannot be combined due to privacy regulations and laws. Examples of different data sources can include health insurance data, medical claims data, mobility data, genomic data, environmental or exposomic data, laboratory tests and prescriptions data, trackers and bed side monitors data, etc. Therefore, in many real-world situations either raw data or labeled training data from different sources cannot be combined to train powerful machine learning models that can provide insights and predictions for providing better services and products to users.

An opportunity arises to train high performance machine learning models by utilizing different and heterogenous data sources without sharing data across computing devices.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Federated learning (FL) is a machine learning approach which aggregates model weights across multiple computing devices without requiring the computing devices to share their data with other computing devices or servers. In case of horizontal federated learning, we assume a shared feature space. This means that all computing devices have data with the same set of features but samples in the data are not shared across computing devices. In case of horizontal federated learning the feature space across multiple devices is aligned. Because of the true heterogeneity of information across devices, there can exist relevant information in different feature spaces. In such scenarios, the input feature space is not aligned across computing devices, making it difficult to benefit from horizontal FL. Alignment of feature spaces across computing devices depends on a number of features that are same across computing devices. If the feature space is not aligned, it means that features do not overlap across devices or no feature is same across datasets of computing devices. This results in two types of Federated Learning: vertical and transfer.

Figure 2A:
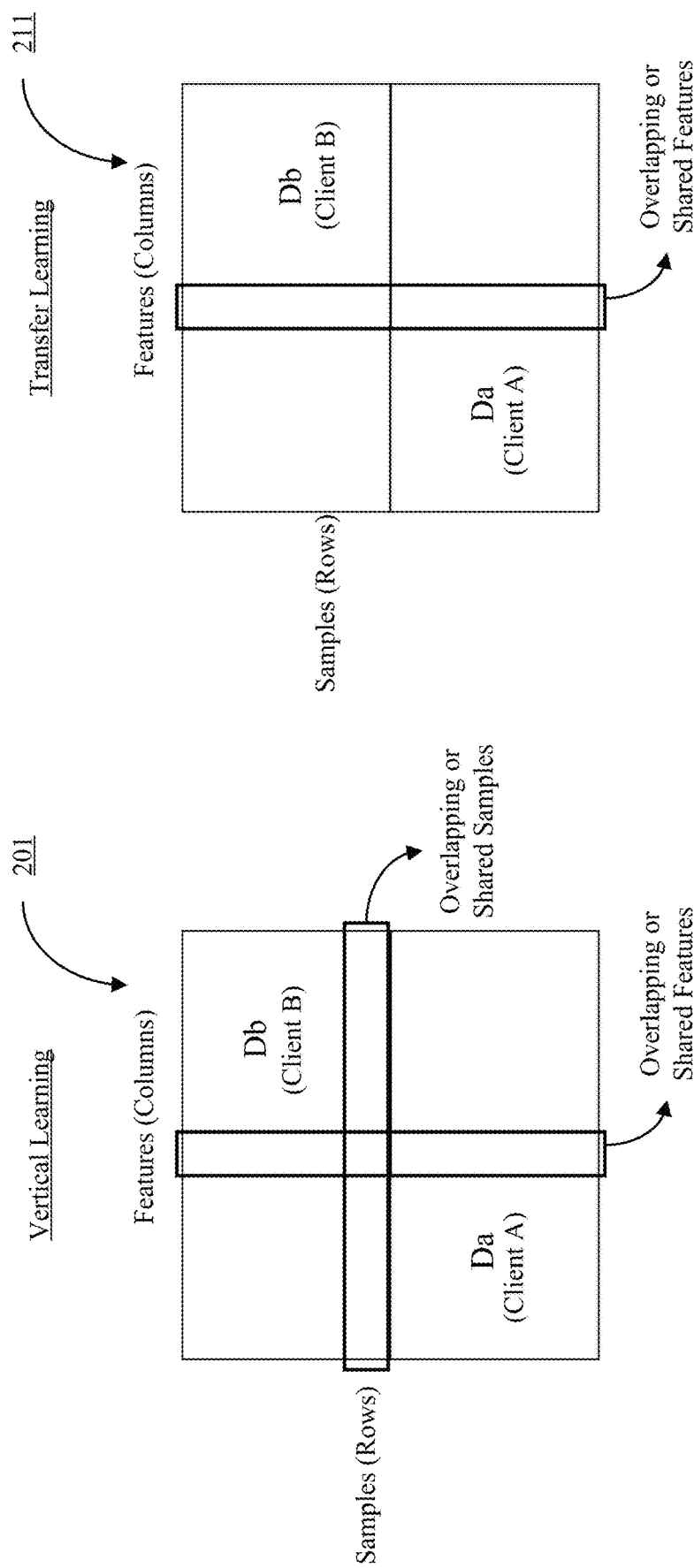
FIGS. 2A, 2B, and 2C illustrate arrangement of tabular datasets in federated transfer learning.

The distinction between vertical FL and transfer FL is based on an assumption that in case of vertical FL there is a shared sample space while in transfer FL, samples are not shared across computing devices. If a shared sample space exists, then we can have instance or sample level pairing between non-overlapping features. These instance pairs or sample pairs can be used to combine the non-overlapping feature space. Although this approach shows promising results for learning across unshared feature spaces, this approach makes some assumptions. For example, a first assumption is that client computing devices have an overlapping sample space while a partial to no overlap exists in the feature space. FIG. 2A presents an example of datasets $D_a$ and $D_b$ that are accessed by two clients, i.e., client A (or computing device A) and client B (or computing device B), respectively. In case of vertical learning, we can see that samples (or rows) are shared (or overlap) across two datasets. The features (or columns) can be shared in vertical learning as shown in the illustration 201. In case of transfer learning, the sample are not shared as there is no overlapping of rows between two datasets $D_a$ and $D_b$. However, there can be overlap in features as shown in the illustration 211.

In many real-world applications, the feature space does not completely overlap across computing devices. Therefore, assuming a completely overlapping feature space can make a technique unapplicable in such situations. This assumption requires that there is sufficient overlap between datasets or databases of different computing devices. To make a more realistic scenario, we can assume various levels of sample overlap across isolated datasets maintained by the computing devices. As we progressively reduce the proportion of overlap of samples across two or more datasets, the solution relies less on instance level pairings and more upon general feature patterns amongst non-overlapping samples.

If there is no sample overlapping across different clients, the situation becomes a case of transfer learning. As described above, we move away from a discrete classification between vertical and transfer FL. Instead, such distinction can be thought of as a continuum between vertical and transfer FL, which is proportional to the probability of shared sample instances. Regardless of whether there exists an overlapping of samples across different computing devices, a more practical approach is to avoid relying on instance pairing. Therefore, the technology disclosed does not rely on shared samples across different datasets that are separately maintained and accessed only by respective computing devices.

The technology disclosed is presented with a federated cloud learning setup with at least two clients (or computing devices) with private data. Because we expect to use this technology for relational data (i.e., medical records, tables etc.), the technology disclosed considers that data accessed by clients is in a tabular format. For simplifying the problem addressed, we consider classification across a small cardinality of labels (2 labels), with a shared label space across clients. We also assume that clients do not share any sample space, which removes the possibility of instance level pairing to better reflect a more realistic environment. Some features can be shared across clients. In at least one proposed federated learning method we assume that clients know which features are shared between clients.

We present various methods to address the transfer learning across different clients using assumptions described above i.e., no sample overlap across clients and some feature overlap across clients. We present proposed methods with empirical evidence.

Figure 2B:
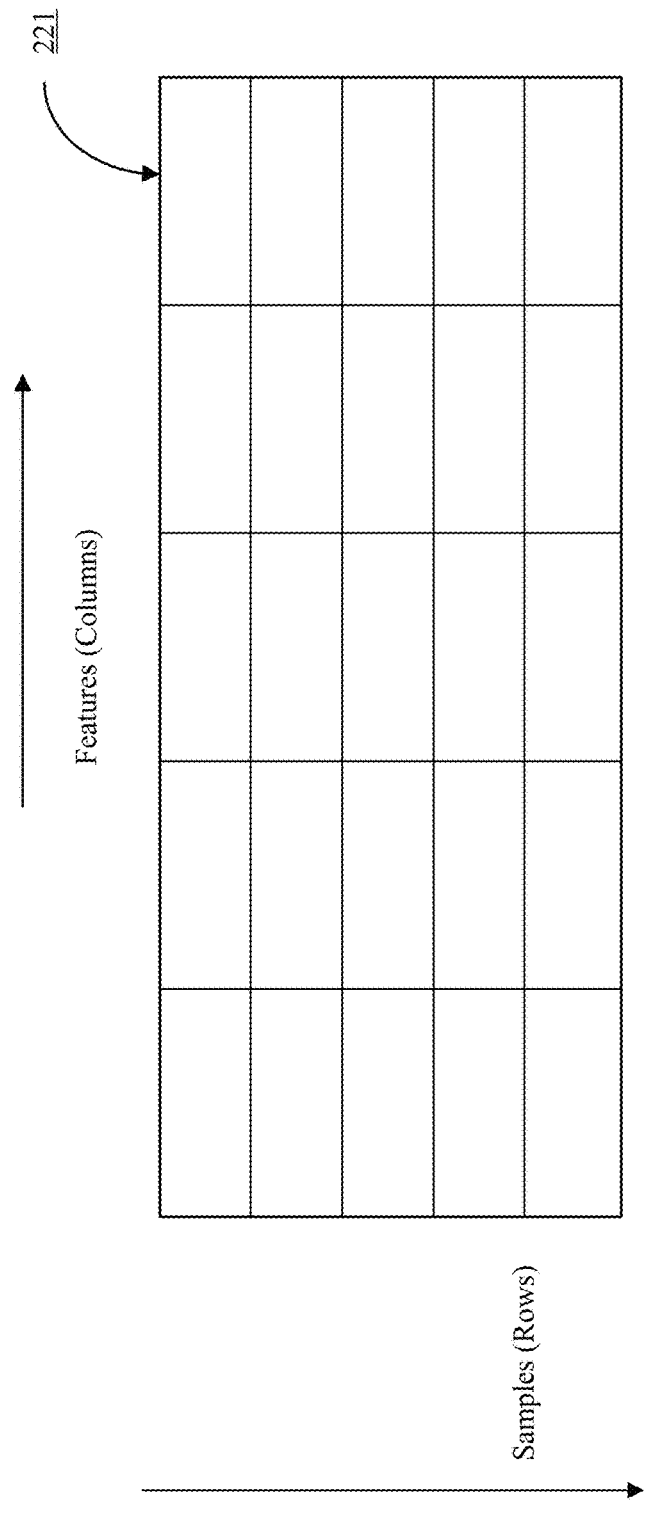

The training datasets 211 are arranged in tabular format as shown in FIG. 2B. The tabular datasets can have columns with discrete values such as months, colors, gender, symptoms, Integer values, etc. The tabular datasets can also have columns with continuous values such as temperature, age, latitude, longitude, etc. The technology disclosed involves classification of tabular datasets. The datasets are arranged as tables. The rows and columns in the tabular datasets represent sample and feature dimension respectively. We have used three publicly available datasets 231 for evaluating the proposed federated learning techniques. These datasets serve as common benchmarks for tabular machine learning, due to their relatively large feature space and sample space.

Figure 2C:
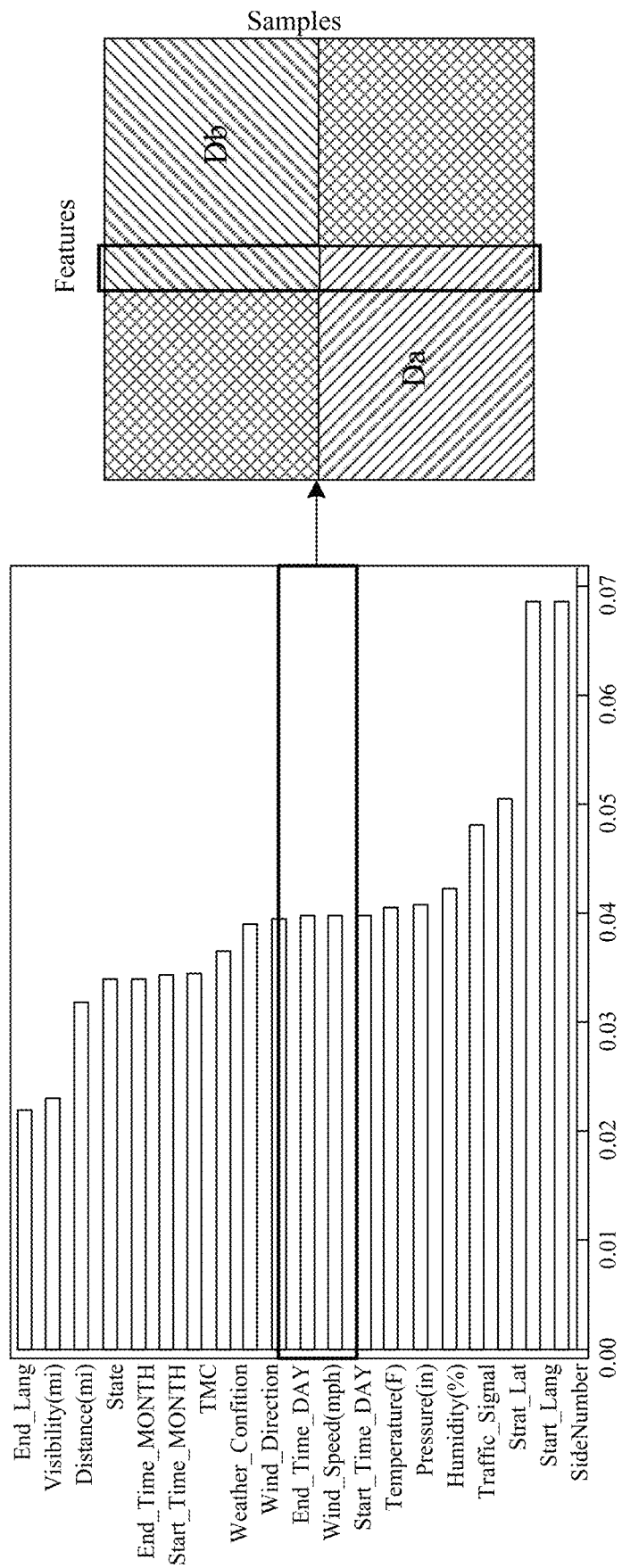

We have split the datasets into client partitions using the constraints described above. When splitting a single dataset into a transfer learning FL problem, we keep the sample space unshared. This was done by ensuring the sample ID set for each client was mutually exclusive. To split the feature space, we ensure that both clients (computing devices) were assigned with sufficiently informative features, while also not exhibiting significant overlap in the feature space. We distribute the features from the tabular dataset to respective client datasets such that having all of the features perform better than having each partition of features. This can be achieved by randomly assigning features to either client. To simplify the setup, we assigned less important features to one client (client A or computing device A), while exhibiting some overlap in the feature space. This method of splitting makes it simpler to see whether it is possible to have positive transfer between the stronger and weaker feature spaces. Once this is complete, we can move to bidirectional transfer learning methods. Boosted Regression Trees are used to calculate feature importance, and were sorted from lowest to highest. The lowest 60 percent of the ranked features were assigned to client A, while the highest 60 percent were assigned to client B, making 20 percent of the feature space as overlapping. An example ranking of features is shown in FIG. 2C.

To confirm one feature set is more informative than the other, we trained both on neural networks of similar O(s) and O(t) complexity measure their relative classification performance. As expected, the weaker feature set (Client A) converges at a testing accuracy of 10 percent below the stronger feature set (Client B).

We now present details of the technology disclosed by first presenting an environment in which the system can perform drug adherence.

Environment

Many alternative embodiments of the technology disclosed may be appropriate and are contemplated, including as described in these detailed embodiments, though also including alternatives that may not be expressly shown or described herein but as obvious variants or obviously contemplated according to one of ordinary skill based on reviewing the totality of this disclosure in combination with other available information. For example, it is contemplated that features shown and described with respect to one or more embodiments may also be included in combination with another embodiment even though not expressly shown and described in that specific combination.

For purpose of efficiency, reference numbers may be repeated between figures where they are intended to represent similar features between otherwise varied embodiments, though those features may also incorporate certain differences between embodiments if and to the extent specified as such or otherwise apparent to one of ordinary skill, such as differences clearly shown between them in the respective figures.

Figure 1:
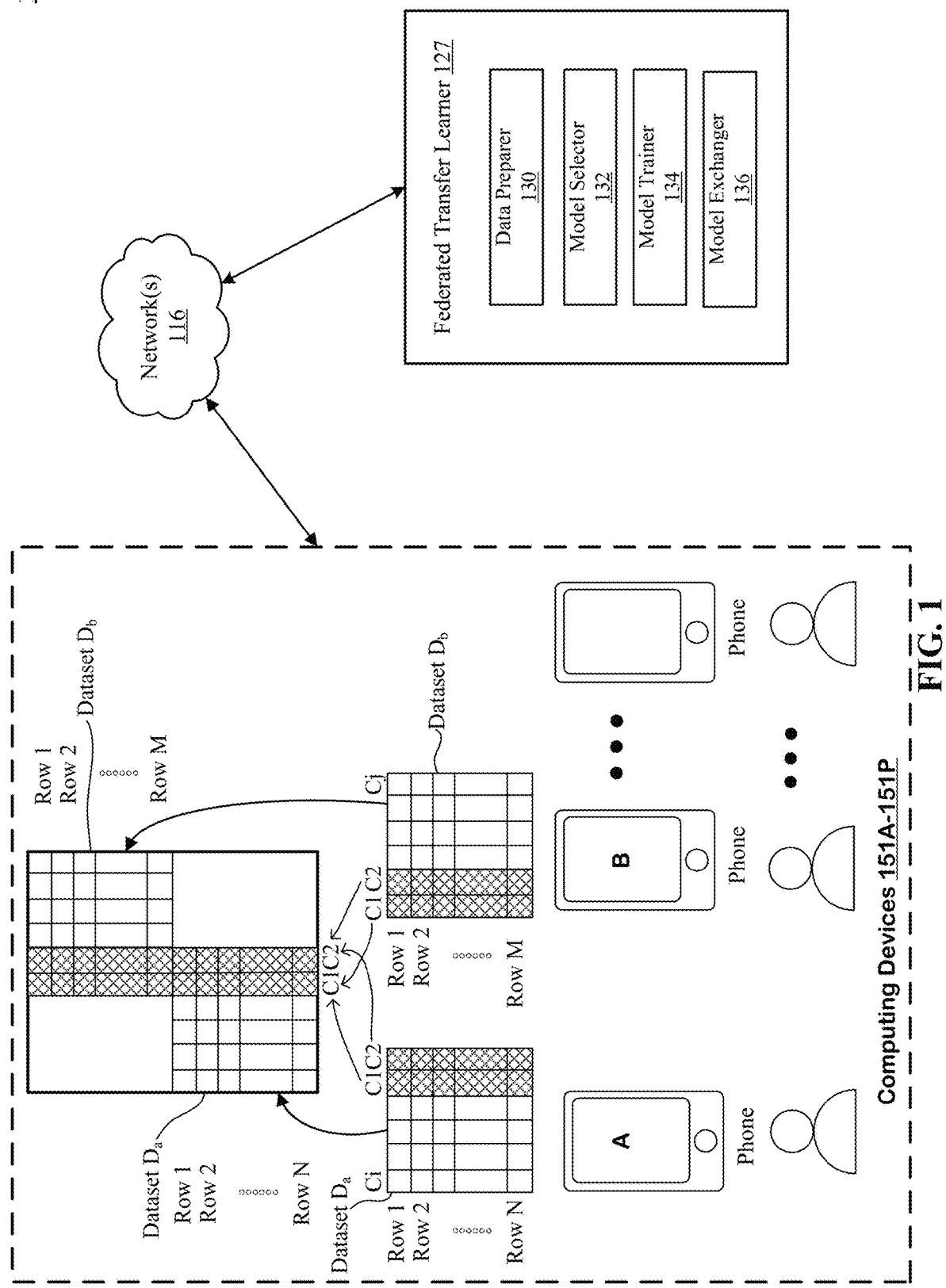
FIG. 1 is a high-level architecture of a system that can be used for federated transfer learning without sharing data across a plurality of computing devices.

We describe a system for transfer learning. The system is described with reference to FIG. 1 showing an architectural level schematic of a system 100 in accordance with an implementation. Because FIG. 1 is an architectural diagram, certain details are intentionally omitted to improve the clarity of the description. The discussion of FIG. 1 is organized as follows. First, the elements of the figure are described, followed by their interconnection. Then, the use of the elements in the system is described in greater detail.

FIG. 1 includes the system 100. This paragraph names labeled parts of system 100. The system includes a federated transfer learner 127 and computing devices (or clients) 151A-151P. The clients can comprise a variety of computing devices such as mobile computing devices, smart phones, desktop or laptop computers, etc. The federate learning can comprise components including a data preparer 130, a model selector 132, a model trainer 134, and a model exchanger 136. The federated learner 127 is connected to the computing devices 151A-151P via a network(s) 116.

Two computing devices 151A (labeled A) and 151B (labeled B) are displayed with their respective datasets $D_a$ and $D_b$ consisting of rows and columns. The dataset $D_a$ includes N rows (or samples) and Ci columns (or features). The dataset $D_a$ consists of M rows (or samples) and Cj rows (or features). Both datasets share two features C1 and C2. Therefore, the two datasets can be hypothetically organized as an unabridged tabular dataset shown at the top which shows the two datasets $D_a$ and $D_a$ with shared features C1 and C2 as aligned. Although, we know that computing devices or clients do not share data with each other, the purpose of showing the unabridged table is to illustrate how the two datasets are related to each other. There is no overlapping in their rows (or samples). In one implementation, the clients may not know which features are shared with other clients. In another implementation, the clients know which features are shared with other clients. FIG. 1 presents an example of how tabular datasets can be stored in computing devices. The tabular datasets can also be stored in an external storage device and accessible to respective computing devices. In federated learning approach, the data is privately maintained by the computing device and is not shared with other computing devices or servers.

The technology disclosed can include federated learning training models on two or more clients having tabular data. In some implementations, the tables in respective computing devices have access to tabular datasets with overlapping features. The assumption of whether there exists feature overlap can depend on the model. As presented below, some of approaches presented herein do not use this assumption. This is because in some situations the clients (computing devices) may not have feature sharing or overlapping with other clients. One of the techniques presented below is based on conditional tabular generative adversarial network (or CTGAN). Application of CTGAN uses information about shared features across clients for federated transfer learning. Other techniques presented below do not require information about overlapping features across clients.

The clients had been assigned independent sample spaces. Unlike in the vertical learning approach, we are not assuming that it is possible to include a unique identifier for each embedding. This is because unique identifiers may be used to identify sample specific information, which is not allowed in federated transfer learning for sample-level differential privacy. Since we are focusing on classification tasks, it is also important to note that our label space between the clients is aligned.

As the feature space is not aligned, we can think of each client having data for the same problem, but from different projections. This is similar (not the same) to having multiple 2D projections of a 3D object, and trying to classify the label of the 3D object. Each of the 2D projections are clients and the 3D object is the data manifold. The visual intuition of vertical learning is to learn a 3D representation across the ensemble of 2D projections. This is also analogous to finding the mutual information or correlation between the 2D projections of the same object. However, our clients do not have a shared sample space. Transfer learning is more similar to creating a class conditional posterior of what the 3D object is, given two or more unpaired projections from the same camera coordinates.

Figure 3:
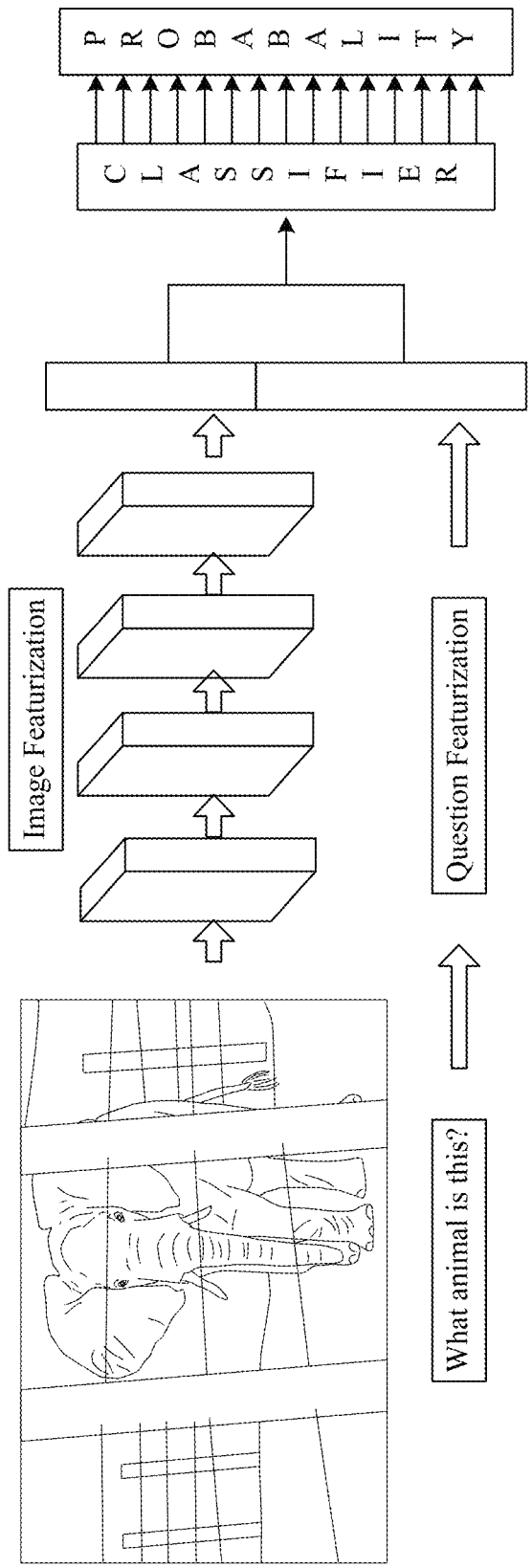
FIG. 3 presents an example of multimodal classification using two modes of data representation.
Figure 4:
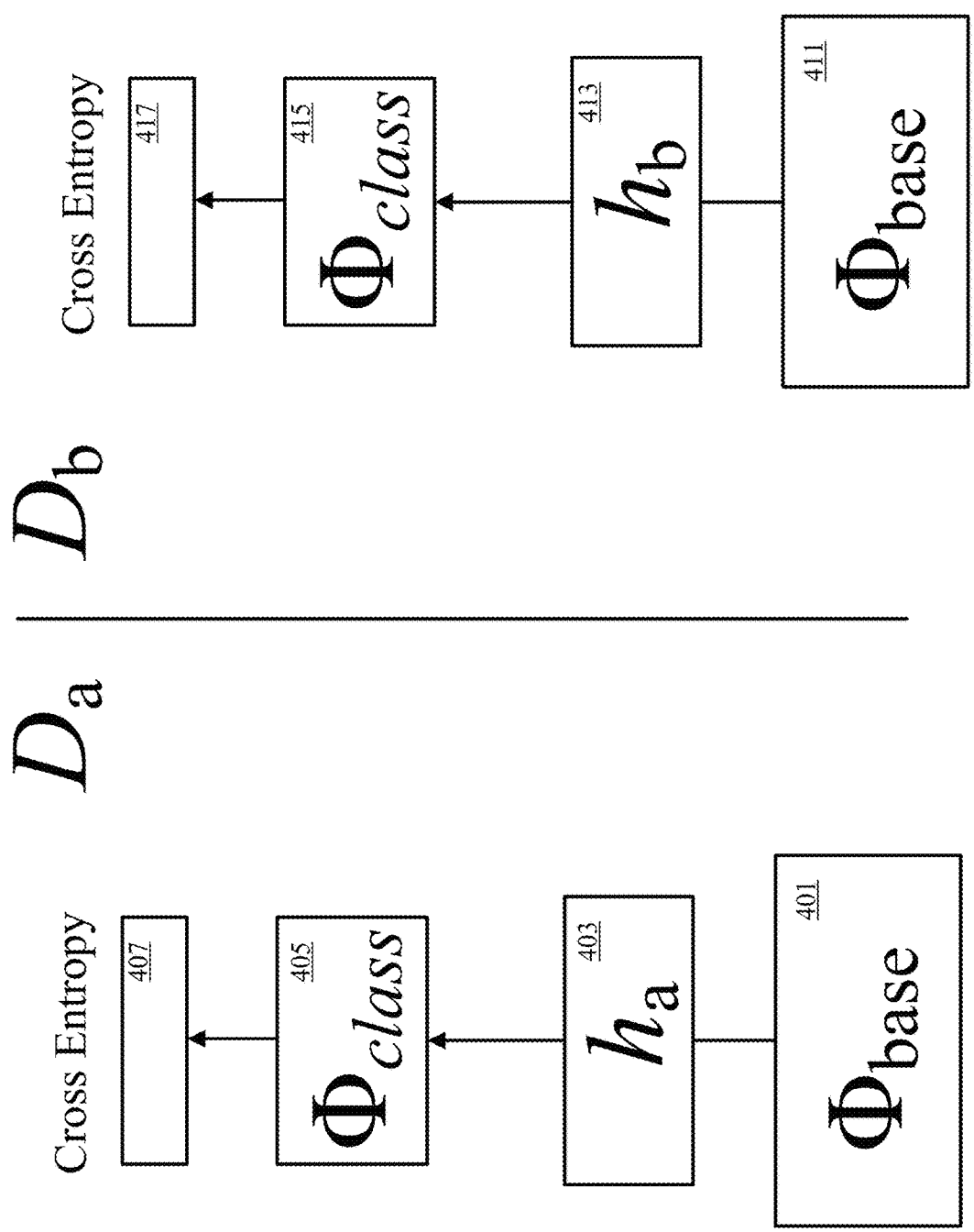
FIG. 4 is a high-level architecture of a base or control model for a classification task.

The technology disclosed can be further understood through the concept of multimodal classification. In a particular multimodal case as illustrated in FIG. 3, there can be a set of sentences paired with a picture they are describing. The goal is to classify the picture and sentence pair using both modes of representation. Visual Question answering is a good example of vertical learning, where the images and questions represent heterogeneous features that are joined on their sample ID. The sentence can be thought of as data from client A, and the picture can be seen as data from client B. In the vertical learning scenario, we have the sentence and picture pairs, so we are inclined to use a unique ID hash to privately connect these representations. This is allowed by the shared sample space. In transfer learning however, the shared sample space between the clients is assumed to be null. This is similar to having text sentences and images that are not paired, but are representing the same label space. For transfer learning, the model will have to learn to merge the class conditional relationship between textual and visual representations.

Federated transfer learning involves aligning the two input spaces into a common feature space, that can then be linearly separable. By linearly separable, we mean that we can draw hyperplanes in embedding space, and not have many points be clustered with their respective class. This is the essence of classification, and the common output softmax layer can be used to achieve this, which is to draw linear hyperplanes. Therefore, the technology disclosed helps cluster classes by merging two representations of the same label space. This is mainly done through asymmetric functions, where we have two separate functions (i.e., Neural Networks) for each client. These functions respectively intend to transform the input space of each client into a common latent space that can be further manipulated to improve classification.

The technology disclosed includes multiple techniques to transfer learning from one client to another. We present five such techniques in the following sections. The federated learner 127 includes logic to prepare the data for applying the transfer learning techniques. Data preparation can include separation of data from a large labeled tabular training dataset. Data preparer 130 includes the logic to prepare the training data for training models in computing devices. The model selector 132 includes the logic to select appropriate machine learning model for training the classifiers in respective clients or computing devices. The model trainer 134 includes the logic to train the respective models selected by the model selector 132. The trained models or output from the trained models such as spatial representations of encoded input (also referred to as embeddings) can be exchanged with other clients by the model exchanger 136.

Completing the description of FIG. 1, the components of the system 100, described above, are all coupled in communication with the network(s) 116. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Federated Machine Learning Techniques

We now present various techniques proposed by the technology disclosed for federated learning. We first present a control model (also referred to as backbone control model) which can be considered as a baseline model. Following the control model's description, we present four federated transfer learning techniques that can be applied for federated machine learning for tabular datasets.

Backbone Control Model

The proposed federated machine learning techniques presented in the following sections build around a baseline of a simple tabular machine learning neural network. In the control model, the training dataset table is sampled row wise, making each row a vector of continuous and discrete variables. The continuous variables are standardized to have a standard deviation of 1 and mean of zero. The discrete columns are represented as one hot encodings, or as categorical embeddings. For the sake of simplicity, all of the techniques will be conducted with one-hot encodings. We then apply a set of linear layers with ReLU, batch normalization and dropout. The final layer has a dimension equal to the number of labels in the classification task.

The baseline is therefore the classification accuracy on the validation set with isolated local models described. In one implementation, there is no federated averaging or any communication between the two clients. We assume that the client with less important features exhibits a lower classification validation accuracy than the client with more important features. In addition, for simplicity, we assume that the dataset has two classes and is class balanced.

The baseline model is decomposed into an encoder and a classification layer. The encoder embeds each row into a 64-dimensional vector (also referred to as an embedding) which is then forwarded to the classification layer which produces a softmax activation layer with a dimension equal to the number of classes. The encoder for baseline model for client A is shown as 401 and the encoder for baseline model for client B is shown as 411. The output from the encoder which is a 64-dimensional vector is shows as 403 for client A and 413 for client B. The classification layer is shown as 405 and 415 respectively for baseline models for client A and client B. The output from the classification is shown as 407 and 417 respectively for baseline model for client A and baseline model for client B.

Embedding Matrix

Some of the federated learning techniques presented below exchange embeddings across the two clients. This can be done through assigning embeddings vectors into a matrix of embedding vectors which we will hereafter refer to as the embedding matrix. Upon the model synchronization phase between the clients, the embeddings matrices are exchanged between the two clients.

Technique #1. Maximum Mean Distance and Covariance Loss

The maximum mean discrepancy and covariance loss are two metrics that attempt to measure first and second order divergences between two distributions. Specifically, this family of approaches attempts to align the marginal distribution of the latent embeddings space between the two domains.

Maximum Mean Discrepancy

Maximum mean discrepancy is calculated by taking the expected difference between the mean of two embeddings. This is calculated by sampling embeddings from either distribution, and then taking the absolute value of their Euclidean distance.

Covariance Loss

The covariance loss is a second order statistic that also attempts to calculate the difference between two features spaces. This involves calculating the average covariance matrix for each batch of embeddings extracted from each feature space. Once the covariance matrices are computed, we can compute the loss by taking the Frobenius norm of the difference between the two matrices. Frobenius norm can be obtained as inner product of the matrices. Frobenius inner product is a binary operation that takes two matrices and returns a number. The matrices need to have the same number of rows and columns but not necessarily square matrices.

Both of these loss functions are applied on the embedding vectors from each encoder. We then use the embedding matrix to extract embeddings from the other client. The training procedure is described as follows in Table 1.

TABLE 1

Training Procedure for Maximum Mean Distance and Covariance Loss Technique

| Step | Client A | Client B |
|---|---|---|
| 1 (Local) | Train baseline for 3-5 epochs and store embeddings in random positions in the embedding matrix | Train baseline for 3-5 epochs and store embeddings in random positions inside the embedding matrix |
| 2 (Sync) | Exchange Client A embedding matrix copy with Client B embedding matrix copy | Exchange Client B embedding matrix copy with Client A embedding matrix copy |
| 3 (Post Sync) | Run MMD or Covariance Loss on current encodings produced from encode with sample embeddings from Client B's shared embedding matrix. | Run MMD or Covariance Loss on current encodings produced from encode with sample embeddings from Client A's shared embedding matrix. |

This technique works well with domain adaptation for images with the same dimensions. However, for tabular data this technique may not show positive transfer learning for tables with different input spaces. This technique penalizes non-overlapping samples of marginal distributions, which is why it is popular to use for unsupervised domain adaptation, where one client does not have access to the labels. In our example, we have the label information therefore, we can match the conditional distributions. This motivation leads to the second technique presented below.

Technique #2 Centroid Matching Network Transfer

Figure 5:
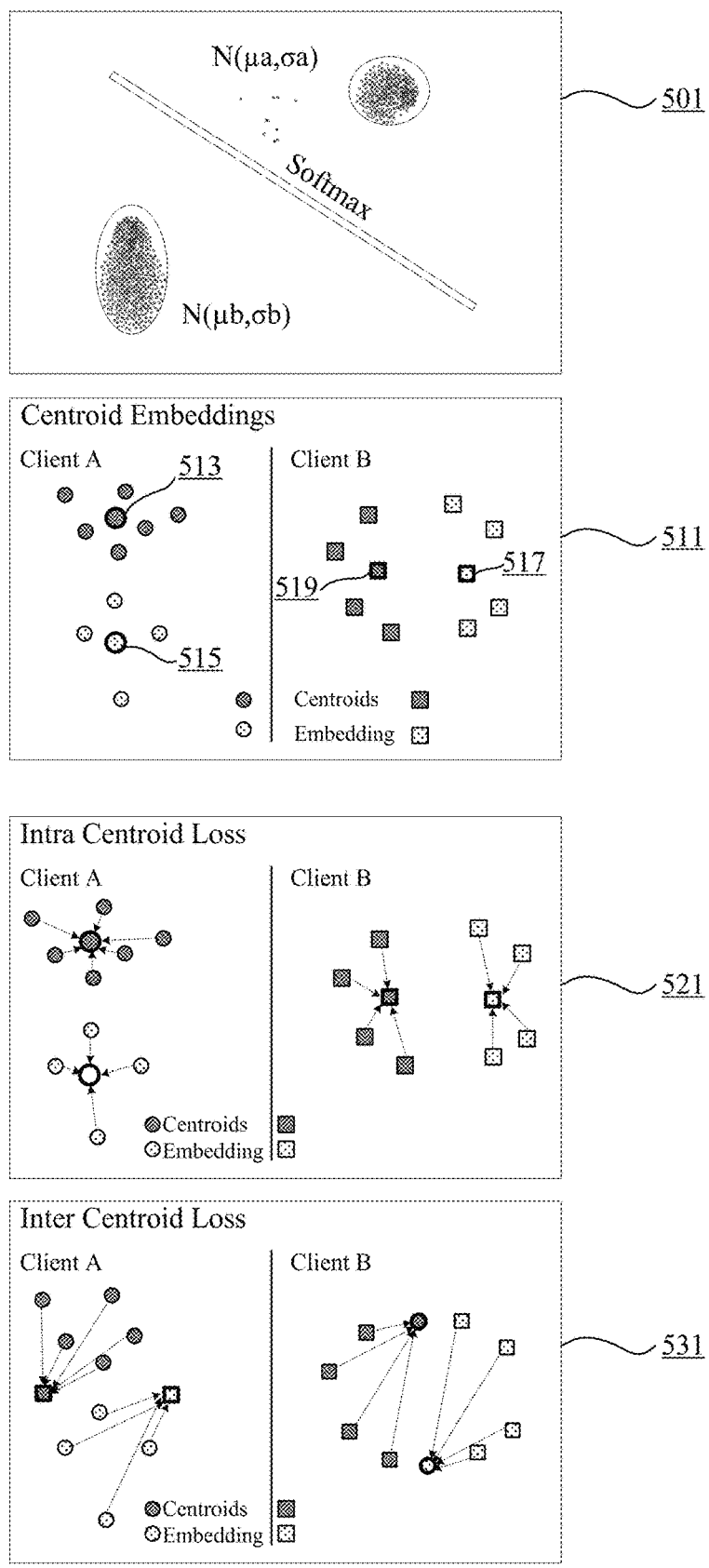
FIG. 5 presents an example of federated transfer learning by exchanging centroids of embeddings with other clients.

This second technique for federated learning is inspired by the clustering of embeddings during linear classification. We can think of a linear classifier (or softmax) as creating parameterized hyperplanes that are trying to separate embeddings into their respective classes. Assuming that there is linear separation, we can see the separated clusters of embeddings representing each class as shown in illustration 501 in FIG. 5. The embeddings for two clients A and B are shown in the illustration 511. For each client, the embedding corresponding to two label classes are shown as circles and squares, respectively.

We can re-parameterize each cluster of embeddings per class per client using a multivariate gaussian with a diagonal covariance matrix. We refer to these gaussian representations of the clusters as class centroids. The class centroids can be calculated by taking the mean of class specific embeddings, either by using the ground truth hard label or the predicted soft label. Because the soft label has probability assigned to all classes, the centroids are created by taking a weighted average of all of the probabilities. The centroid embeddings for client A are labeled as 513 and 515 whereas the centroid embeddings for client B are labeled as 517 and 519.

The centroids computed for a client are then exchanged with the other client. Sending the centroid embeddings has a stronger appeal for sample level differential privacy, as we are sending non-parametric representations of the embeddings instead of embeddings per sample.

After the class centroids are exchanged between the clients, each client can calculate the conditional divergence to help align between the clients' embedding conditional distributions. This is done by taking an L1 or L2 loss between the client's calculated centroid in the current batch with the centroid shared from the other client (inter centroid loss) as shown in illustration 531 in FIG. 5. The high-level process steps for the centroid embeddings technique are presented in Table 2.

TABLE 2

Training Procedure for Centroid Matching Technique

| Step | Client A | Client B |
|---|---|---|
| 1 (Local) | Train baseline for 3-5 epochs and calculate the class embedding centroids | Train baseline for 3-5 epochs and calculate the class embedding centroids |
| 2 (Sync) | Exchange Client A class centroid copy with Client B embedding class centroid | Exchange Client B class centroid copy with Client A embedding class centroid |
| 3 (Post Sync) | Run Centroid Loss on source calculated class centroid encodings produced from encoder with from Client B's class centroid | Run Centroid Loss on source calculated class centroid encodings produced from encoder with from Client A's class centroid |

The system can also determine intra-centroid loss for a class of labels per client. This is calculated by taking the loss between each point belonging to a centroid and the centroid itself (intra centroid loss) as shown in the illustration 521 in FIG. 5. This can be performed through soft and hard labelling assignments. When calculating intra-centroid loss functions, we introduced batch level centroids, as well as a moving average of the centroid across batches for less stochastic variation due to batch statistics.

Technique #3: Conditional Tabular Generative Adversarial Network for Synthetic Tabular Data The third technique for federated learning is based on Generative Adversarial Networks or GANs. Generative modeling is a sub-field of machine learning that studies the problem of how to learn models that generate images, audio, video, text or other data. Generative models can be trained on unlabeled data. These models can be used with large amounts of unlabeled data that is available. The problem in generative modeling is how to train a generative model such that the distribution of its generated data matches the distribution of the training data. Generative adversarial networks (GANs) represent an advancement in solving this problem, using a neural network discriminator or critic to distinguish between generated data and training data. A critic (or a discriminator) defines a distance between the model distribution and the data distribution which the generative model can optimize to produce data that more closely resembles the training data. Generative Adversarial Networks have been promising for generating synthetic data for training medical records.

In an unconditional generative model, there is no control of the models on the data being generated. In case of tabular training data, this method of training a generator does not account for the imbalance in the categorical columns. If the training data are randomly sampled during training, the rows that fall into minor category may not be sufficiently represented, thus the generator may not be trained correctly. If the training data is resampled, the generator learns the resampled distribution which is different from the real data distribution. This problem is reminiscent of the "class imbalance" problem in discriminatory modeling. The problem can be exacerbated in tabular data as there can be multiple columns to balance. We present an overview of a technique that attempts to address the above-mentioned issues in synthetic tabular data generation. We apply this technique in the context of federated transfer learning.

In one implementation, the technology disclosed uses the conditional tabular GAN (or CTGAN) proposed by Lei et al., 2019, in their paper entitled, "Modeling Tabular Data using Conditional GAN," <<available at arxiv.org/abs/1907.00503>> to generate synthetic tabular data rows. The technology disclosed applies CTGAN in the context of Federated Learning (FL). In FL, there are multiple computing devices with their own data. The data is not shared across clients or computing devices. We are considering tabular data as input to the models. Different computing devices can have tabular data with shared features (overlapping columns in the table). We train a generator using a first computing device (or a first client) and then transfer the trained generator to a second computing device (or a second client) where the generator can generate synthetic data (rows) that can give the classifier of the second computing device an input similar to the data accessible by the first computing device. In this approach, we use a conditional tabular GAN or CTGAN to generate samples from the other client in a federated learning environment. The process involves first training a separate generator using CTGAN model on each client's datasets. The trained generators of respective GANs are then exchanged so that the clients can generate synthetic data using the generators trained on other client's datasets.

Generating Synthetic Tabular Rows Using Conditional Tabular GAN

Figure 6A:
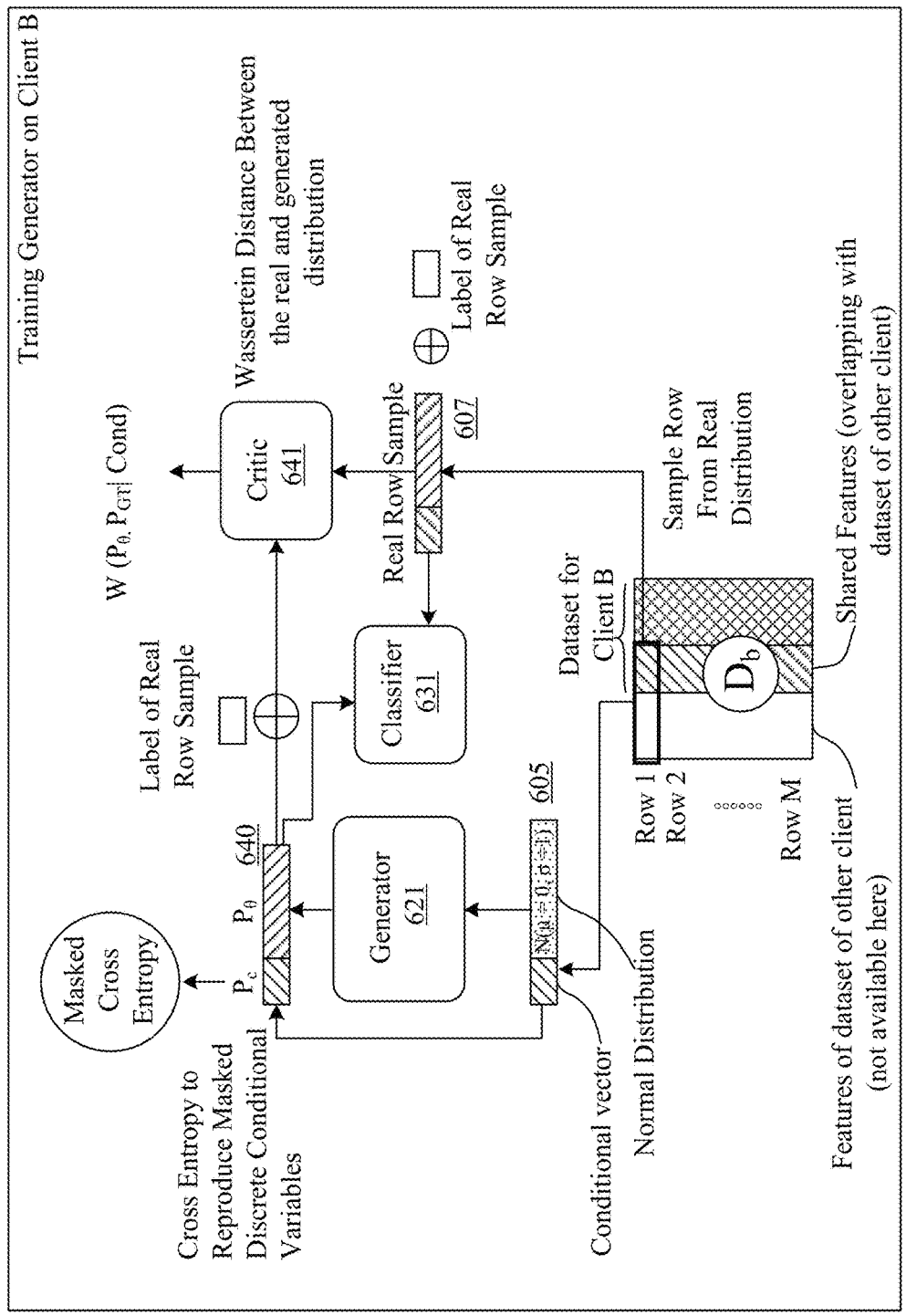
FIG. 6A is an example architecture for training a generator using Conditional Tabular Generative Adversarial Network in a federated transfer learning environment.

We present training of a generator and application of a trained generator to generate synthetic data rows for a tabular dataset. In FIG. 6A, a high-level architecture to train a generator on a client device is presented. The generator in FIG. 6A is trained on client B using tabular dataset $D_b$ accessible to client B. Further details of training the generator are presented in FIG. 6B. In FIG. 7, we present use of the trained generator after it is exchanged and sent to client A. The trained generator is received at client A from client B and is thus trained on a tabular dataset set which is not accessible to client A.

A high-level process flow for training a generator 621 is presented in FIG. 6A. Conditional tabular generative adversarial modeling (or CTGAN) can direct the data generation process such that all categories from discrete attributes in a table are sampled during the training process and recover the real data distribution during test. Let k* be the value from the i*th discrete column Di* that has to be matched by the generated sample r̂. The generator can be interpreted as the conditional distribution of rows given that particular value at the particular column i.e., r̂~Pg(row|Di*=k*). Therefore, the generator is referred to as a conditional generator and a GAN built using this generator is referred to as Conditional GAN.

The CTGAN technique allows selection of one or more columns in the table for conditional data generation. The one or more columns can be selected randomly or by a user. The model constructs a probability mass function (PMF) across the range of values for the selected column such that the probability mass of each value is the logarithm of its frequency in that column. A particular value for the selected column can be randomly selected according to the PMF constructed above to set as a condition for generating the synthetic row data. The input to a generator is a random sample of row data from a multi-dimensional normal distribution except for the values of one or more selected columns which are set as conditions as described above. The synthetic row data output by the generator includes the same values for selected columns as in the input. Randomly setting conditional value for a column in the input to a generator makes sure that tabular rows that fall into minor categories will be represented in the synthetic training data.

We present an overview of the training architecture as shown in FIG. 6A. The tabular data (labeled $D_b$) as shown in FIG. 6A comprises of M rows of data in the table. The columns of the table represent features. The right cross-hatched portion of the table and middle line-hatched portion of the table indicate features of the dataset for the current client (client B). The left blank portion of the table indicates features of dataset of the other client (client A) which are not available to client B. An input row 605 to the generator 621 is generated by concatenating the conditional vector and normal distribution as shown in FIG. 6. The input 605 is conditioned using the input values of the one or more shared features for a sampled real row 607 from the dataset as described above. The input data row 605 is provided as input to the generator 621 and the real row sample 607 is provided as input to the classifier 631.

Figure 6B:
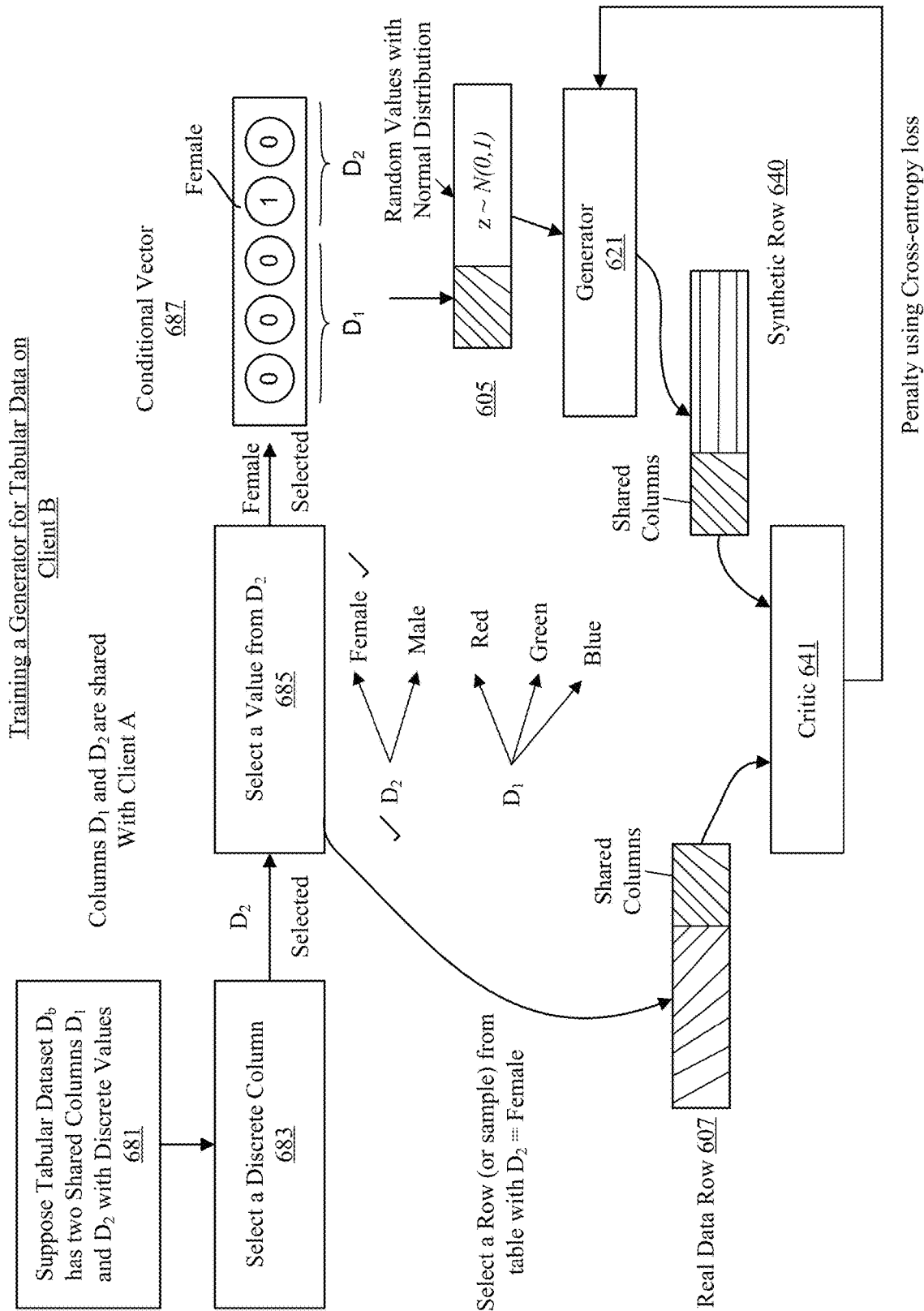
FIG. 6B presents an example of training a generator to generate synthetic tabular data rows.
Figure 7:
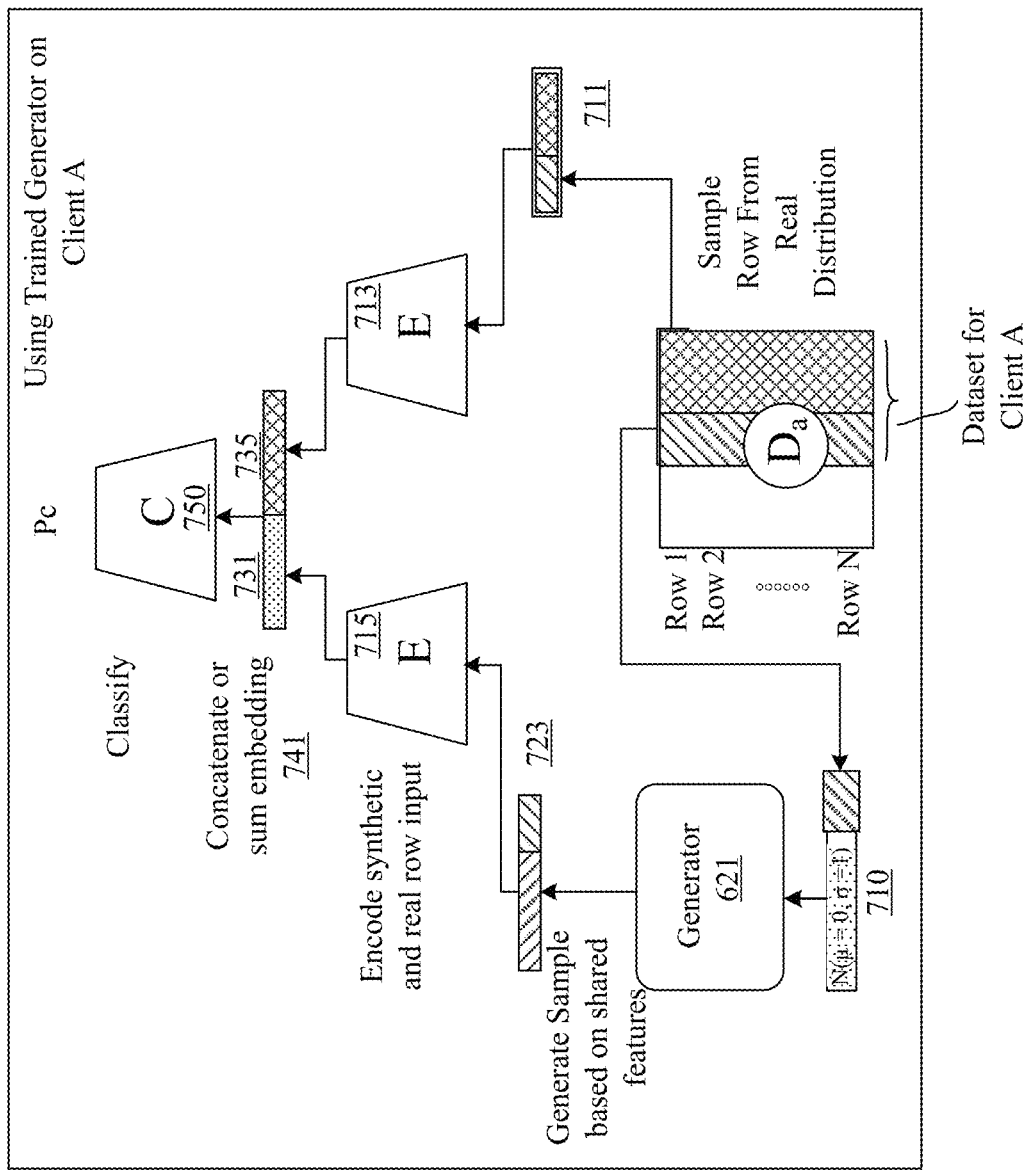
FIG. 7 is an example of using a trained generator to generate synthetic data rows for fusing with real data rows.

FIG. 6B presents more details of training the generator 621 using tabular dataset $D_b$. Suppose we have two shared columns $D_1$ and $D_2$ (or shared features) between datasets $D_a$ and $D_b$ that are accessible to Client A and Client B respectively. This is shown in the box 681 in FIG. 6B. The system can then randomly select one or more shared columns as shown in a box 683. Suppose column $D_1$ is selected. The system then randomly selects a value for the variable $D_1$. The values are selected from the distribution of column $D_1$. Consider, $D_1$ column is "gender" which is randomly selected for conditional row data generation. There are two values "male" and "female" in the "gender" column. Suppose, "female" is randomly selected as condition for generation of synthetic row (685).

The input to the generator 621 is formed by constructing a conditional vector 687 for shared columns (or shared features). The conditional vector is a binary mask including a Boolean (0 or 1) for each value for all discrete columns. The binary mask for a randomly selected value will be set as 1 while it will be set as 0 for all other values for this column and other shared columns in the table. In our example, the binary mask for the gender column will be (0, 1) indicating "0" for "male" and "1" for "female" values of the column. A second shared column $D_1$ has three values in the table "red", "green", and "blue". The column $D_1$ is not selected in box 683, therefore the binary mask for its values are set as (0, 0, 0) as shown in the conditional vector 687. This conditional vector 687 is then concatenated with a normal distribution vector z prior to being fed into a generator. The vector z assigns random values (between 0 and 1) to binary masks of other columns in the dataset $D_b$ to form the input 605 for the generator 621.

A sampled row 607 is selected randomly from the dataset $D_b$ from the rows which have a value of column $D_2$="Female". Discrete values can be represented as one-hot vectors. The conditional vector is used as a way to indicate the condition $D_2$="Female". All of the discrete columns in the tabular data are represented as one-hot encoded vectors for input to the generator. In our case, the conditional vector is used to generate a one-hot encoding of class labels of classes of the shared sample feature. In the above example, the shared sample feature selected for conditioning is "$D_2$". The classes for the selected shared feature include "female" and "male". The class label "Female" for the female class is set (or hot) to ensure that the generator gets this in the input.

During training, the generator learns to produce an output which is a copy of the input. The mechanism to enforce the generator to produce a synthetic row that matches the real data row is to penalize its loss when the synthetic row does not match the real data row. As the training progresses, the generator learns to make an exact copy of the given real data row. The generator 621 produces a synthetic row 640. The synthetic row 640 includes values for shared columns (as shown on the left part with angular line-hatching pattern) and values for non-shared features or columns which are shown as horizontal line-hatching pattern in synthetic row

640. For the specific example conditional vector and discrete column selects, during training the generator learns to produce values of other shared features for a synthetic row when the value of the selected shared $D_2$="Female" 640. Similarly, generator can be trained for different values of all shared features individually or by selecting two or more shared features and setting their respective class labels. The selection of shared features and their values can be made randomly or systematically.

The synthetic output row (synthetic row) 640 produced by the generator 621 is evaluated by a critic or discriminator 641. The critic (or discriminator) 641 estimates the distance between the learned conditional distribution by the generator and the conditional distribution on real data in the sampled row 607. A cross entropy loss term can be calculated for the discrete variables that were conditioned on the input. This is done to ensure that the synthetic rows being generated contain the condition. During training the generator is penalized when its output does not match the real data sample. Properly sampling the dataset and conditional vectors can help the model to explore all possible values in the shared features.

In one implementation, the generated rows and their conditional vectors are concatenated along the embedding dimension to represent a single vector containing 10 rows and their 10 conditional vectors respectively. This technique is referred to as PacGAN (Lin et al., "PacGAN: The power of two samples in generative adversarial networks" available at <<arxiv.org/pdf/1712.04086.pdf>>), which has a critic infer a score for a "pack" of generated/real samples during a single forward pass. This technique has shown to reduce mode collapse, which is when a GAN produces a low diversity of samples that best fool the discriminator/critic. For optimization, we use ADAM with a learning rate of 1e-3 and a batch size of 500, running for 300 epochs. A gradient penalty and Wasserstein loss can be calculated by the critic or discriminator in CTGAN. A training procedure process flow for the third technique for federated learning is presented below in Table 3.

In one implementation, Gumbel softmax is used to produce more discrete one hot vectors with the temperature set to 0.1. Softmax can also be used, but will produce more continuous distributions over the discrete variables, resulting in an unbalanced equilibrium between the critics. Further details of the CTGAN model are presented in Lei et al., 2019, "Modeling Tabular Data using Conditional GAN," <<available at arxiv.org/abs/1907.00503>>.

TABLE 3

Training Procedure for Conditional GAN Technique

| Step | Client A | Client B |
|---|---|---|
| 1 (Local) | Train the CTGAN on current Client A table while conditioning on randomly sampled discrete vectors in shared feature space | Train the CTGAN on current Client B table while conditioning on randomly sampled discrete vectors in shared feature space |
| 2 (Sync) | Exchange generator which generates Client A data to Client B | Exchange generator which generates Client B data to Client A |
| 3 (Post Sync) | Run Asynchronous encoders on synthetic samples of Client B and real samples of Client A | Run Asynchronous encoders on synthetic samples of Client A and real samples of Client B |

Training with Synthetic Tables

The trained generators are exchanged between clients for producing synthetic data as shown in FIG. 7. The critics are not exchanged. The architecture presented in FIG. 7 is with respect to Client A which has access to a dataset $D_a$ comprising N rows. The features of the dataset are shown as a middle portion with line hatching (shared features) and a right portion of the dataset $D_a$ which represents features only present for the dataset of the current client i.e., client A. The blank left portion of the dataset table represents features for the other client's dataset and not accessible to client A. The input 710 to the generator 621 is conditioned on one or more shared features of real sample data row 711. The shared part of the input 710 is shown with line hatch pattern. The values for features in remaining part are randomly generated using normal distribution. The trained generator 621 generates a synthetic data row 723.

Each client has two encoders. In FIG. 7 encoders for client A are shown. The first encoder is for their own real dataset samples (labeled as 713), and another for the paired synthetic samples (labeled as 715). The synthetic sample (or synthetic row) is generated based on the real sample it is being paired with. This means that the synthetic row (723) includes the same values of the one or more shared features as the values of the shared features in the real row (711). The shared portion of the two samples 723 and 711 are shown with line hatching. We can compare this approach with the vertical learning approach, which includes asymmetric encoders for different features spaces and concatenates the encoded embeddings based on the shared sample ID space. However, in our federated transfer learning environment sample IDs are not available. Therefore, the technology disclosed conditions the input to the generator on the shared features of the real sample by setting the same values for synthetic row and real sample row. There are two assumptions of the proposed technique 1) there needs to exist a shared input feature space across the clients, and 2) both clients know which features are being shared.

The technology disclosed can generate input to the classifier 730 which is a fusion of the embeddings (or spatial representation) produces by the two encoders 713 and 715. These outputs are produced from real data row 711 accessible to the computing device and synthetic data row 723 which is generated by the trained generator. The generator generates the data using shared features. The shared features are common across datasets of multiple computing devices. Therefore, given a real sample, we use the imported generator from the other client to synthesize a row from the other client conditioned on the real row's shared features. This method assumes that there exists non-linear interactions between the shared feature space and the non-shared feature space, and can be used for enhancing the conditional probability of the common feature space. The synthetic row 723 output from the generator 621 is embedded through the synthetic sample encoder 715, producing the embedding 731 which is concatenated with the embedding 735 of its paired real row sample 711 encoded from a real sample encoder 713. The concatenated embedding 741 can be generated by concatenating the output 731 from encoder 715 and the output 735 from the encoder 713 which takes in as input the real sample data row. The output embeddings 731 and 735 can be concatenated or summed to generate the embedding 741 which is then given as input to the classifier 750 to generate the classification. The technology disclosed uses a trained generator to generate synthetic data for a client which is similar to dataset of the other client. Therefore, the technology disclosed is able to generate an input based on fusion of two features spaces. The input to the classifier based on fused feature space can provide a bigger view of the feature space which is not available to the classifier of a client as data from other clients is not shared.

Technique #4. Heterogeneous Domain Adaptation with Optimal Transport

Figure 8A:
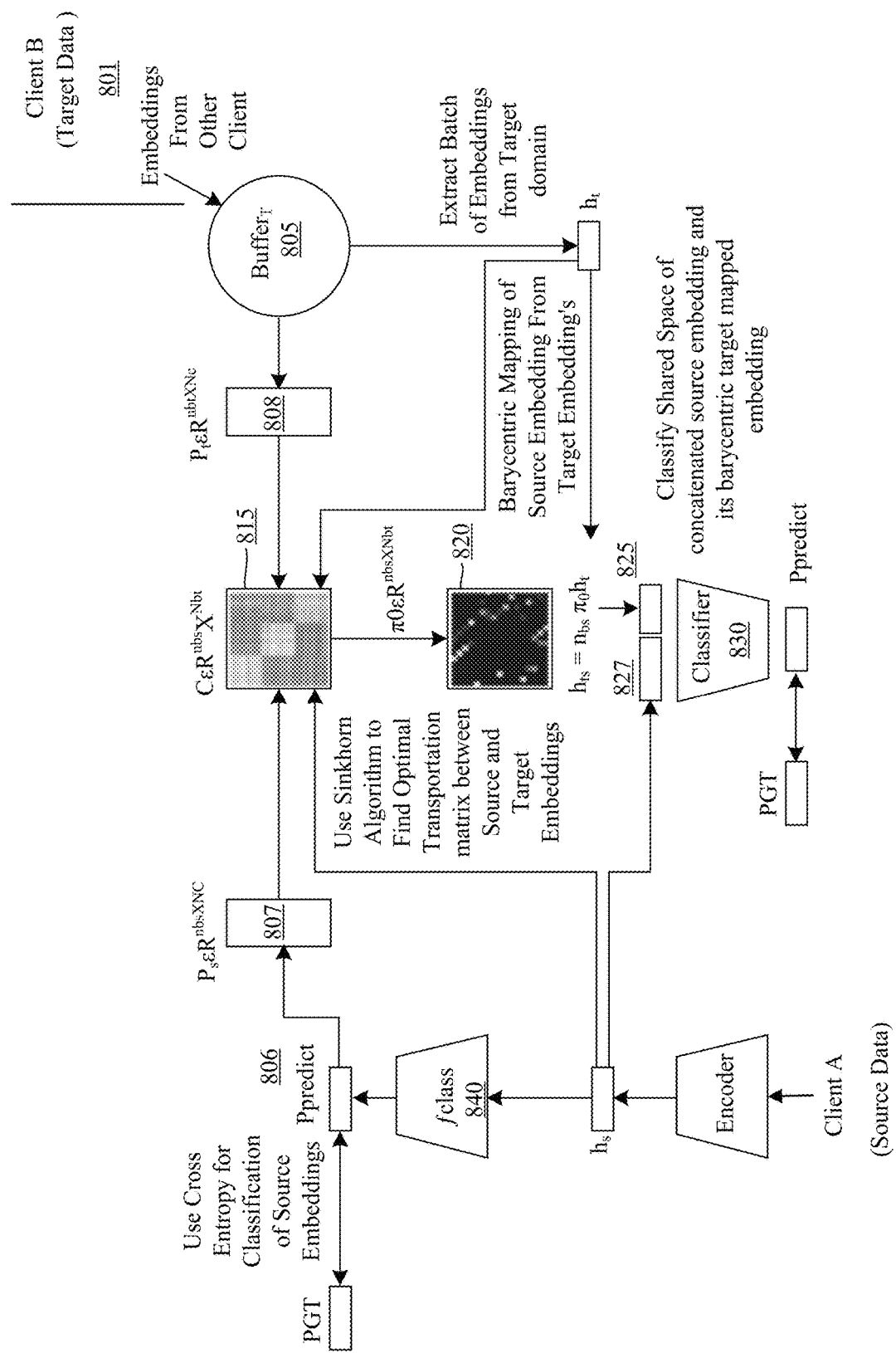
FIG. 8A is an example architecture for mapping data distribution from one client (or computing device) to another client (or computing device) using optimal transport for federated transfer learning.

Optimal transport theory has been applied to compare one probability distribution with another probability distribution as well as producing optimal mapping between probability distributions to minimize cost functions. FIG. 8A presents a high-level overview of our proposed technique which uses concepts from optimal transport (OT) theory. We have two data distributions in two tabular datasets $D_a$ and $D_b$. Suppose client B has access to tabular dataset $D_b$ with target data distribution 801 and client A has access to tabular dataset $D_a$ with source data distribution 802. For representing probability distributions, we can use probability mass function (PMF) for the data in columns for each dataset $D_a$ and $D_b$. For discrete random variables PMF is also referred to as probability distribution. The events with higher likelihood have higher mass in the probability distribution.

Figure 8B:
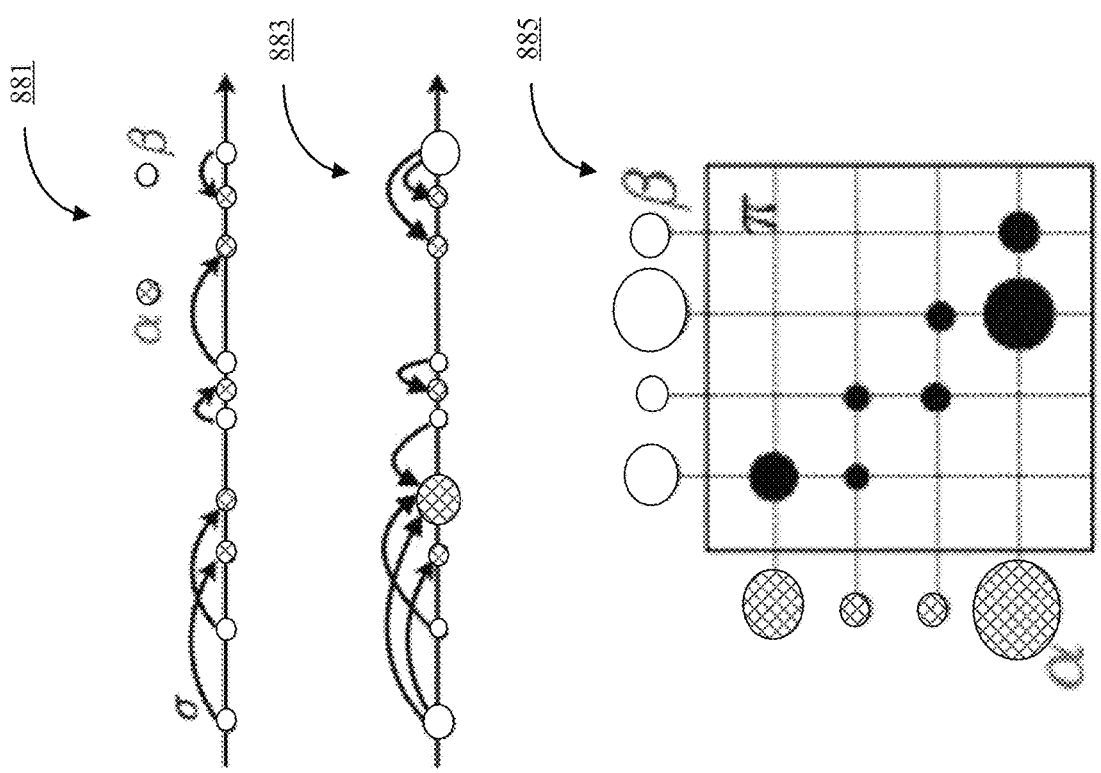
FIG. 8B presents examples of data distribution with various levels of complexity.
Figure 9:
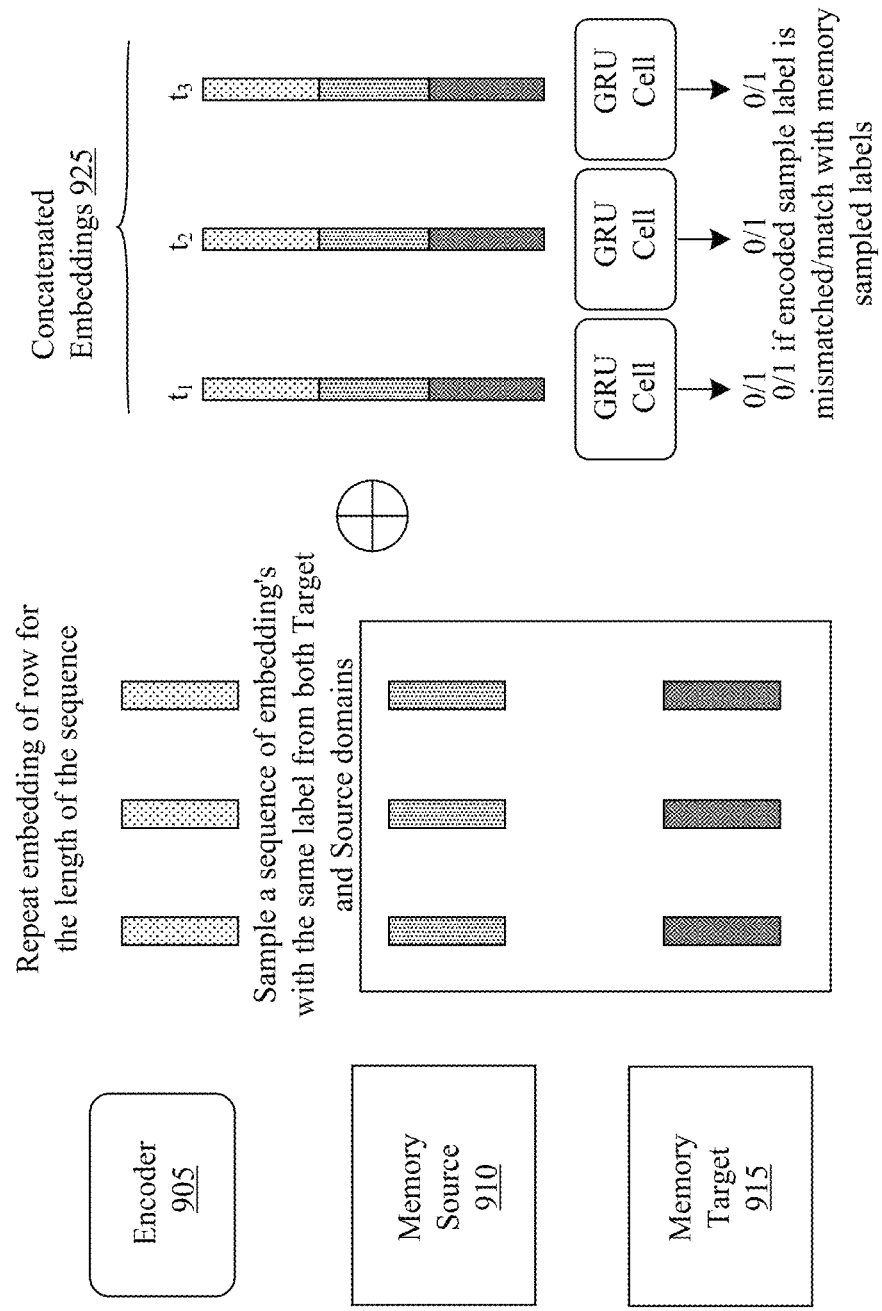
FIG. 9 presents an example architecture for federated transfer learning using prototype class networks.

Optimal Transport technique determines an invertible transport plan between two different distributions. For instance, suppose we have two discrete distributions both with N points. The transport plan is an N×N matrix that transports probability mass between two distributions, while also minimizing a specific cost function. The idea is to map one probability distribution to another such that the cost of transforming one probability to the other is minimized. We have shown example distributions in FIG. 8B to show the complexity of the problem as the number of samples increase along with the dimensions. Graphical illustration 881 presents a relatively simple mapping of a distribution B to another distribution a when both distributions are 1 dimensional (1D). The distributions in this example can represent grayscale images. A simple sort algorithm can be applied and mapping can be performed in linear time. For higher dimensional data, it can require a combinatorial optimization method to determine a mapping that minimizes the cost moving one distribution to another distribution. Also, in case of weighted distributions, multiple mappings are possible as shown illustration 883. To show multiple mappings between data points in two distributions a permutations matrix 885 can be used. The permutations matrix can show multiple transportation plans between two distributions.

We are interested in finding a transportation plan that meets two constraints: (1) it reduces (or minimizes) the cost of transportation and (2) it ensures that the probability mass being transported to a specific point equals the mass of that point in the distribution. In this way, we can preserve as much as possible the probability distribution from one client (target distribution) when mapping the distribution to another client (source domain). The classifier in the source domain can be trained by fused feature space. This fusion of feature space is based embeddings of real data rows for which the source (or real) distribution is available in the dataset and mapped source embeddings' using distribution of target embedding. In this way the classifier can be trained for the dataset which is not available at the client or the computing device.

For the first constraint, we use a cost function that represents a distance kernel between two points in either distribution. The purpose of the cost function is to measure similarity between points across distributions. This is to encourage points that are similar and have a higher probability mass to be exchanged than points that are dissimilar. The cost matrix can be thought of as a constraint set upon finding the optimal transport plan.

For the second constraint, it is required that the mass that is being transported to a specific point equals the mass of that point in the distribution. In one implementation, we make a simplifying assumption that all of the samples in datasets of both clients are discrete and uniformly distributed, meaning that each point in the distribution has the same probability mass. When probability mass for all points in a distribution is not the same, we do not want to assign higher/lower probability mass to a point when creating an optimal transportation matrix of N by N between two discrete distributions of size N. The transportation matrix (or the transport matrix) is also referred to as a coupling matrix.

After a transportation matrix is computed, each point can be reconstructed using a weighted combination of points in the other distribution. This mapping is performed using Barycentric coordinates. We do not compute the transportation matrix between all points in both datasets, as the size of the matrix scales quadratically. To circumvent this issue, we follow this approach (Xei et al. 2019, "On Scalable and Efficient Computation of Large Scale Optimal Transport", available at <<arxiv.org/pdf/1905.00158.pdf>) to compute a transportation matrix between batches of client embeddings. This involves first training a classifier for several epochs to allow for classification clustering in the embedding space. The encoder embeddings from each client are stored in an embedding matrix and are exchanged after several epochs. Once the embedding matrices are exchanged, the optimal transport (OT) matrix can be computed between randomly sampled batches between the other clients embedding matrix and the batch of encoded embeddings from the real dataset. Referring to FIG. 8A, we can see that client B (or computing device B) sends batches of embeddings in a buffer 805. The embeddings from the target domain (at the client B) include their respective classification labels.

Cost Matrix

The cost matrix is used to constrain the modes of freedom of the transportation matrix. We have used several different ways of computing a cost matrix. As mentioned above, we have label information across both datasets $D_a$ (at client A) and $D_b$ (at client B). The embeddings or batches of embeddings received from other client include the classification labels. We use the labels of embeddings to determine similarity between embeddings of the two clients. This involves several different approaches that can be used create a loss function. One such way is to calculate a cross entropy score between the predicted probabilities (806) of each embedding in the source client with the ground truth label 808 of the other client. Each embedding has a ground truth or known class label with a probability of 1.0 and a probability of 0.0 for all other labels. Calculating cross entropy scores 807 and 808 (or cross entropy loss) respectively for the two batches of embeddings i.e., source (client A) and target (client B), attempts to align embeddings across clients with similar classifications to have higher similarity in the cost matrix "C" 815.

Another method to calculate cost matrix 815 involves minimizing, and maximizing the Euclidean distance between embeddings with the same and different classification. The cost matrix would then be the L2 distance between embeddings. The cost matrix (815) can provide distance between source (client A) and target embeddings (client B) based on the type of cost function used. However, we need an optimal transport plan that minimizes the cost of mapping one batch of embeddings to the other. We present details of finding the optimal transport plan in the following section.

Optimal Transportation Plan

We use Sinkhorn function (Marco Cuturi, 2013, "Sinkhorn Distances: Lightspeed Computation of Optimal Transportation Distances", available at <<arxiv.org/abs/1306.0895>>) to find the optimal transportation matrix (or the coupling matrix) between batches of source client and target client embeddings. The solution to optimal transport problem between two distributions can be determined by iterative learning. The advantage of Sinkhorn distance in calculating the distance between two distributions is described below.

Suppose P and Q represent the source (or predicted) distribution and the target (or actual) distribution with m classes respectively. These two probability distributions can be represented by Equations (1) and (2).

$$P = \{(p_1, wp_1), \ldots, (p_m, w_{pm})\} \quad \text{Equation (1)}$$

$$Q = \{(q_1, wp_1), \ldots, (q_m, w_{pm})\} \quad \text{Equation (2)}$$

Whereas $p_i$ is the label in P, $w_{pi}$ is the probability of $p_i$ in P, $q_i$ is the label in Q, and $w_{qj}$ is the probability of $q_j$ in Q. Here we set $p_i=i$ and $q_j=j$ to represent the different labels. The value of $w_{pi}$ is determined by the output the classifier (840). The value of the $w_{qi}$ is determined based on the ground truth label. For a specific embedding if i is the real class of it, then we set $w_{qi}=1$ otherwise we set $w_{qi}=0$.

The goal of optimal transport plan technique is to measure the work of transforming one distribution (Q) into another (P). In order to measure this work, two matrices are introduced: the distance (or cost) matrix and the transportation matrix. We have already calculated the distance matrix which is the "cost matrix" 815 described above. Each element $d_{ij}$ in the cost matrix represents the cost of moving the point $q_j$ in distribution Q to a point $p_i$ in distribution P. Each element $f_{ij}$ in the transportation matrix "F" indicates the probability mass that needs to be assigned when moving $q_j$ to $p_j$. As we can imagine, there are a large number of possible transportation matrices that can be generated. The goal is to find an optimal transportation matrix that minimizes the work performed when transforming the distribution Q into distribution P. To achieve this goal, we apply the Sinkhorn function which can find an optimal transportation matrix F* that minimizes the overall cost function. The optimal transportation matrix (also referred to as optimal coupling matrix) is shown with a label 820 in FIG. 8A. The output of the Frobenius inner product of cost matrix and the transportation matrix, is the optimal transportation policy $\pi_0$ which is then used to map the target embedding $h_t$ to the source client's domain resulting in embedding $h_{ts}$.

Once we have optimal transportation policy $\pi_0$, we apply Barycentric coordinates to generate mapped source embedding $h_{ts}$ from target embeddings $h_t$ using the optimal transportation policy $\pi_0$. This mapped embedding 825 is concatenated with the source embedding 827, and is forwarded to another classifier 830 that is different from the original one used to calculate the predictions used in the cost matrix. The output from the classifier 830 can then be compared with the ground truth labels. Therefore, the concatenation of mapped embedding 825 and source embedding 827 presents a fusion of feature space for training classifiers on clients or computing devices in a federated learning environment where clients do not share their data with other clients. In this technique the fusion of feature space is achieved by mapping the target distribution of samples to a source embedding space.

Entropic regularization can also be used for better generalization when calculating the optimal transportation matrix. Introducing entropic regularization, the transport problem is turned into a strictly convex problem that can be solved with Sinkhorn's matrix scaling algorithm which is faster than other transport solvers. More specifically, the more entropic regularization we weigh into the loss, the more candidates the transportation matrix will involve. As the regularization coefficient is increased a slower convergence is observed and computational complexity increases.

Barycentric coordinates are commonly used in the field of computer graphics. We use Barycentric coordinates to map the target embedding using reference points in the source embedding space. Barycentric coordinates can be explained using a simple example of a triangle with vertices A, B and C. A point of the form $Q=(1-t)A+tB$, where $0 \leq t \leq 1$ is on the edge between A and B. Similarly, a point of the form $R=(1-s)Q+sC$ is on the line segment between Q and C if $0 \leq s \leq 1$. Expanding the above, we get the following:

$$R = (1-s)(1-t)A + (1-s)tB + sC \quad \text{Equation (3)}$$

The coefficients in Equation (3) are $(1-s)(1-t)$, $(1-s)t$, and s. For $0 \leq s, t \leq 1$, the three coefficients are positive. When we sum the three coefficients we get "1". The combinations of multiple points are only defined when the coefficients sum to one. Therefore, the points of the triangle are of the form, $\alpha A + \beta B + \gamma C$, where $\alpha + \beta + \gamma = 1$, and $\alpha + \beta + \gamma > 0$. Points where $\alpha = 0$, lie on the edge BC, points where $\beta B = 0$ lie on the edge AC, points where $\gamma = 0$ lie on the edge AB. If $P = \alpha A + \beta B + \gamma C$, then the numbers $\alpha$, $\beta$, and $\gamma$ are called the Barycentric coordinates of P with respect to the triangle ABC. Barycentric coordinates can provide position of an arbitrary point based on some reference points. We can get the position by taking adequately weighted sum of the said references. Therefore, the Barycentric coordinates $\alpha$, $\beta$, and $\gamma$ can be used to calculate the position of point P as a weighted sum of A, B, and C as shown above. The example of Barycentric coordinates, presented above, can be extended to positions in higher dimensional spaces. Further details of Barycentric coordinates are presented in Bodonyi et al. 2020, "Efficient object location determination and error analysis based on barycentric coordinates" available at <<vciba.springeropen.com/articles/10.1186/542492-020-00052-y>> and in "Computer Graphics: Principles and Practice", $3^{rd}$ Edition by Hughes et al.

Technique #5 Prototype Class Networks

The prototype class networks technique for federated machine learning relies on the shared labels space between the two clients to link the feature spaces. This can be done through a variety of methods. We present one example approach which addresses the federated learning of clients. There are two stages in the process.

During a first stage of this technique the system trains encoders (905) and classifier blocks for label classification, separately at each client (or computing device). This can be done for up to 5 epochs, or until convergence of the validation accuracy of each client. After the first stage, each client can store their row embeddings paired with their target label (910). The index in which the embedding and target pair is stored is assumed to be uniformly distributed. This ensures shuffling of the memory buffer when the other client uses ordinal sampling (index:0,1,2,3,4→randint(0, 4)).

During a second stage, the embedding matrices are exchanged between clients so that the other client has access to the target paired index shuffled embeddings (915). Note that there is no sample wise pairings between the source and target domains (i.e., client A and client B). A client does not have access to samples of the other client and there is no overlap between samples (or rows) across datasets of clients.

After the clients have received the target paired embeddings from other clients, they train a discriminator to differentiate between true and false pairs of embeddings between the source and target domains. This can be done through concatenating a single pair of label paired target and source domain embeddings (925). In another implementation, the system can classify a sequence of randomly sampled label tagged source and client training data.

For testing inference, we replace the trained source embeddings with the validation set embeddings, and calculate their paring scores with label specified embeddings in the target domain. We do this for each class and ensemble the confidence scores of similarity from the discriminator for each class bundle.

Experimental Results

We now present results of applying the above-described five techniques of federated learning to the three datasets i.e., US-Accidents, Covertype and US-Adult Census.

Technique #1: Maximum Mean Distance and Covariance Loss

FIGS. 10A to 10F present graphical illustrations of performance results when the maximum mean distance and covariance loss technique is applied to the three datasets. The graphs in FIGS. 10A to 10F exhibit the testing accuracy on both clients (client A and client B) for all three datasets.

Figure 10A:
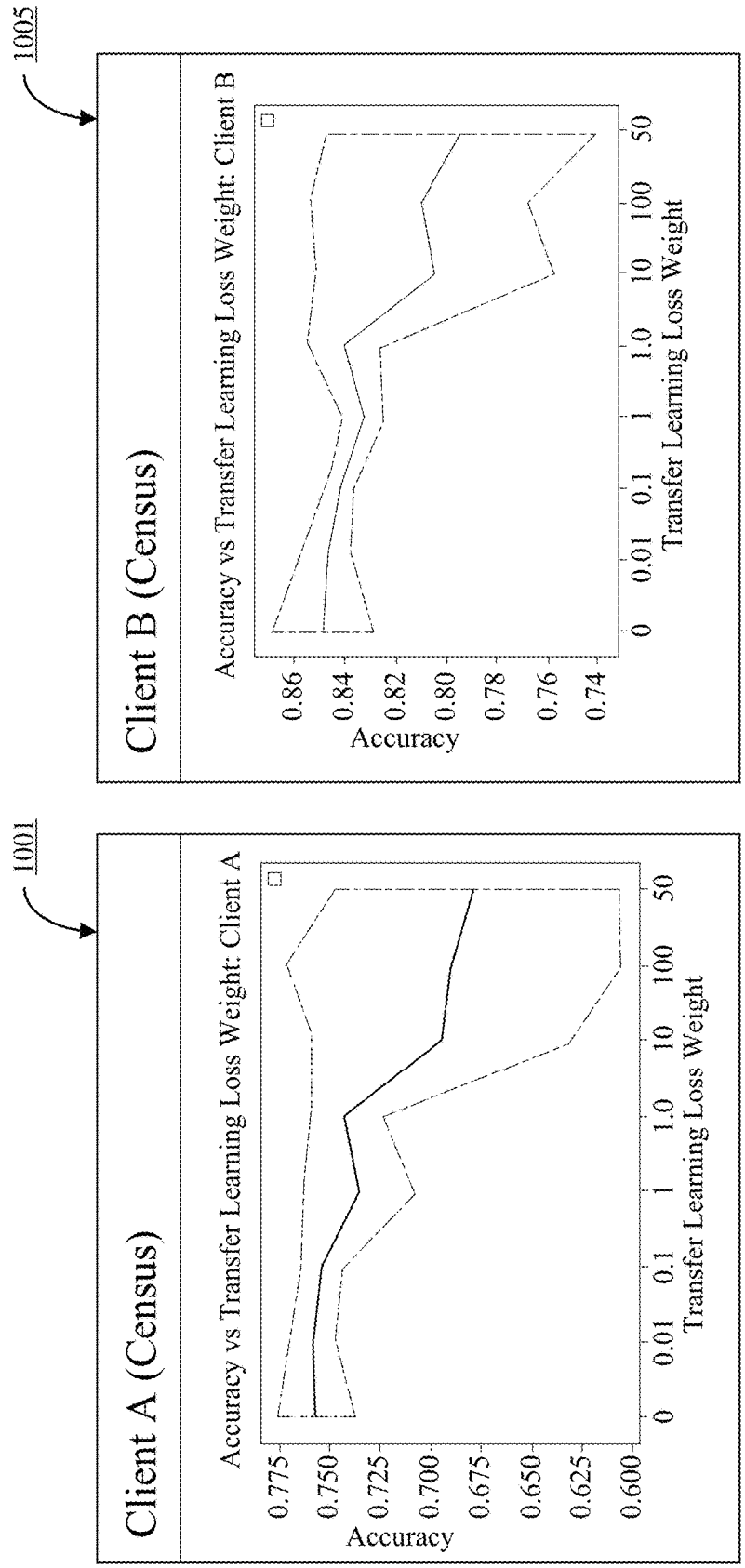
FIGS. 10A-10F present graphical illustrations of performance results when a maximum mean distance and covariance loss technique is applied to three datasets.
Figure 10B:
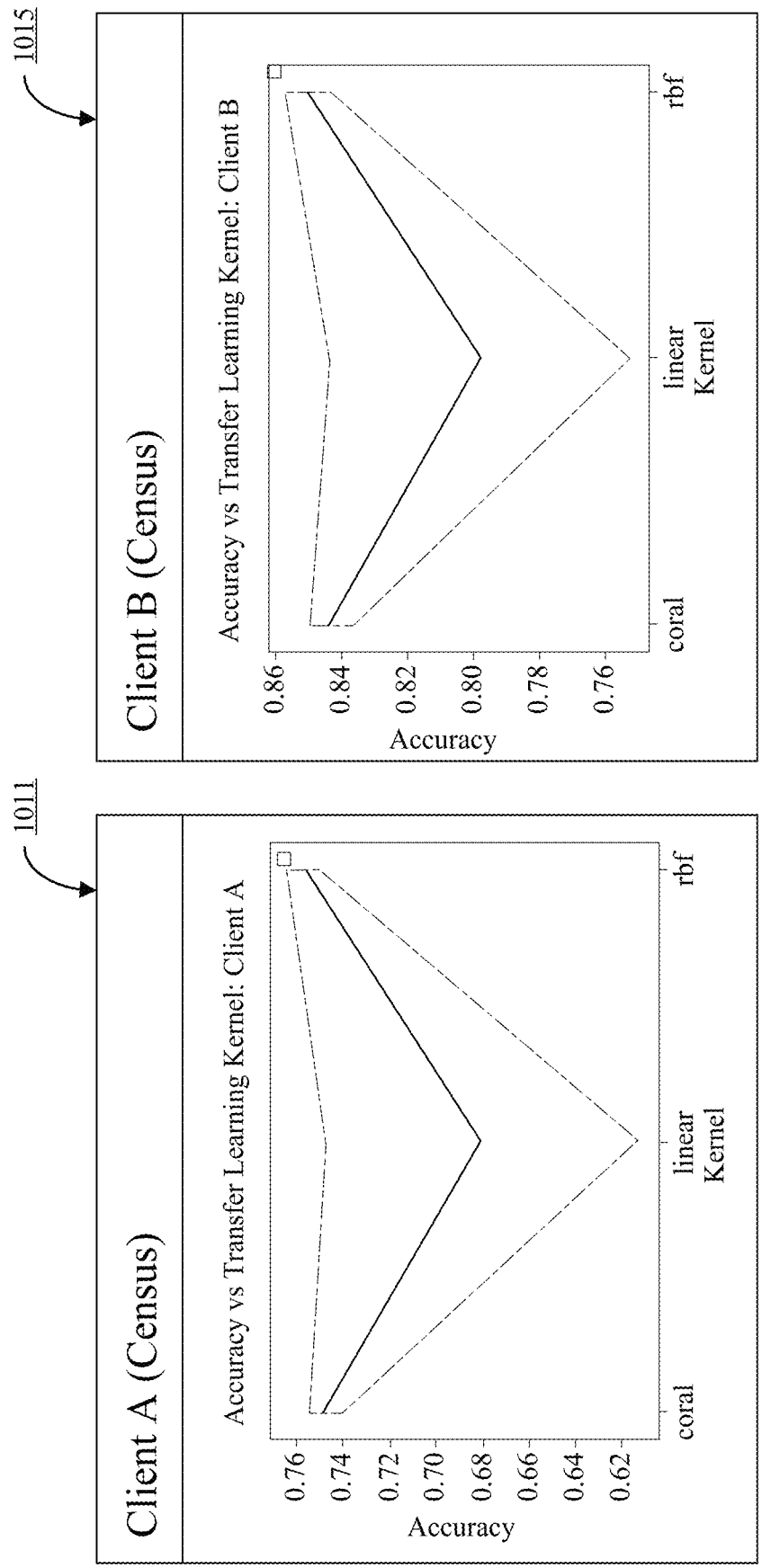
Figure 10C:
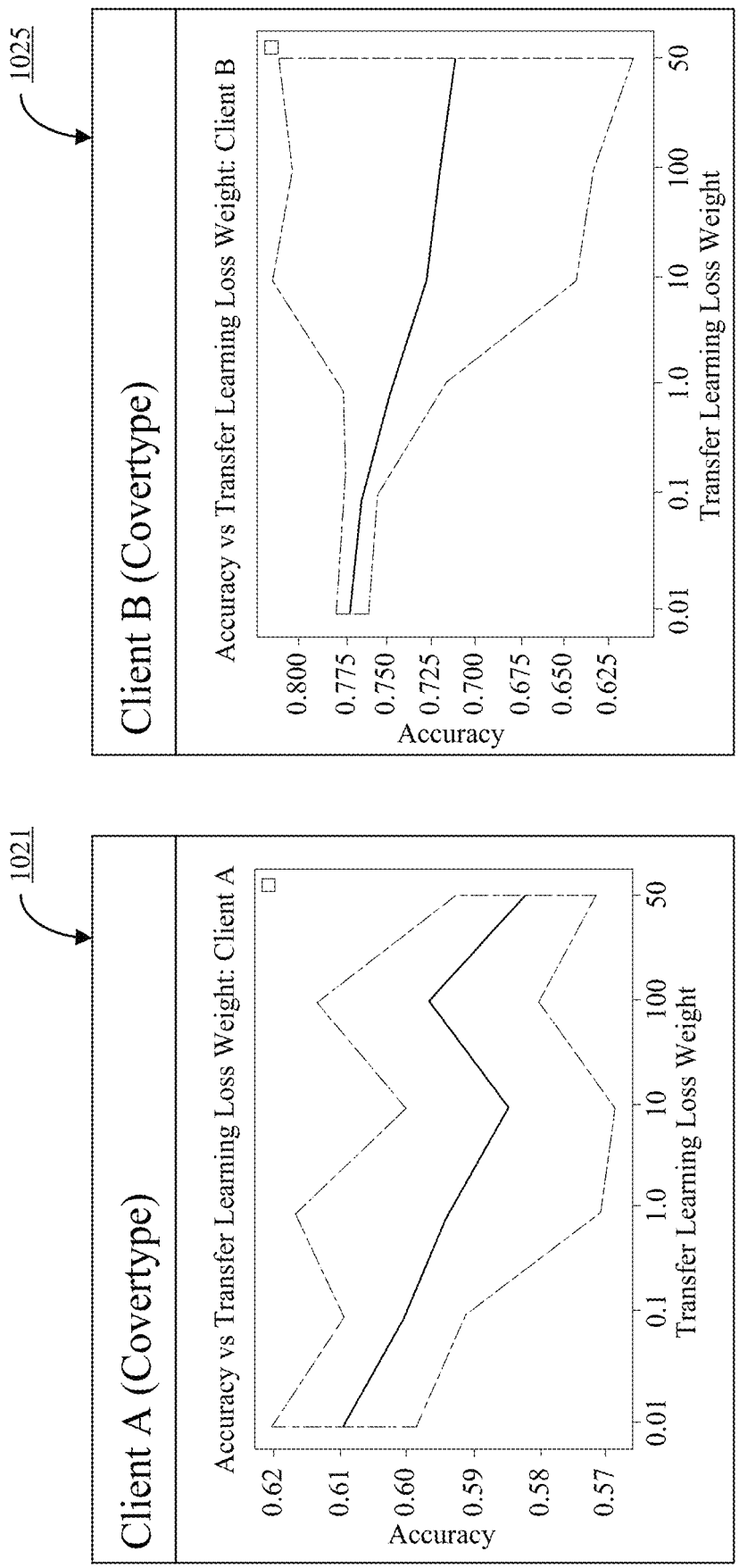
Figure 10D:
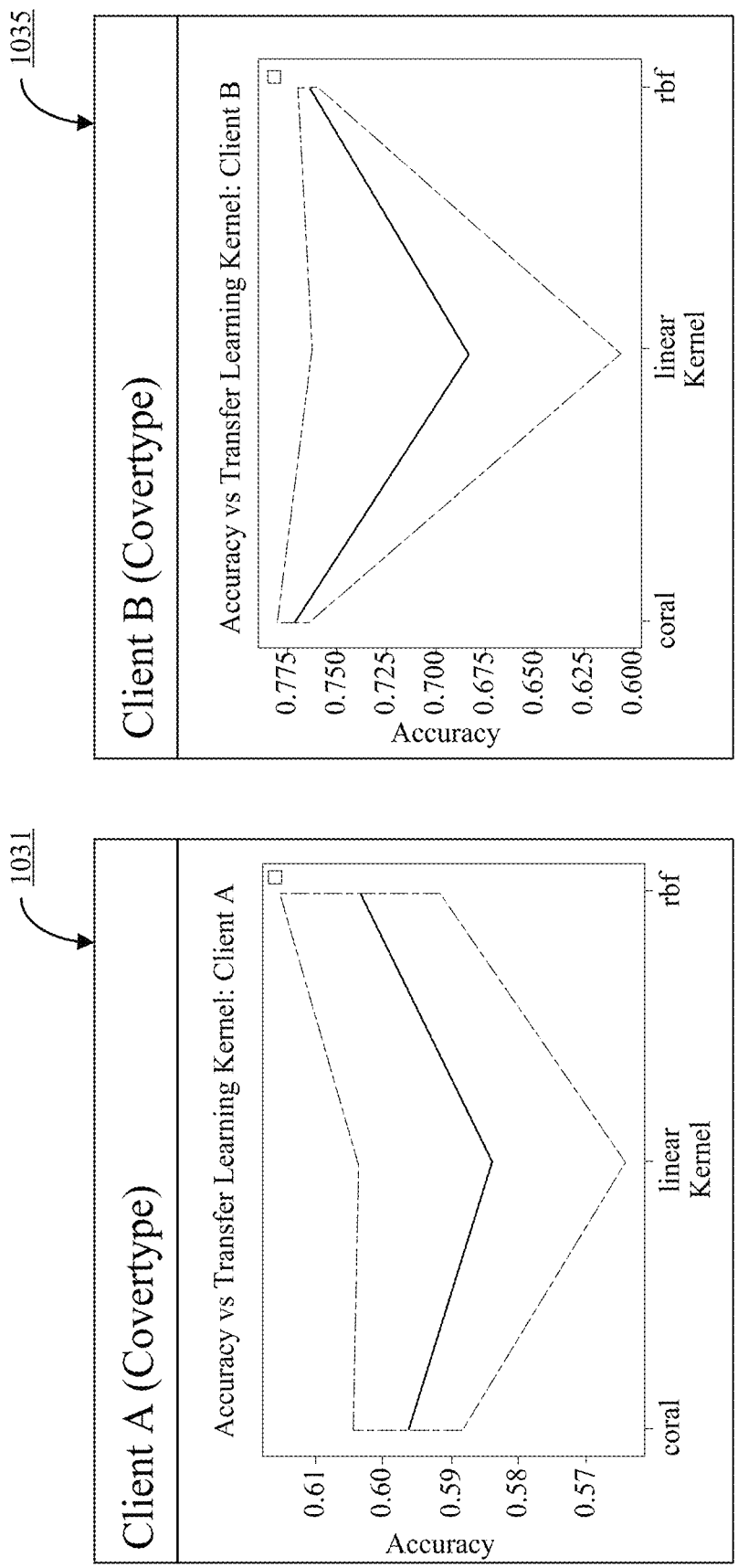
Figure 10E:
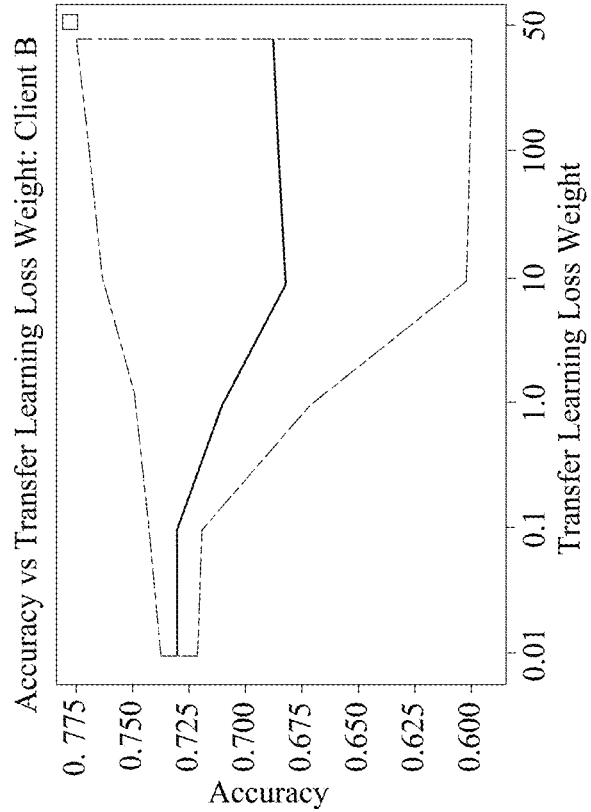
Figure 10E:
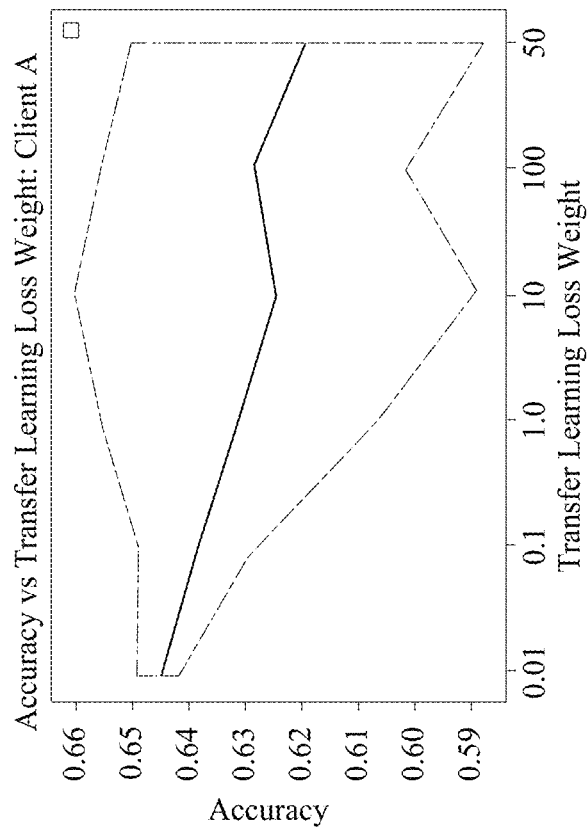
Figure 10F:
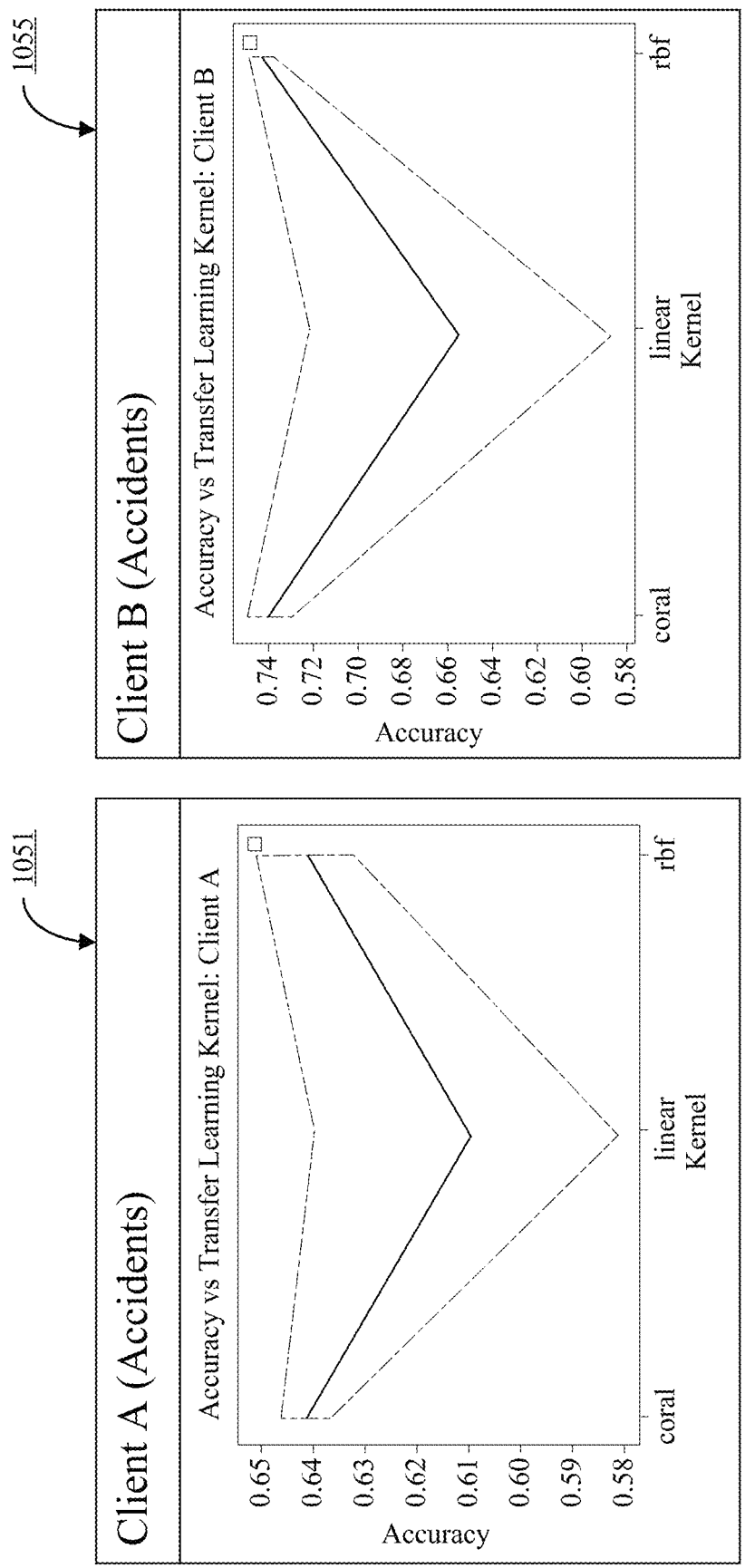

The graphs in FIGS. 10A, 10C, and 10E represent the weight of the transfer learning loss with respect to the classification loss. This weight controls the magnitude of the divergence loss between the two client embedding samples. For example, the graphs 1001 and 1005 illustrate that accuracy decreases as the weight of the training loss increases for both clients A and B for the Census dataset. We can see that accuracy for client B is higher than client A. This is because the higher ranked features (indicating higher importance) were assigned to dataset for client B. The outer boundary in broken lines in each graph shows the confidence of the model. If the area in the boundary is large this means that model is not confident in predictions. The graphs 1021, and 1025 in FIG. 10C present similar results for both clients for Covertype dataset. The graphs 1041 and 1045 present the same results for both clients for Accidents dataset.

The graphs 1011 and 1015 in FIG. 10B present the type of divergence loss being used on the embeddings for both clients for the Census dataset. While linear and radial basis functions refer to the kernels used on top of MMD, coral represents the Frobenius norm between two batches of embeddings from either client. The graphs 1031 and 1035 in FIG. 10D present the same results for Covertype dataset for both clients. The graphs 1051 and 1055 present the same results for both clients for the Accidents dataset. These results show minor improvement over baseline model. This could be due to the fact that MMD and CORAL are focused on aligning between two marginal distributions, which has been shown to exhibit positive transfer learning for homogenous feature spaces. These experiments provided a first glimpse at the relative difficulty of heterogeneous domain adaptation, relative to its homogenous cousin.

Technique #2: Centroid Matching Network Transfer

Figure 11A:
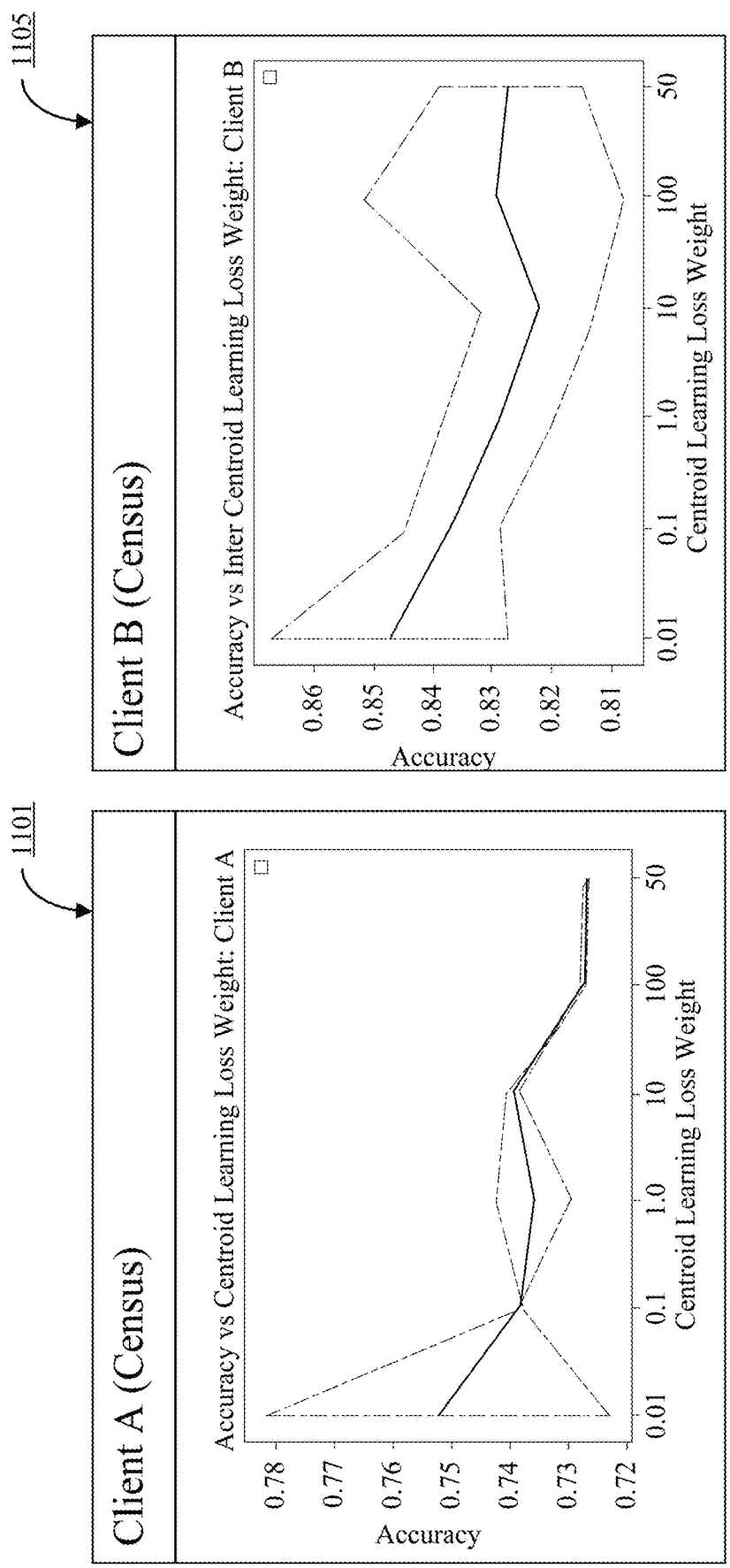
FIGS. 11A-11C present graphical illustrations of results for testing accuracy on each client based on the inter and intra centroid learning.
Figure 11B:
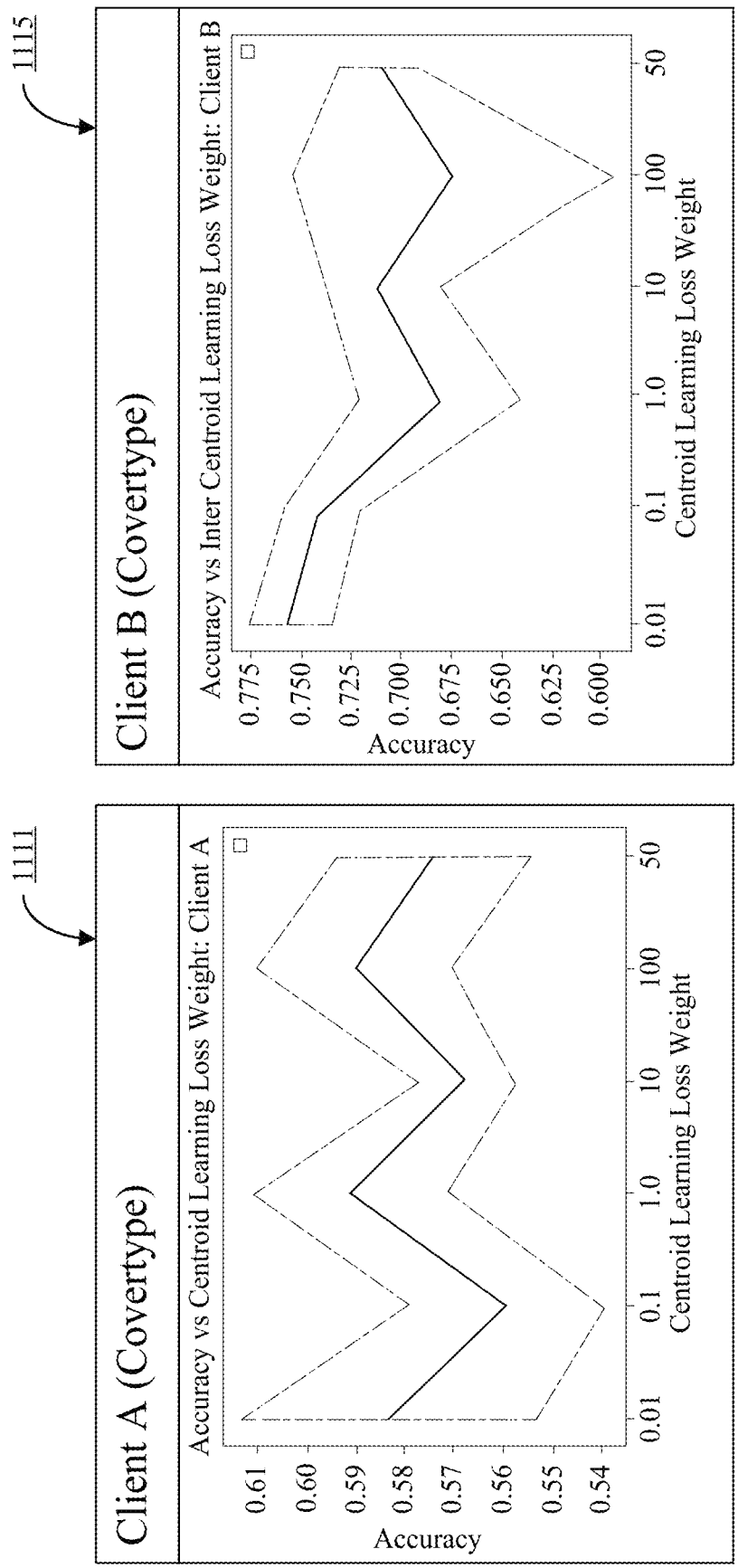
Figure 11C:
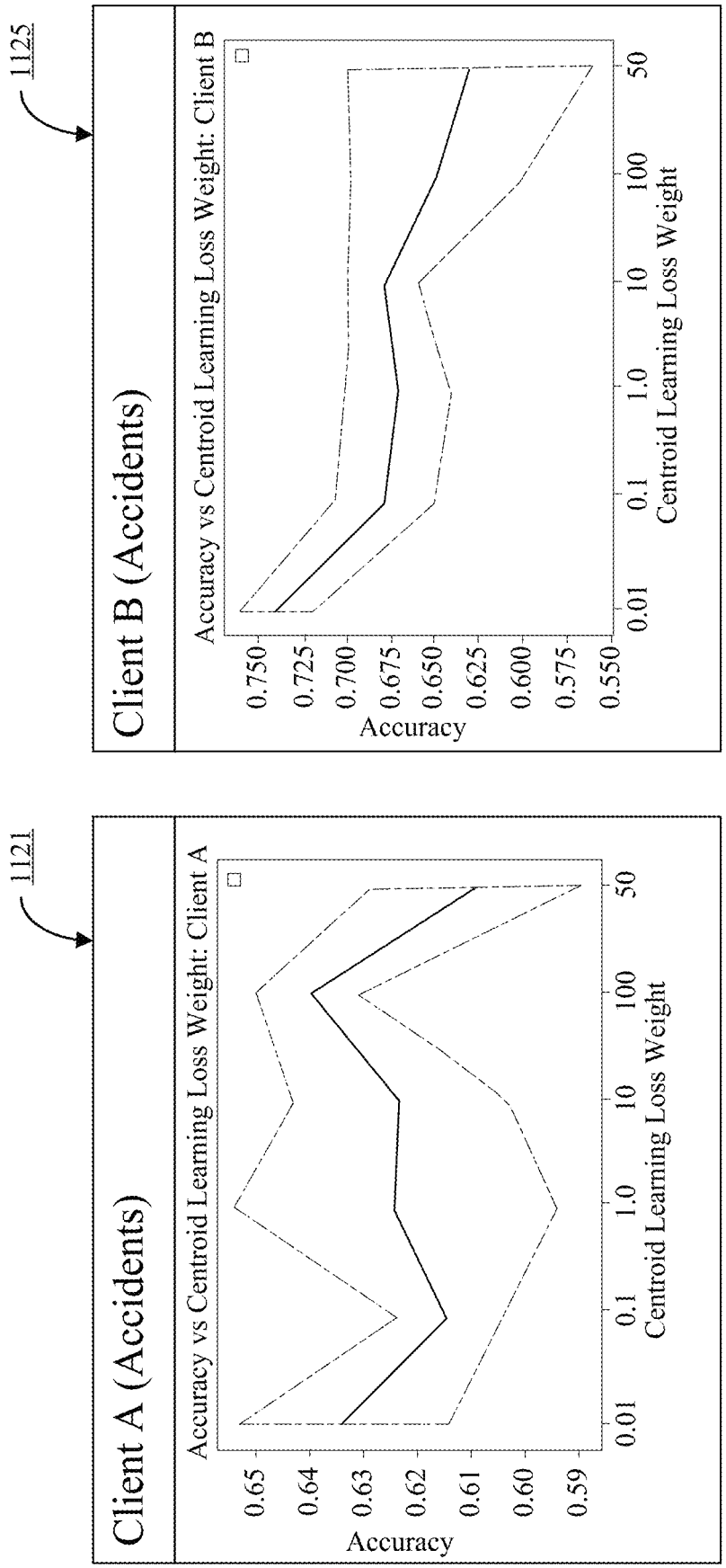

FIGS. 11A to 11C present graphical illustrations of results for testing accuracy on each client based on the inter and intra centroid learning loss weight with respect to the cross-entropy loss. The negative slopes determine that larger weights have contributed to a greater severity of negative transfer learning. This could be due to a various number of factors. We also observed that the centroid loss would converge to a lower value than it had started off, which means that the centroids across either datasets are at a closer Euclidean distance from each other. We used intra-cluster loss to help bring class conditional embeddings clusters closer to their class mean centroids. Graphs 1101 and 1105 show represent the weight of the transfer learning loss with respect to the classification loss for the two clients for the Census dataset. We can see that client performs better than client A for the reason presented above i.e., its dataset comprises of features with higher importance. FIG. 11B presents graphs 1111 and 1115 presenting similar results for Covertype datasets for both clients. FIG. 11C presents graphs 1121 and 1125 presenting similar results for Accidents dataset for both clients.

Technique #3: Conditional Tabular GAN

FIGS. 12A to 12G present performance results for the conditional tabular GAN technique. The graphs in these figures show metrics of the conditional tabular GAN we had trained for Census dataset. Similar results were obtained from Accidents and Covertype datasets as they have had similar training trends therefore, we do not present those results.

Figure 12A:
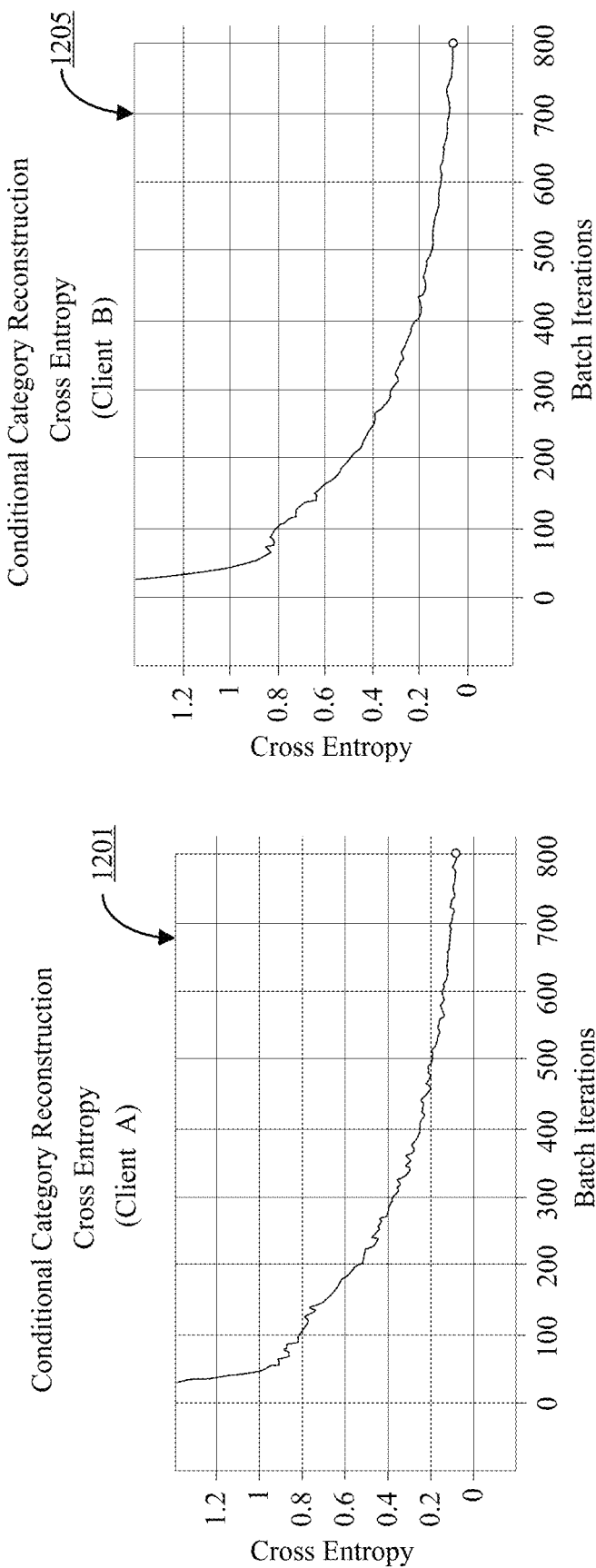
FIGS. 12A-12G present performance results for the conditional tabular GAN technique

FIG. 12A presents graphs 1201 and 1205 illustrating conditional category reconstruction for client A and client B respectively. The conditional category reconstruction has shown to converge nicely, which means that the discrete variables for the synthetic rows are being accurately reconstructed.

Figure 12B:
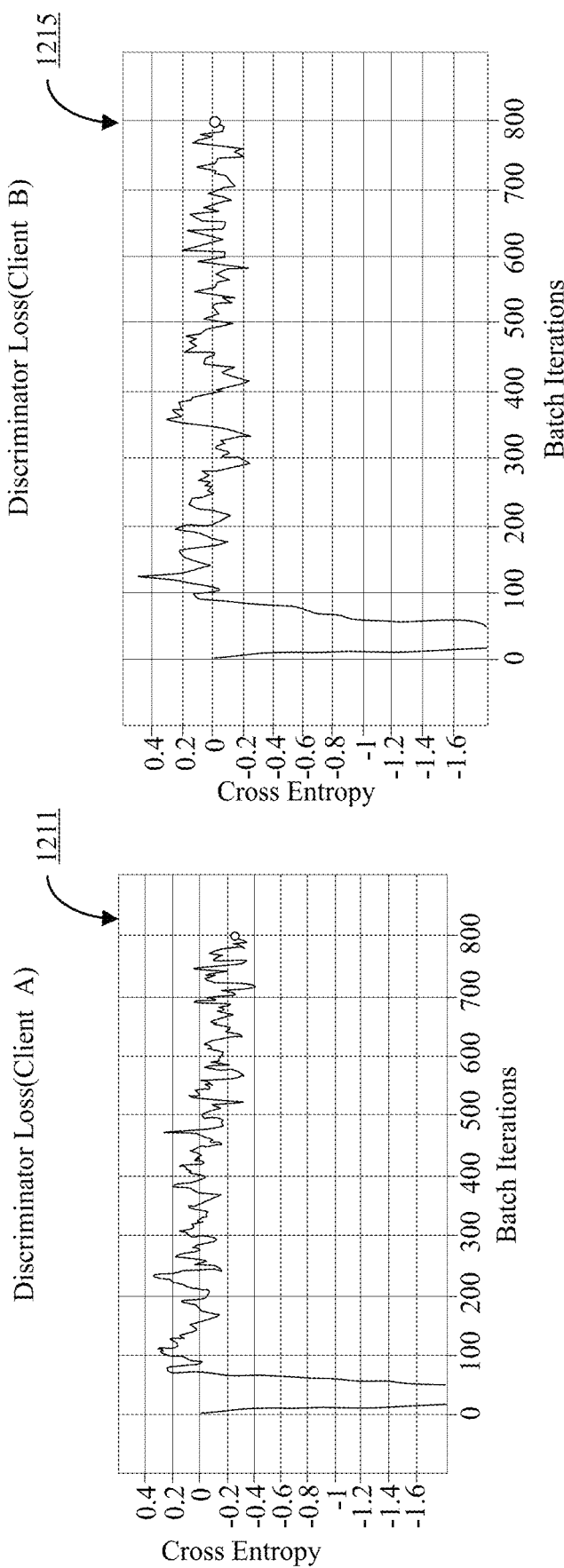

FIG. 12B presents graphs 1211 and 1215 illustrating discriminator loss for client A and client B respectively. Part of observing the CTGAN's success is through its discriminator loss, which is the difference between the discriminator's score for a real sample and the synthetic sample. Both clients have their discriminator loss converge at around 0, which represents a Nash equilibrium. More specifically, a Nash equilibrium is present when the discriminator is unable to differentiate real and synthetic (or fake) conditional samples at an improved rate over random baseline.

Figure 12C:
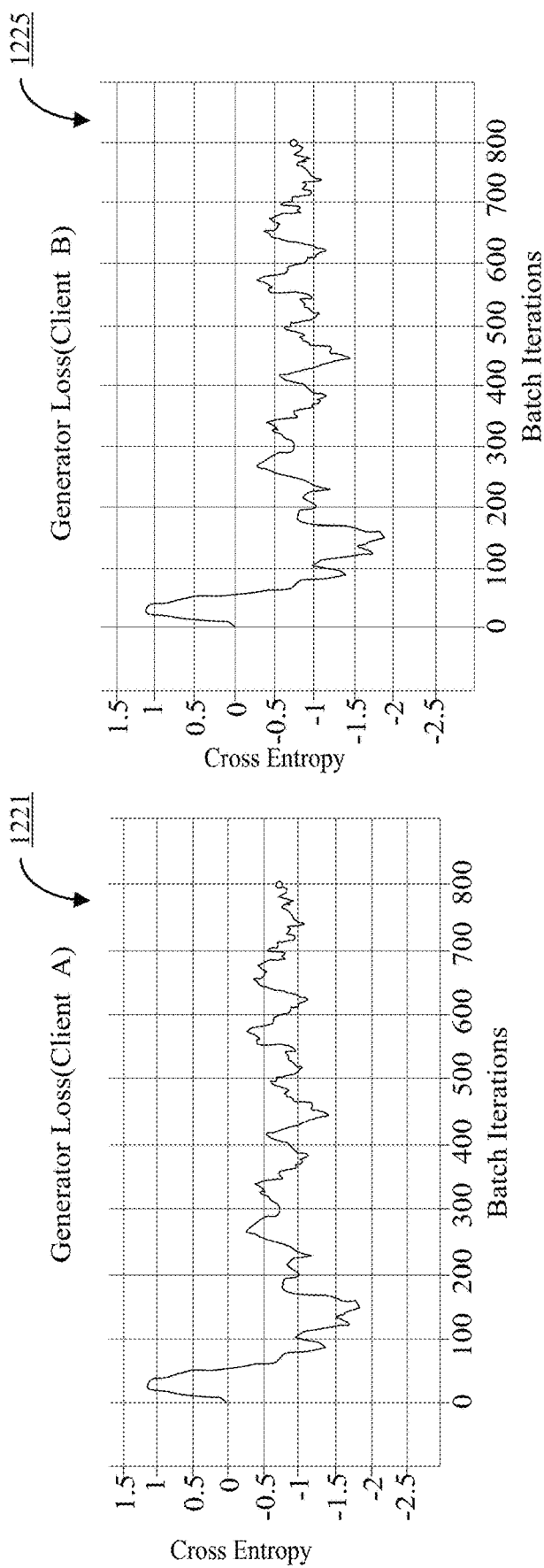

FIG. 12C presents graphs 1221 and 1225 illustrating generator loss for client A and client B respectively. The generator losses also converge below 0, which means that synthetic batches are on average scored as real batched samples.

Figure 12D:
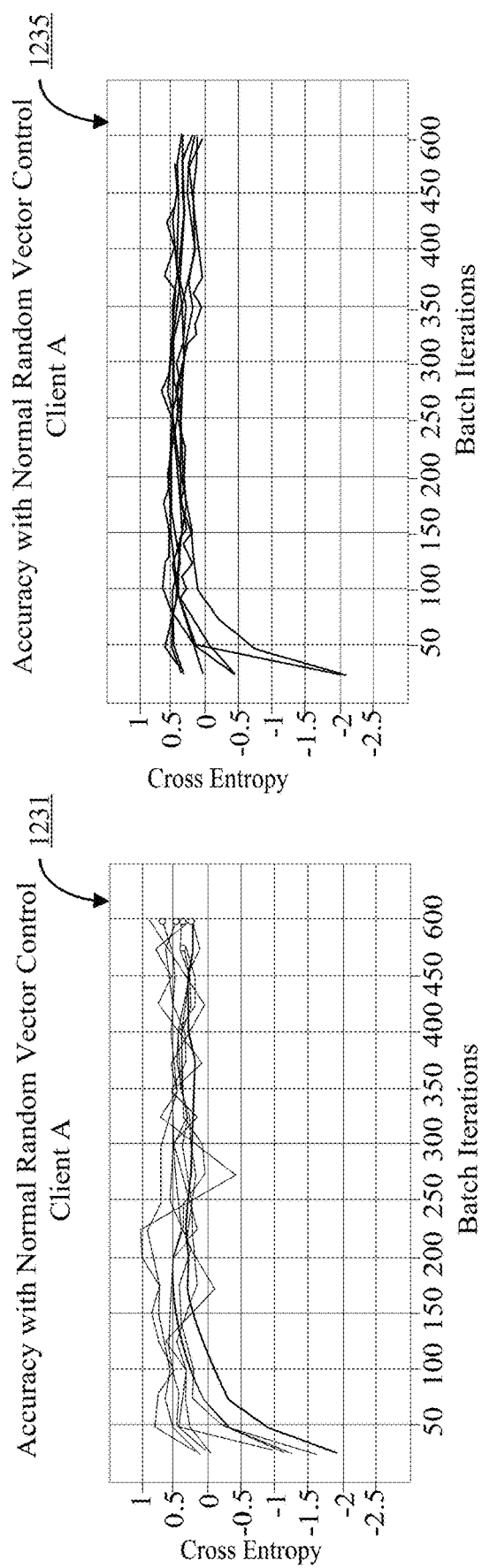
Figure 12E:
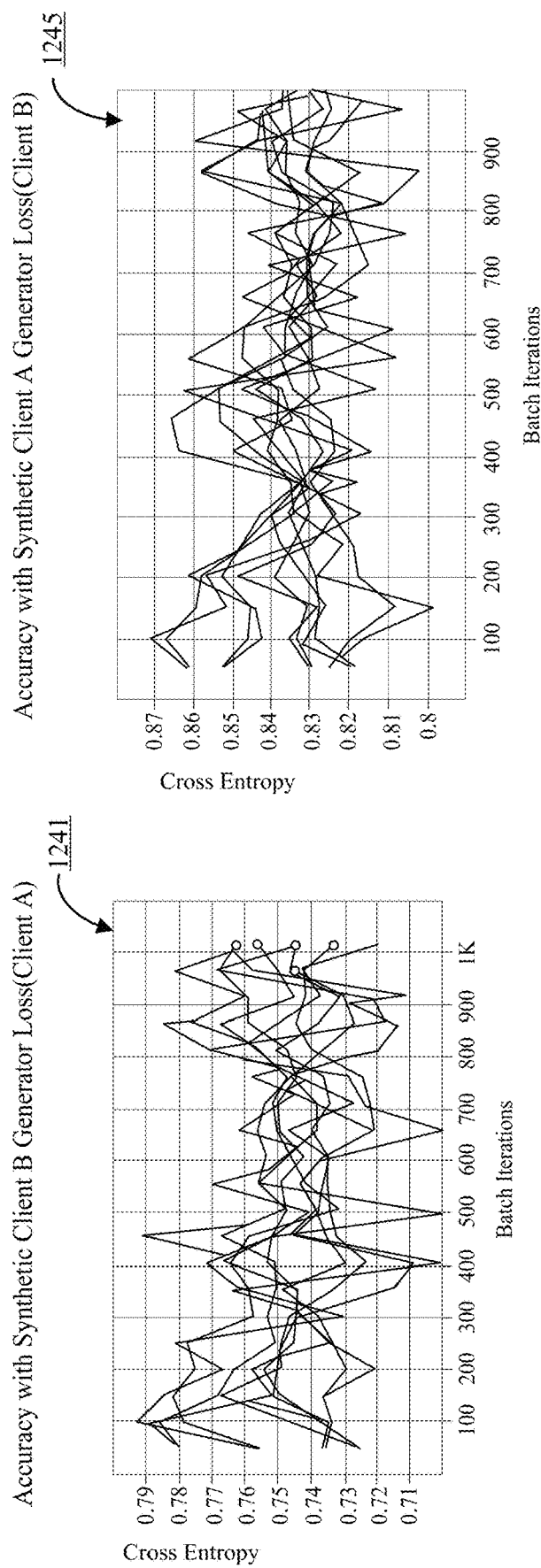

FIGS. 12D and 12E present graphs 1231, 1235, 1241 and 1245 which illustrate the classification on both clients using the other client's synthetic sample generator. It is worth noting that baseline represents the same architecture, but with a random normally distributed vector in place for the synthetic sample. The graphs show that there the baseline and the treatment show similar results.

Figure 12F:
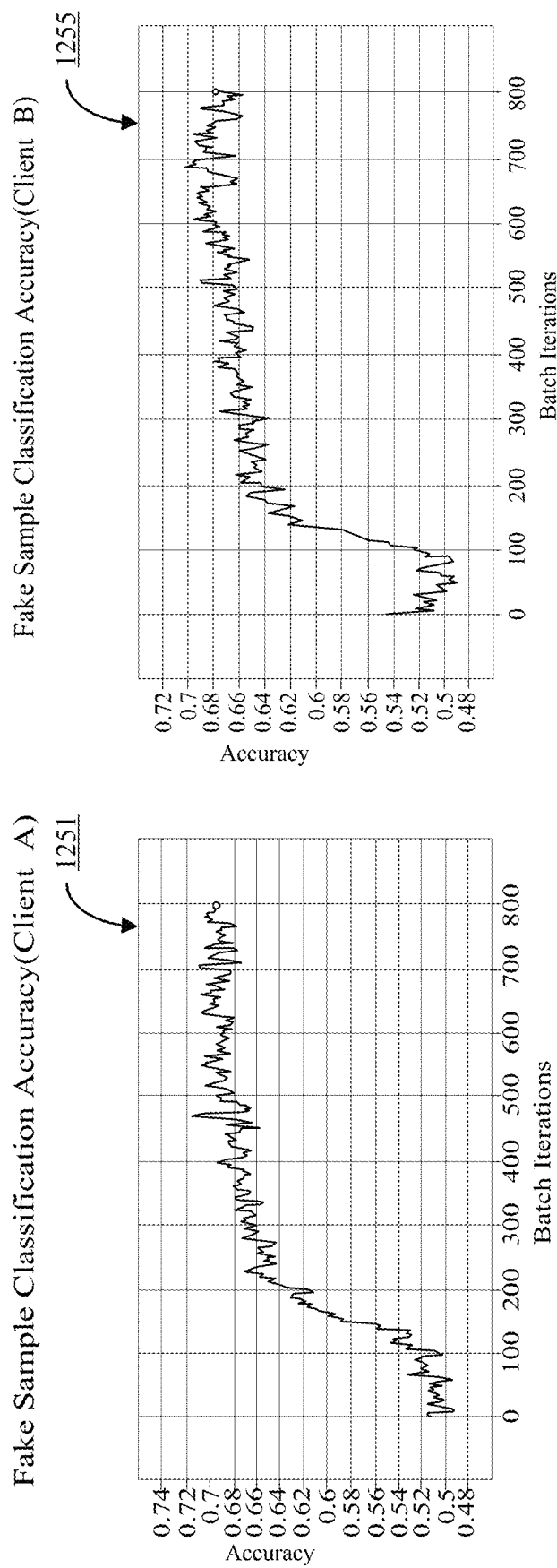
Figure 12G:
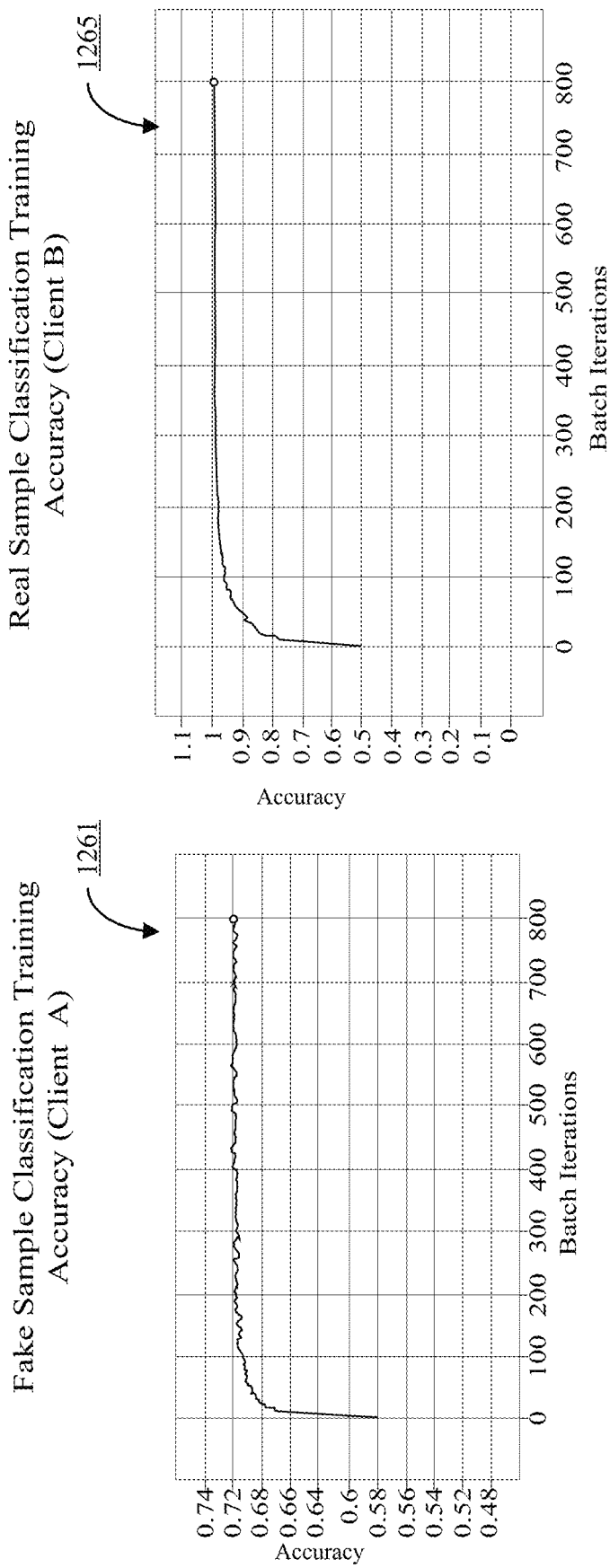

FIGS. 12F and 12G present graphs 1251, 1255, 1261, and 1265 for comparing performance of the model using synthetic (or fake) and real samples on both client A and client B. These graphs show results of measuring the CTGAN's ability to parameterize the conditional probability of the feature space. This was tested by conditioning real and generated samples on a one-hot vector prior to passing through the discriminator. This was done to implicitly condition the generated samples to contain class level information. To test whether synthetic sample's class conditional properties are modeled, we trained a classifier to classify the corresponding class. This resulted in 65-70% accuracy across both clients (1251, 1255), which is less than the real sample classification accuracies (1261, 1265).

Technique #4: Optimal Transport

FIGS. 13A to 13I present graphs for performance results for the optimal transport technique's application to federated transfer learning.

Figure 13A:
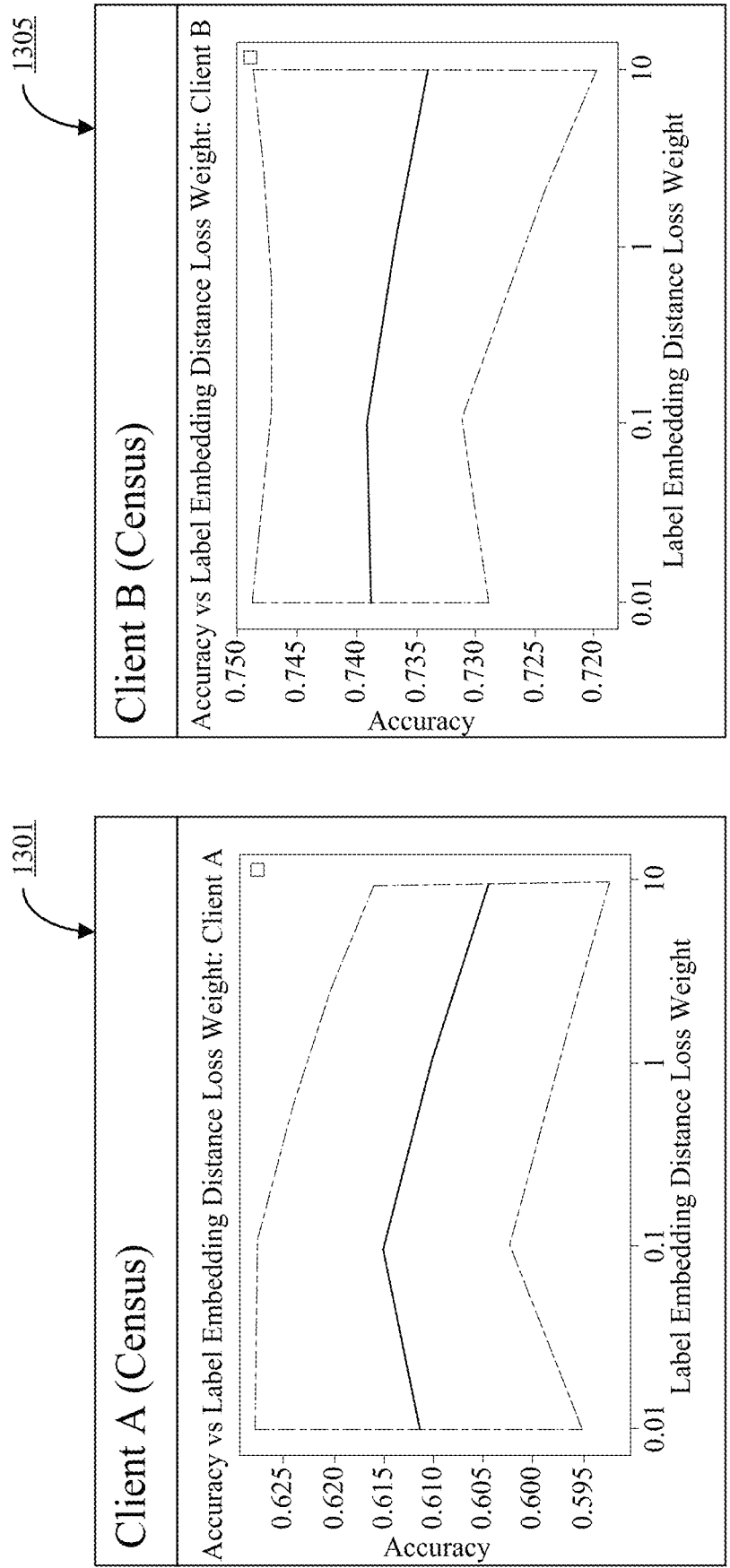
FIGS. 13A-13I present graphs for performance results when optimal transport technique is applied to federated transfer learning.
Figure 13B:
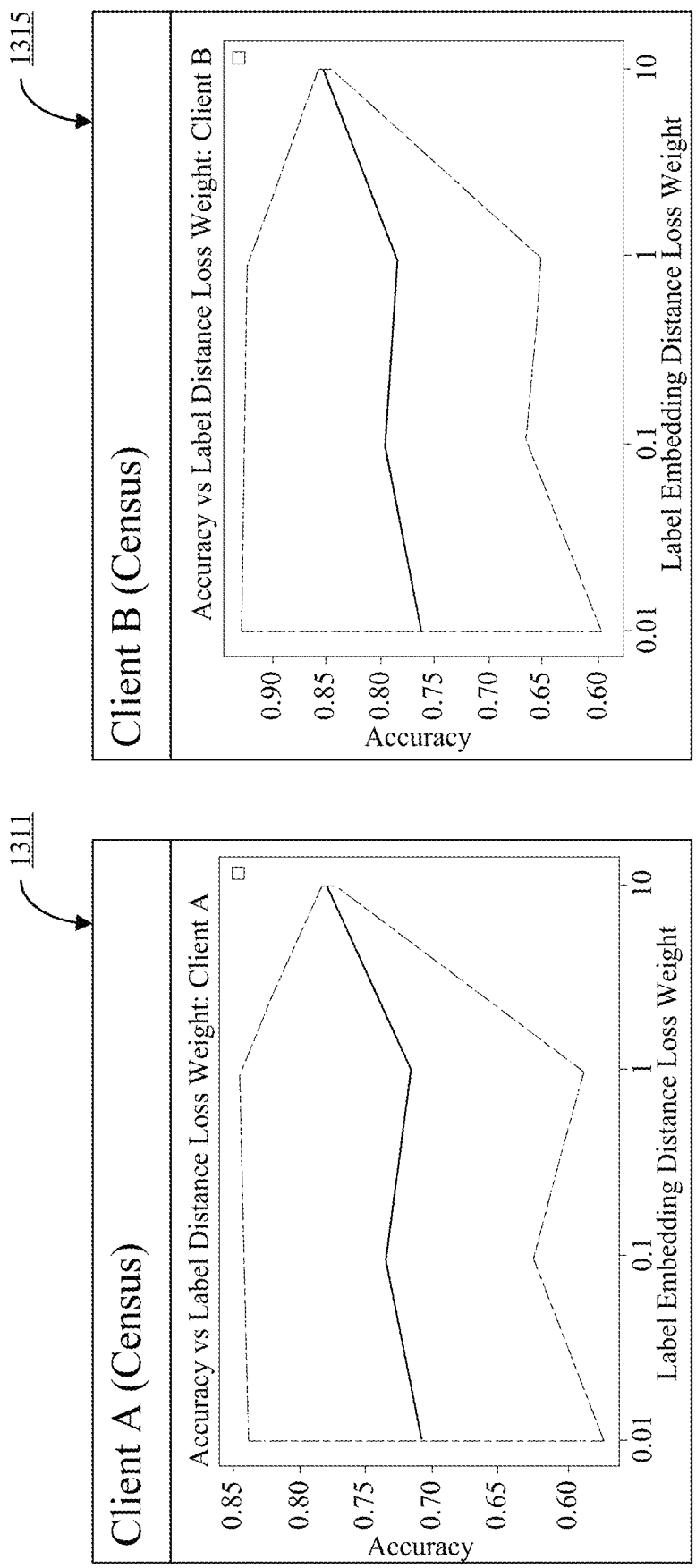
Figure 13C:
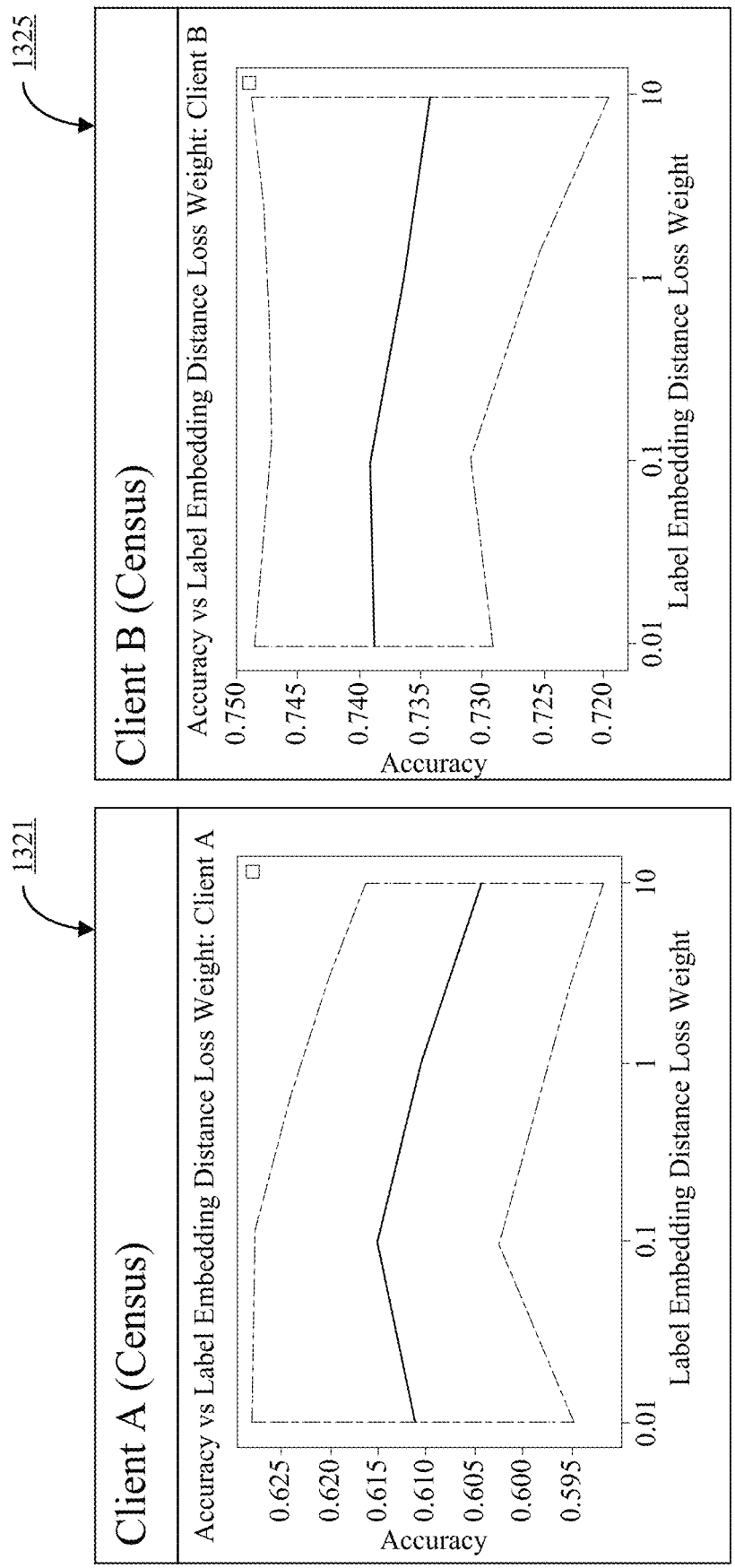
Figure 13D:
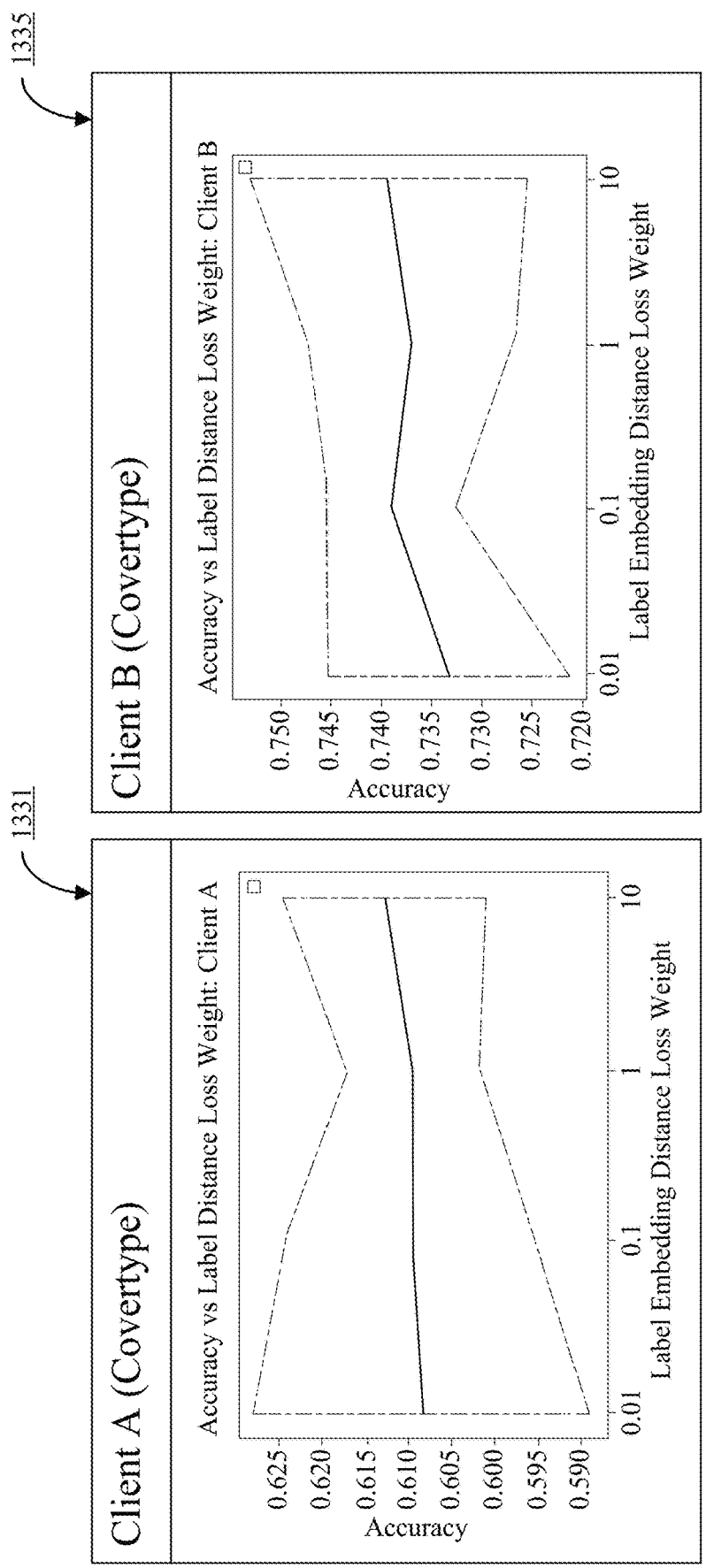
Figure 13E:
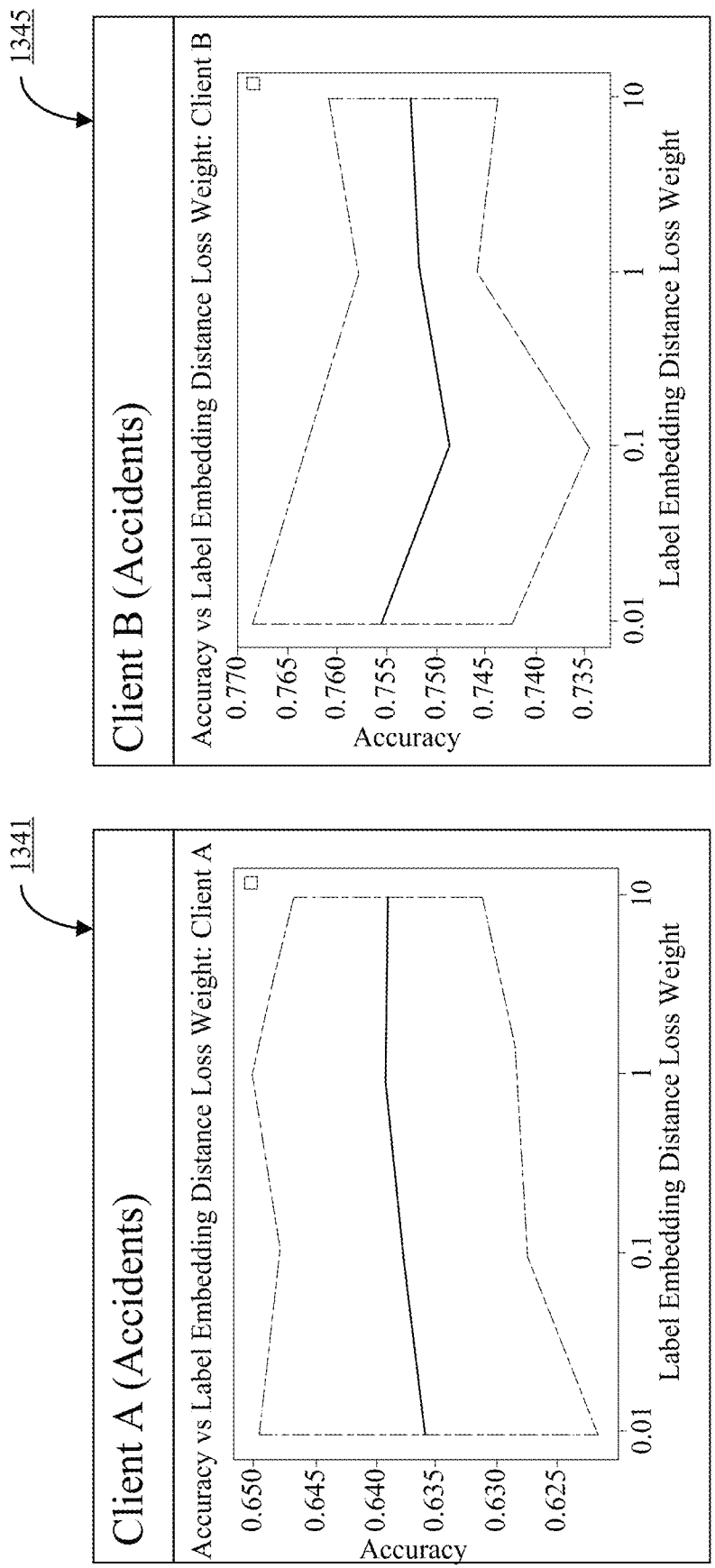

FIGS. 13A, 13C, and 13E include graphs plots 1301, 1305, 1321, 1325, 1341, and 1345 illustrating classification accuracy based on label embedding distance loss function. As explained in the model section, the embedding distance loss function is the average Euclidean distance between embeddings with different classes.

Figure 13F:
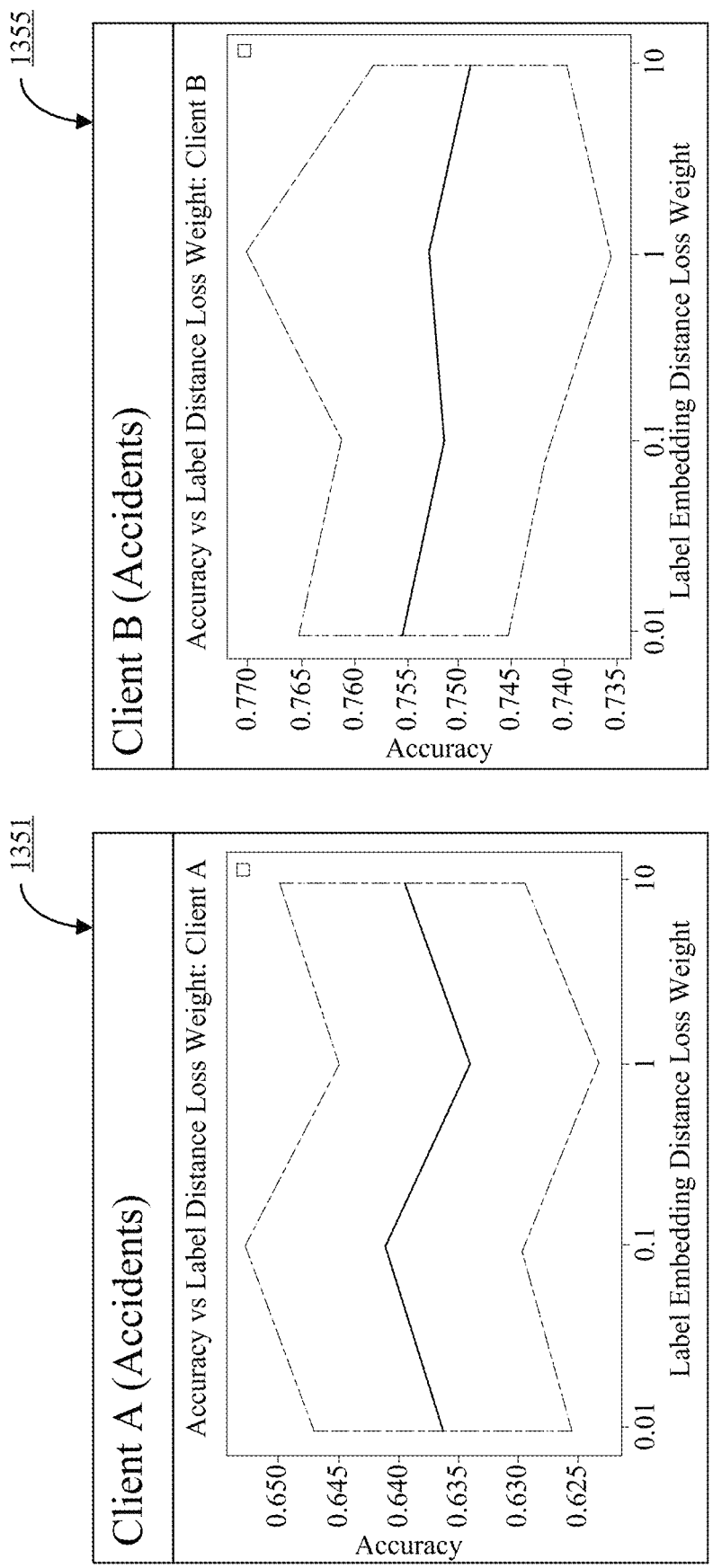

FIGS. 13B, 13D, and 13F include graphs plots 1311, 1315, 1331, 1335, 1351, and 1355 illustrating label distance loss function. The label distance loss function is the cross entropy between the source domain's predicted labels and the ground truth labels of the target domain. For implementation purposes we use a binary mask to minimize/maximize the same class and different class features/labels.

Figure 13G:
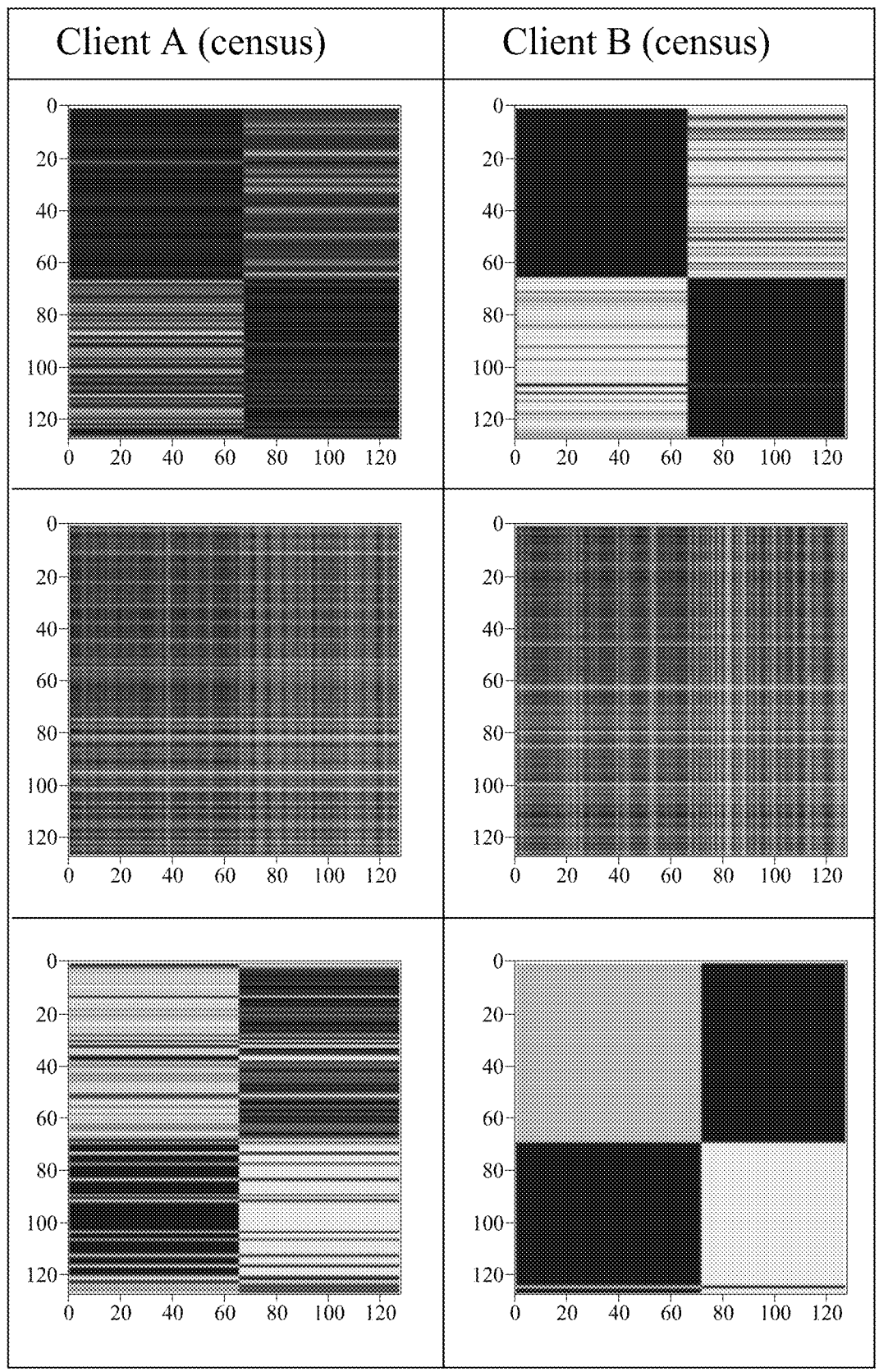
Figure 13H:
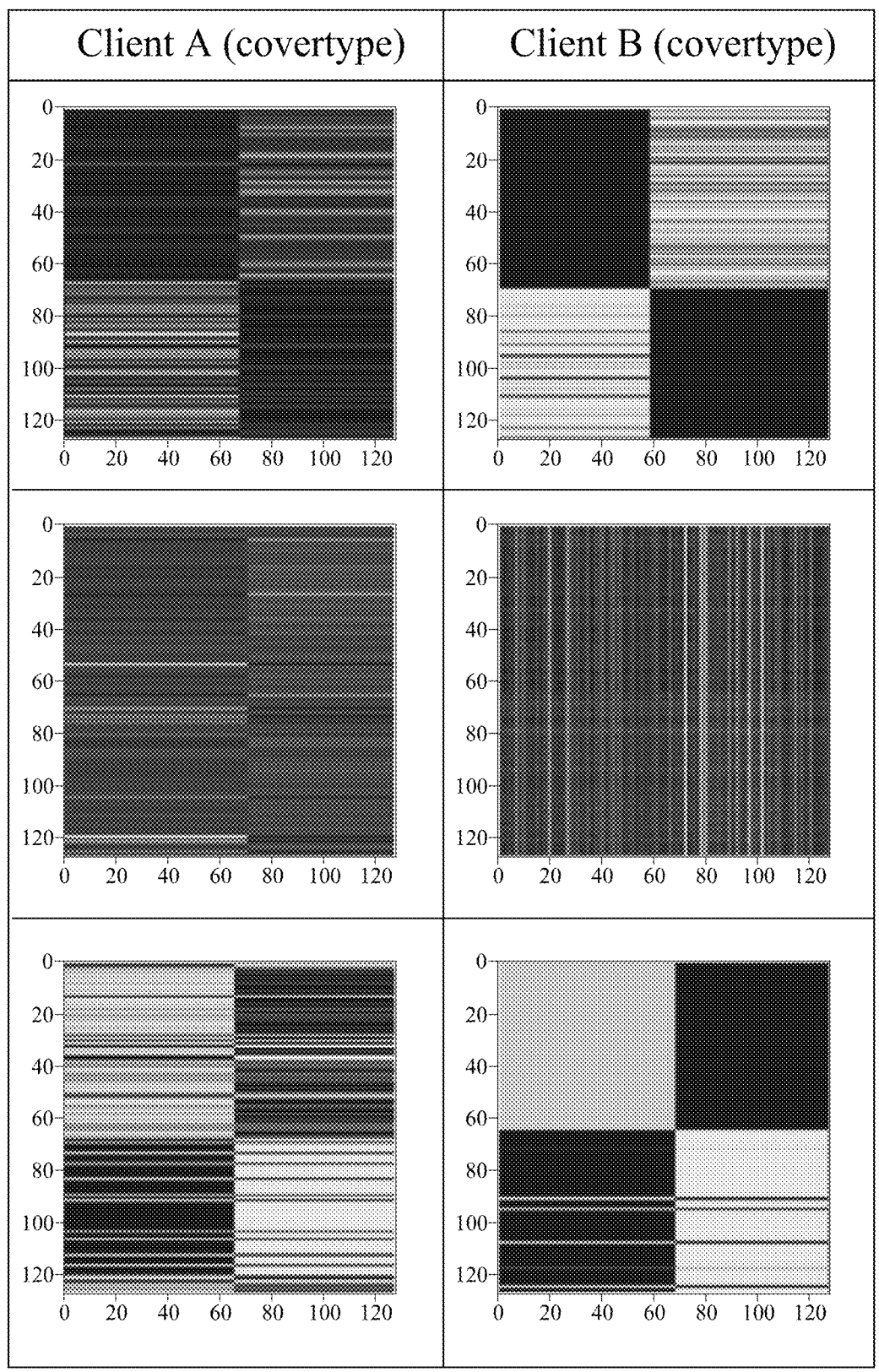
Figure 13I:
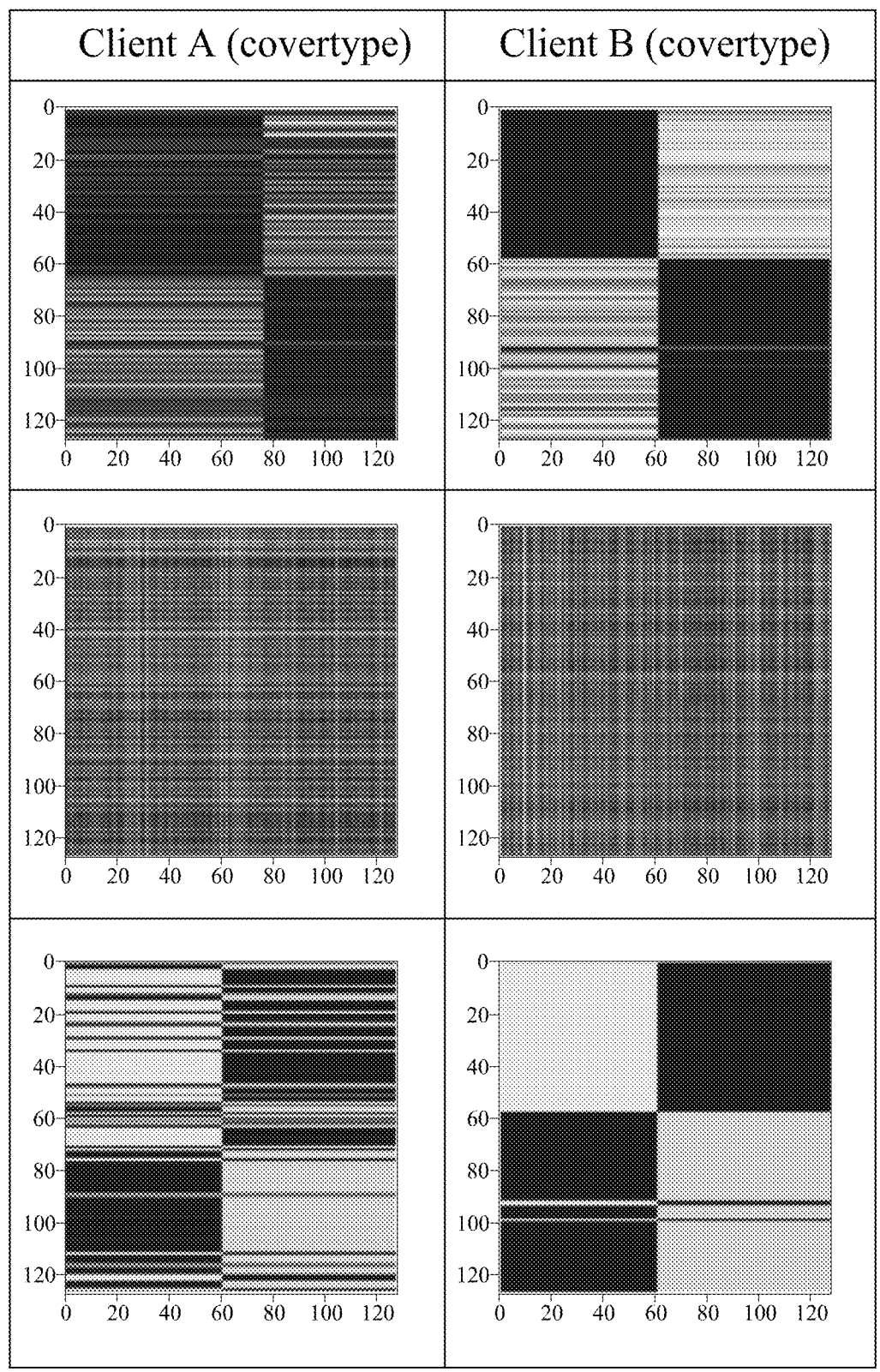

FIGS. 13G, 13H, and 13I present observations of the label distance, and label embedding distance cost functions (1st, and 2nd rows in each of the FIGS. 13G, 13H and 13I) as well as the transportation matrix (bottom row of the FIGS. 13G, 13H and 13I). The transportation matrix is generated using Sinkhorn function as described above.

Incorrect label pairs are assigned a high cost which is shows as darker color parts in graphs in FIGS. 13G, 13H and 13I. Correctly matched label pairs are assigned lower cost and represented by lighter color regions in the graphical plots. The transportation matrix is the result of Sinkhorn's algorithm on the cost matrix and appears as showing a complement pattern with respect to the cost matrix. Across all three datasets, we see artifacts where incorrect label pairings are given higher transportation values through lower cost matrix values. These inconsistencies are the reason why target embeddings are being assigned to source embeddings with different labels.

Technique #5: Prototype Network

The following tables (Table 4 and Table 5) illustrate the relative classification accuracies of the treatment (prototype network) and control neural networks for both clients across the three datasets. From the results, there appears to be an improvement in the Accidents dataset for both clients.

TABLE 4

Comparison of Prototype Network Model Performance for Client A

| Dataset | Client A Test Accuracy (Treatment) | Client A Test Accuracy (Control) |
|---|---|---|
| Census | 77.8 | 77.2 |
| Covertype | 62.2 | 62.2 |
| Accidents | 66.0 | 63.4 |

TABLE 5

Comparison of Prototype Network Model Performance for Client B

| Dataset | Client A | Client B |
|---|---|---|
| Census | 86.0 | 87.1 |
| Covertype | 76.7 | 77.0 |
| Accidents | 77.8 | 76.6 |

Data Information

In this section we present a brief overview of the three datasets used by the technology disclosed.

Data Set #1: Census

Figure 14A:
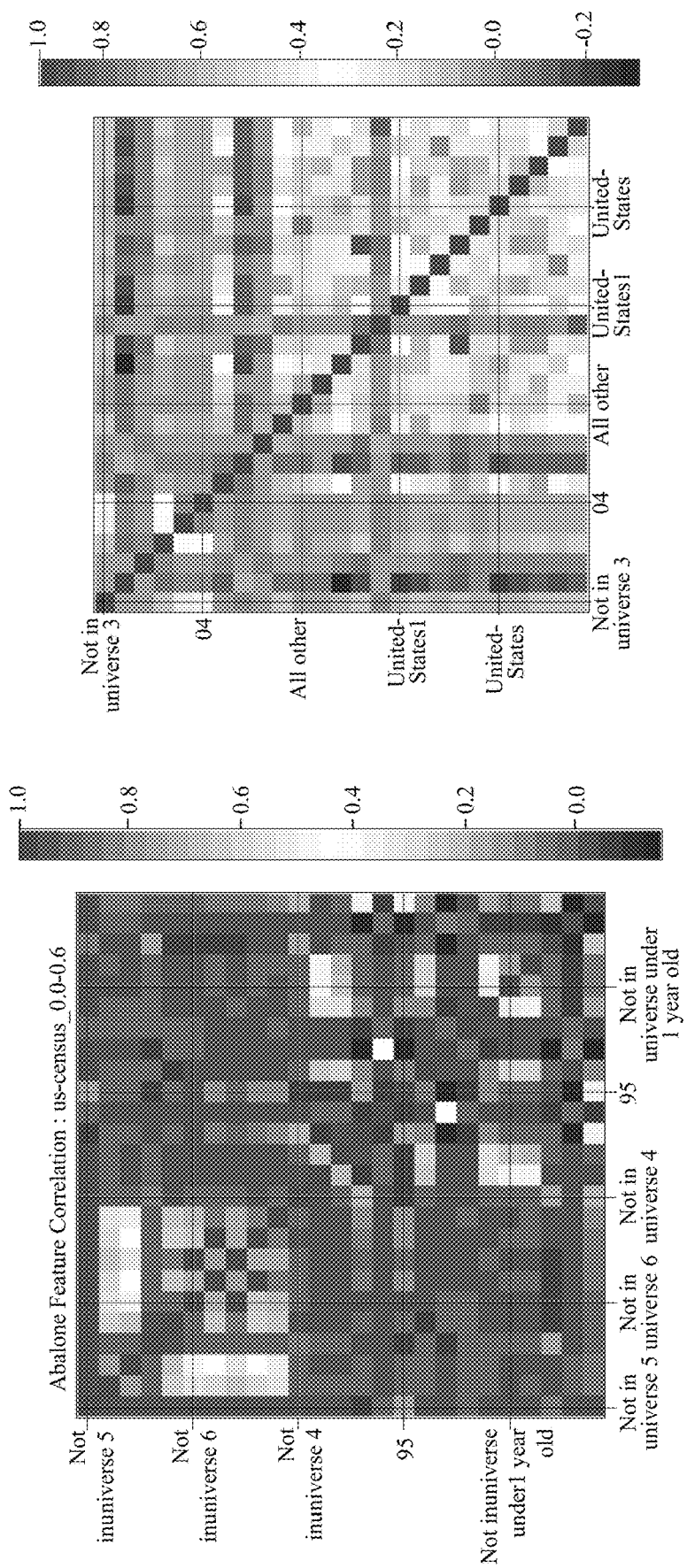
FIGS. 14A and 14B present feature correlation and feature distribution for the US Census dataset.
Figure 14B:
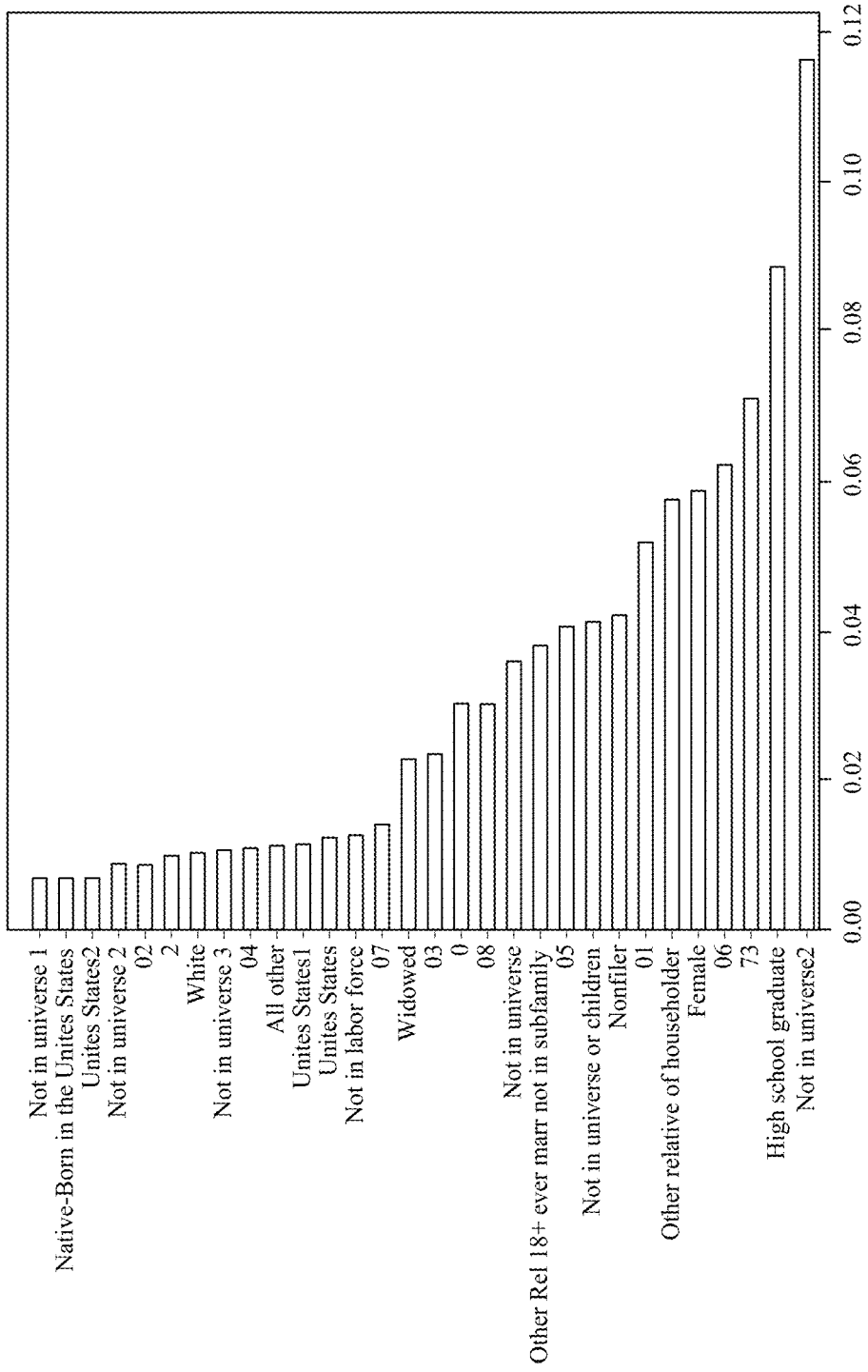

This dataset can be used to predict whether income exceeds $50K per year and is also known as the "Adult" dataset. FIG. 14A presents a feature correlation map for the Census dataset. FIG. 14B presents the distribution of data in the Census dataset. This dataset is available at <<archive-.ics.uci.edu/ml/datasets/Census+Income>>.

Data Set #2 Covertype

Figure 15A:
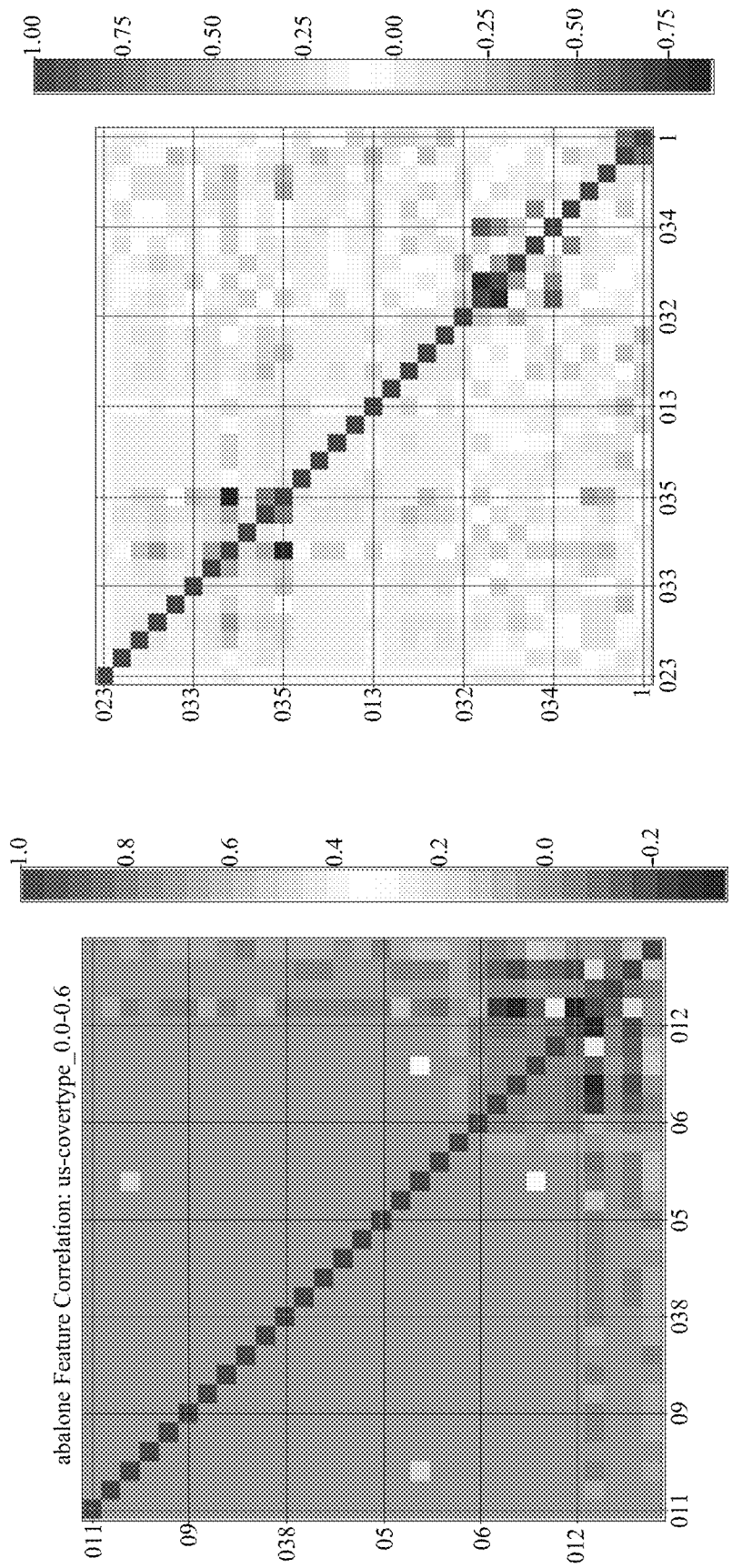
FIGS. 15A and 15B present feature correlation and feature distribution for the US Covertype dataset.
Figure 15B:
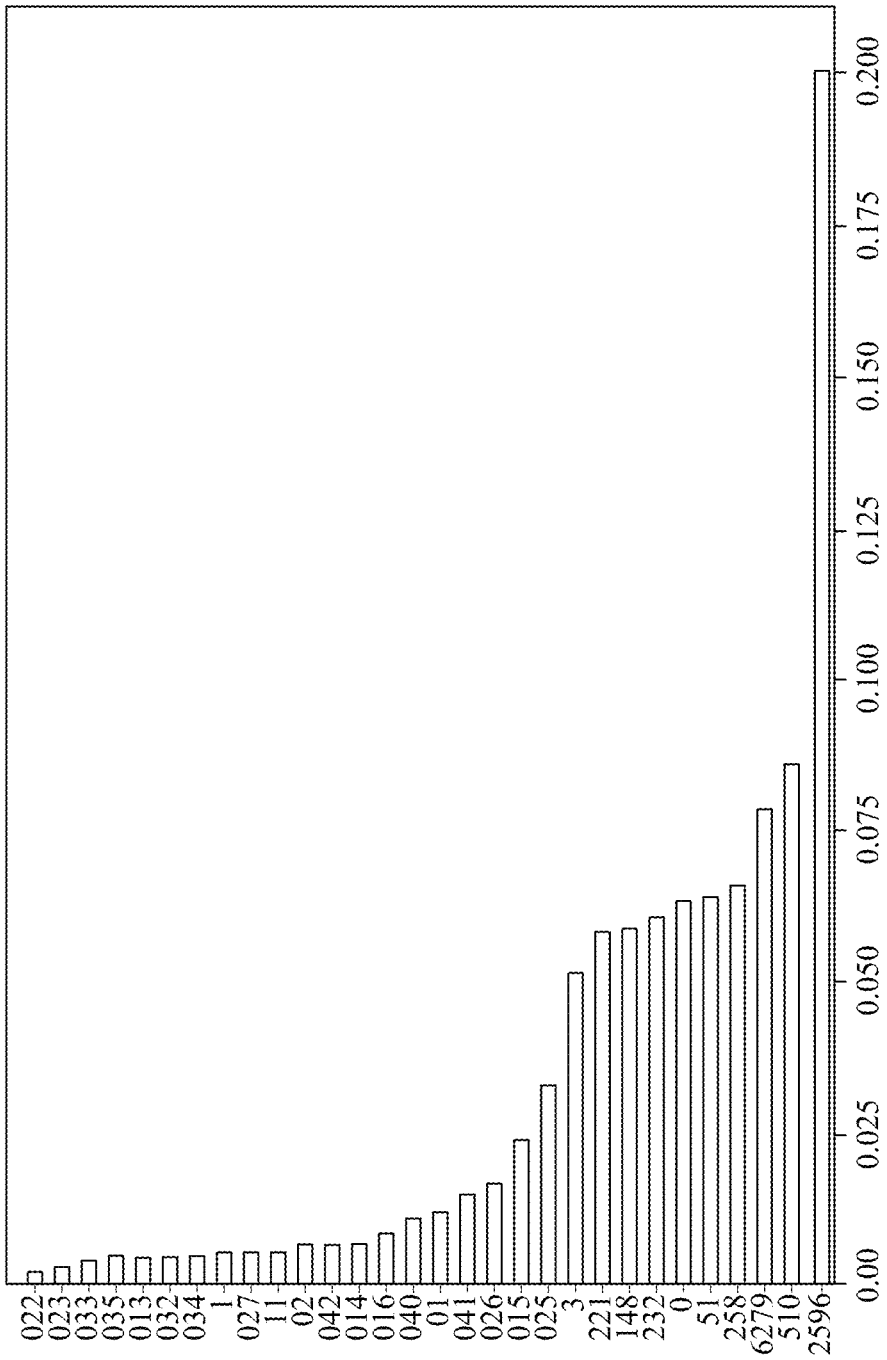

This dataset can be used to predict forest cover type from cartographic variables only and no remotely sensed data. The actual forest cover type for a given observation was determined from US Forest Services. The dataset is available at <<archive.ics.uci.edu/ml/datasets/Covertype>>. FIG. 15A presents a feature correlation map for the Census dataset. FIG. 15B presents the distribution of data in the Covertype dataset.

Data Set #3: Accidents

Figure 16A:
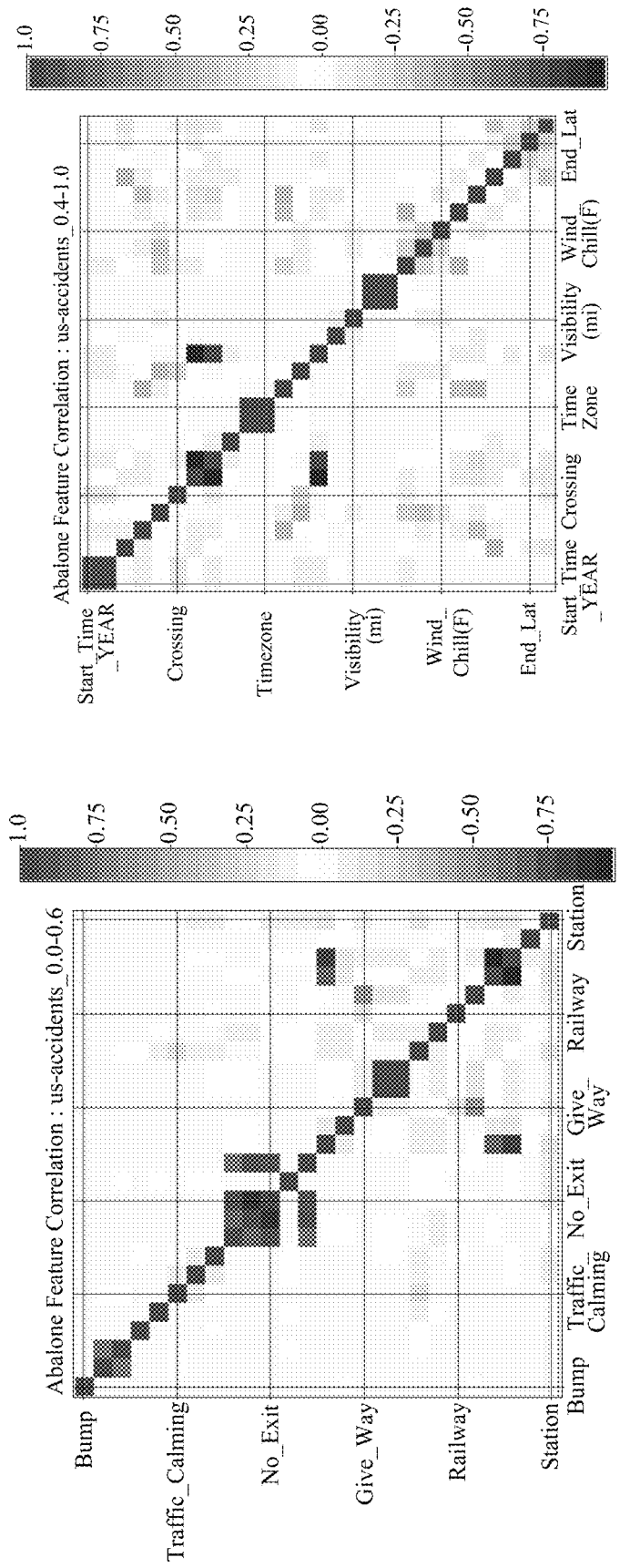
FIGS. 16A and 16B present feature correlation and feature distribution for the US Accidents dataset.
Figure 16B:
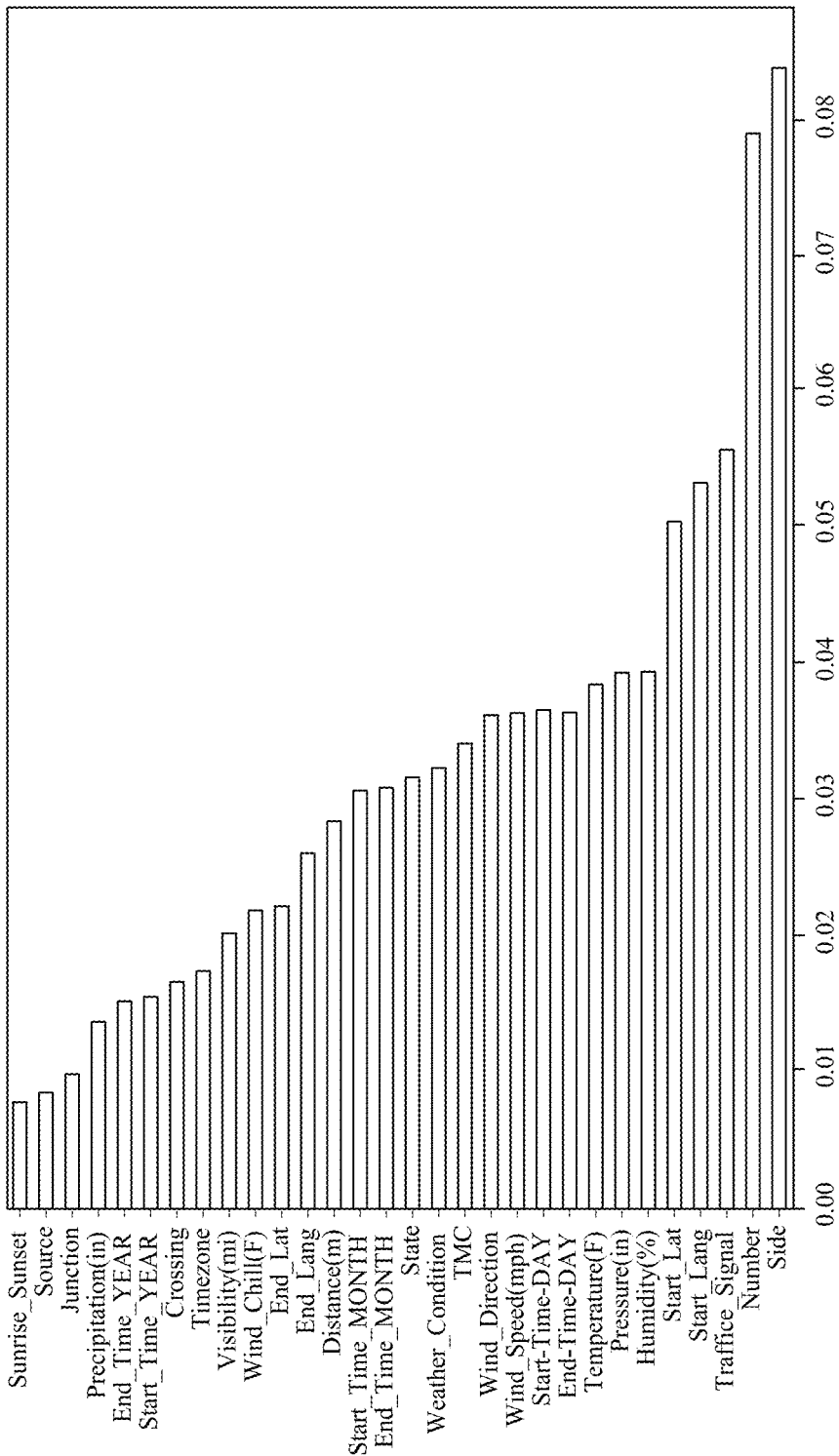

This is a car accidents dataset for the United States. The accidents data is collected from February 2016 to December 2020 using multiple APIs. The dataset is available at <<www.kaggle.com/sobhanmoosavi/us-accidents>>. FIG. 16A presents a feature correlation map for the Census dataset. FIG. 16B presents the distribution of data in the Covertype dataset.

Clauses

A technology is described for federated transfer learning. The technology disclosed can be used for training machine learning models on federated endpoints with respective datasets of training data. The datasets can be organized in tabular form. The datasets may not have any overlap in the sample space (i.e., rows) but may have overlapping feature space (i.e., columns).

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We Disclose the Following Clauses:
Clause Set 1
1. A computer-implemented method, including:
exporting learned features between federated endpoints whose learning is confined to respective training datasets, including:
  accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
  selecting at least one shared sample feature from the shared sample features, and generating a one-hot encoding of class labels of classes of the shared sample feature, wherein the classes include a target class, and wherein a target class label of the target class is hot;
  training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
  using the first trained generator for a second inference on a second performance task executed on the second federated endpoint.
2. The computer-implemented method of clause 1, wherein the first trained generator is used at the second federated endpoint for the second inference to generate first synthetic samples for second inference real samples in a second inference dataset.
3. The computer-implemented method of clause 2, wherein the second performance task is a second classification task.
4. The computer-implemented method of clause 3, wherein a second classifier executes the second classification task at the second federated endpoint for the second inference using a combination of the first synthetic samples and the second inference real samples.
5. The computer-implemented method of clause 1, further including training a second generator on the second federated endpoint to process, as input, the one-hot encoding supplemented with an encoding of class labels of classes of remaining sample features in the second training dataset, and generate, as output, a synthetic sample that has predicted feature values for class labels of classes of sample features in the second training dataset, wherein a predicted feature value for the target class label of the target class is hot.
6. The computer-implemented method of clause 5, further including using the second trained generator for a first inference on a first performance task executed on the first federated endpoint.
7. The computer-implemented method of clause 6, wherein the second trained generator is used at the first federated endpoint for the second inference to generate second synthetic samples for first inference real samples in a first inference dataset.
8. The computer-implemented method of clause 7, wherein the first performance task is a first classification task.
9. The computer-implemented method of clause 8, wherein a first classifier executes the first classification task at the first federated endpoint for the first inference using a combination of the second synthetic samples and the first inference real samples.
10. The computer-implemented method of clause 1, further including selecting the at least one shared sample feature from the shared sample features using a random selection.
11. The computer-implemented method of clause 1, further including selecting the at least one shared sample feature from the shared sample features based on the least one shared sample feature having discrete class labels.
12. A system including one or more processors coupled to memory, the memory loaded with computer instructions, the instructions, when executed on the processors, implement actions comprising:
exporting learned features between federated endpoints whose learning is confined to respective training datasets, including:
  accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
  selecting at least one shared sample feature from the shared sample features, and generating a one-hot encoding of class labels of classes of the shared sample feature, wherein the classes include a target class, and wherein a target class label of the target class is hot;
  training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
   using the first trained generator for a second inference on a second performance task executed on the second federated endpoint.
13. The system of clause 12, wherein the first trained generator is used at the second federated endpoint for the second inference to generate first synthetic samples for second inference real samples in a second inference dataset.
14. The system of clause 13, wherein the second performance task is a second classification task.
15. The system of clause 14, wherein a second classifier executes the second classification task at the second federated endpoint for the second inference using a combination of the first synthetic samples and the second inference real samples.
16. The system of clause 12, further implementing actions comprising:
   training a second generator on the second federated endpoint to process, as input, the one-hot encoding supplemented with an encoding of class labels of classes of remaining sample features in the second training dataset, and generate, as output, a synthetic sample that has predicted feature values for class labels of classes of sample features in the second training dataset, wherein a predicted feature value for the target class label of the target class is hot.
17. A non-transitory computer readable storage medium impressed with computer program instructions, the instructions, when executed on a processor, implement a method comprising:
   exporting learned features between federated endpoints whose learning is confined to respective training datasets, including:
   accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
   selecting at least one shared sample feature from the shared sample features, and generating a one-hot encoding of class labels of classes of the shared sample feature, wherein the classes include a target class, and wherein a target class label of the target class is hot;
   training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
   using the first trained generator for a second inference on a second performance task executed on the second federated endpoint.
18. The non-transitory computer readable storage medium of clause 17, wherein the first trained generator is used at the second federated endpoint for the second inference to generate first synthetic samples for second inference real samples in a second inference dataset.
19. The non-transitory computer readable storage medium of clause 18, wherein the second performance task is a second classification task.
20. The non-transitory computer readable storage medium of clause 19, wherein a second classifier executes the second classification task at the second federated endpoint for the second inference using a combination of the first synthetic samples and the second inference real samples.

Clause Set 2

1. An artificial intelligence-implemented method of federated learning using a plurality of client-side computing devices, including:
   accessing, using a first client-side computing device in the plurality of client-side computing devices, a first tabular data training set that includes a plurality of first samples arranged as rows and a plurality of first features arranged as columns;
   accessing, using a second client-side computing device in the plurality of client-side computing devices, a second tabular data training set that includes a plurality of second samples arranged as rows and a plurality of second features arranged as columns;
      wherein the first tabular data training set and the second tabular data training set include at least one shared feature with a matching first feature in the plurality of first features and a matching second feature in the plurality of second features;
   training, using the second client-side computing device, a second sample generator over a plurality of training cycles, generating synthetic first tabular data training examples wherein during training, the synthetic first tabular data training examples are conditioned on at least one or more categories of the at least one shared feature from the second tabular data training set;
   generating, during inference at the first client-side computing device, a synthetic second tabular data row using the trained second sample generator, wherein the synthetic second tabular data row includes at least one shared feature matching the at least one category of the shared feature in a selected source tabular data row;
   using, at the first client-side computing device, a first encoder to generate a spatial representation of the synthetic target tabular data row and a second encoder to generate a spatial representation of the selected source tabular data row;
   generating, at the first client-side computing device, a fused spatial representation by combining the spatial representation of the synthetic second tabular data row and the spatial representation of the selected first tabular data row; and
   classifying, at the first client-side computing device, the fused spatial representation using a trained classifier, trained over a plurality of training cycles using the target tabular data training set, to determine classification of the fused spatial representation.
2. The method of clause 1, further including receiving the trained second sample generator at the first client-side computing device.
3. The method of clause 1, further include:
   performing the training of the second sample generator over a plurality of training cycles on the second client-side computing device with no access to the first tabular data training data set; and
   receiving, for use in inference, the trained second sample generator, at the first client-side computing device with no access to the second tabular data training set.

4. The method of clause 1, wherein the fused spatial representation corresponds to a row in an unabridged tabular data including the source tabular data and the target tabular data with shared features as overlapping columns.

5. The method of clause 1, wherein the classification of the fused spatial representation corresponds to classification of a row in an unabridged tabular data.

Clause Set 3

1. An artificial intelligence-implemented method of federated learning using a plurality of client-side computing devices, including:
   inputting, row-wise, n rows of a first tabular data to a first encoder at the first client-side computing device to generate a first batch of n spatial representations with a first probability distribution;
   generating an nxn cost matrix by calculating a distance score between predicted classification of each row in the first batch of n spatial representations and ground truth labels of each row in a second batch of n spatial representations, with a second probability distribution, received from a second client-side computing device;
   iteratively, generating a transportation matrix wherein an element in a particular position in the transportation matrix is a mass of a probability that is assigned when a spatial representation from the second batch of n spatial representations is moved to a spatial representation in the second batch of n spatial representations;
   determining a scalar by calculating an inner product of cost matrix and the transportation matrix wherein the scalar when multiplied with a spatial representation in the second batch of n spatial representations maps the spatial representation from the second probability distribution to a mapped spatial representation with the second probability distribution; wherein the mapping is generated using Barycentric coordinates; and
   classifying the mapped spatial representation concatenated with the spatial representation using a classifier.

2. An artificial intelligence-implemented method of federated learning using a plurality of client-side computing devices, including:
   accessing, using a first client-side computing device in the plurality of client-side computing devices, a source tabular data training set that includes a plurality of source samples arranged as rows and a plurality of source features arranged as columns;
   accessing, using a second client-side computing device in the plurality of client-side computing devices, a target tabular data training set that includes a plurality of target samples arranged as rows and a plurality of target features arranged as columns;
   using, at the first client-side computing device, a first encoder to generate a spatial representation of the source tabular data for a batch of n source rows and at the second client-side computing device, a second encoder to generate a spatial representation of the target tabular data for a batch of n target rows;
   receiving, at the first client-side computing device, the spatial representation for the batch of n target rows including respective classification labels;
   generating an nxn cost matrix by calculating a distance score between predicted classification of each spatial representation in the batch of n source rows and ground truth labels of each spatial representation in the batch of n target rows;
   iteratively calculating inner product between the nxn cost matrix and an nxn coupling matrix to determine a value of the coupling matrix which results in a transport plan with minimum cost for moving the n target spatial representations to n source representations;
   applying the transport plan to at least one of the n target spatial representations resulting in a mapped target spatial representation and concatenating the mapped target spatial representation with at least one of the n source spatial representations resulting in a concatenated spatial representation; and
   classifying the concatenated spatial representation using a classifier and comparing the predicted class label with the ground truth label.

3. The method of clause 2, wherein the source tabular data training set and the target tabular data training include at least one shared feature with a matching source feature in the plurality of source features and a matching target feature in the plurality of target features.

4. The method of clause 2, wherein the distance score is calculated by using a cross entropy error/loss function.

5. The method of clause 2, wherein the distance score is calculated as row-by-row Euclidean distance between spatial representation in the batch of n source rows and spatial representation in the batch of n target rows with matching classification labels wherein the classification of source rows match the target rows.

6. The method of clause 2, wherein a column in the nxn cost matrix is used to determine a transport cost of moving the n target spatial representations to n source representations.

7. The method of clause 2, wherein the coupling matrix includes probability that is assigned when moving the target spatial representation to the source spatial representation.

8. The method of clause 2, wherein a transport plan indicates the work (or cost) of moving the n spatial representations in the batch of n target rows to n spatial representations in the batch of n source rows respectively.

Computer System

Figure 17:
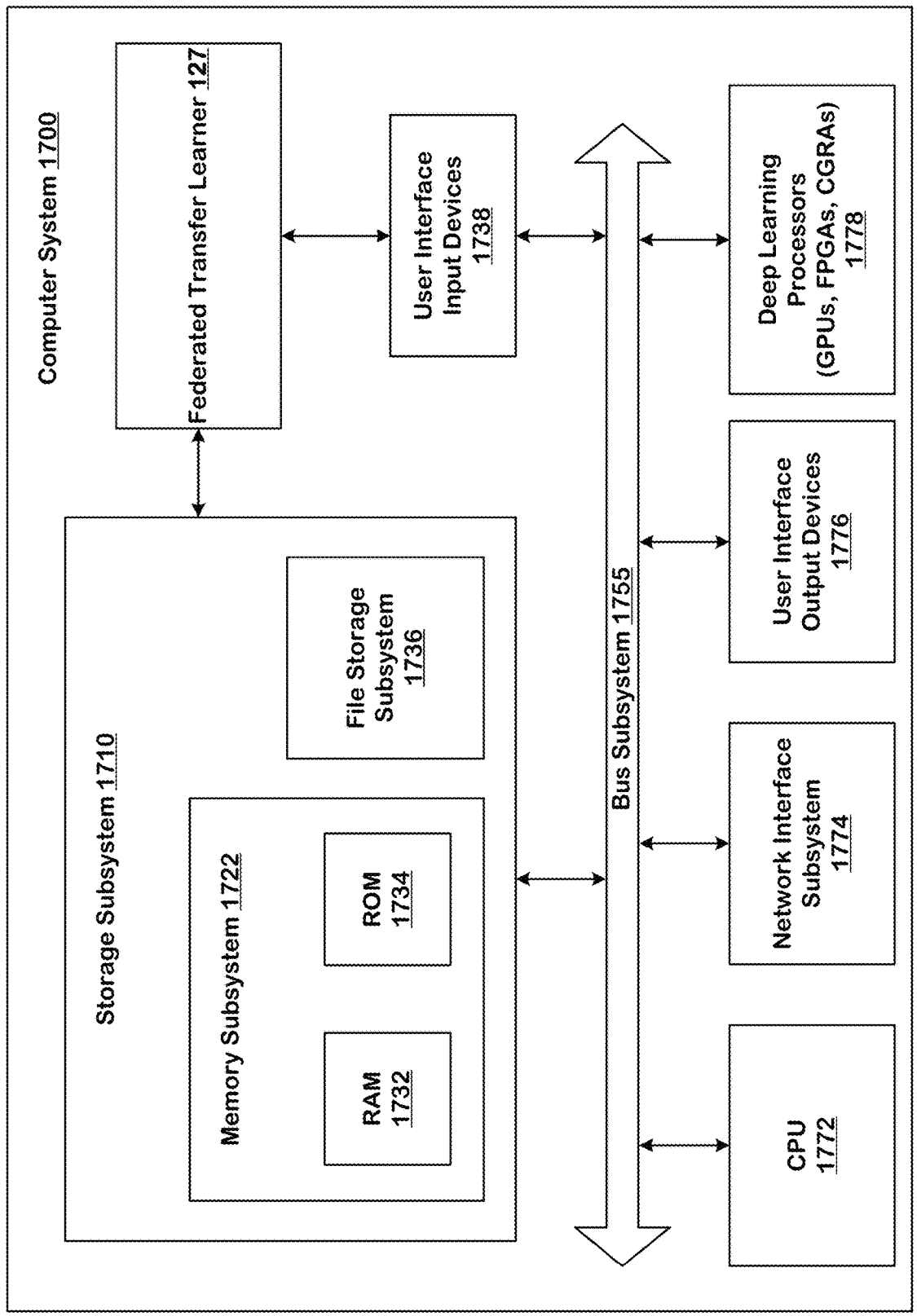
FIG. 17 is a block diagram of a computer system that can be used to implement the technology disclosed.

A computer-implemented method implementation of the technology disclosed includes Computer System 1700 as shown in FIG. 17.

FIG. 17 is a simplified block diagram of a computer system 1700 that can be used to implement the technology disclosed. Computer system 1700 includes at least one central processing unit (CPU) 1772 that communicates with a number of peripheral devices via bus subsystem 1755. These peripheral devices can include a storage subsystem 1710 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, the drug-specific adverse event mappers are communicably linked to the storage subsystem 1710 and the user interface input devices 1738.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1710 stores programming and data constructs that provide the functionality of some or all of the modules and methods described herein. Subsystem 1778 can be graphics processing units (GPUs) or field-programmable gate arrays (FPGAs).

Memory subsystem 1722 used in the storage subsystem 1710 can include a number of memories including a main random access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1756 in the storage subsystem 1710, or in other machines accessible by the processor.

Bus subsystem 1755 provides a mechanism for letting the various components and subsystems of computer system 1700 to communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred embodiments of the present invention. Many other configurations of computer system 1700 are possible having more or less components than the computer system depicted in FIG. 17.

The computer system 1700 includes GPUs or FPGAs 1778. It can also include machine learning processors hosted by machine learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligence Processing Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A computer-implemented method, including:
   exporting learned features between federated endpoints whose learning is confined to respective training datasets, including:
   accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
   selecting at least one shared sample feature from the shared sample features, and generating a one-hot encoding of class labels of classes of the shared sample feature, wherein the classes include a target class, and wherein a target class label of the target class is hot;
   training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
   using the first trained generator for a second inference on a second performance task executed on the second federated endpoint.

2. The computer-implemented method of claim 1, wherein the first trained generator is used at the second federated endpoint for the second inference to generate first synthetic samples for second inference real samples in a second inference dataset.

3. The computer-implemented method of claim 2, wherein the second performance task is a second classification task.

4. The computer-implemented method of claim 3, wherein a second classifier executes the second classification task at the second federated endpoint for the second inference using a combination of the first synthetic samples and the second inference real samples.

5. The computer-implemented method of claim 1, further including training a second generator on the second federated endpoint to process, as input, the one-hot encoding supplemented with an encoding of class labels of classes of remaining sample features in the second training dataset, and generate, as output, a synthetic sample that has predicted feature values for class labels of classes of sample features in the second training dataset, wherein a predicted feature value for the target class label of the target class is hot.

6. The computer-implemented method of claim 5, further including using the second trained generator for a first inference on a first performance task executed on the first federated endpoint.

7. The computer-implemented method of claim 6, wherein the second trained generator is used at the first federated endpoint for the second inference to generate second synthetic samples for first inference real samples in a first inference dataset.

8. The computer-implemented method of claim 7, wherein the first performance task is a first classification task.

9. The computer-implemented method of claim 8, wherein a first classifier executes the first classification task at the first federated endpoint for the first inference using a combination of the second synthetic samples and the first inference real samples.

10. The computer-implemented method of claim 1, further including selecting the at least one shared sample feature from the shared sample features using a random selection.

11. The computer-implemented method of claim 1, further including selecting the at least one shared sample feature from the shared sample features based on the least one shared sample feature having discrete class labels.

12. A system including one or more processors coupled to memory, the memory loaded with computer instructions, the instructions, when executed on the processors, implement actions comprising:
   exporting learned features between federated endpoints whose learning is confined to respective training datasets, including:
   accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
   selecting at least one shared sample feature from the shared sample features, and generating a one-hot encoding of class labels of classes of the shared sample feature, wherein the classes include a target class, and wherein a target class label of the target class is hot;
   training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
   using the first trained generator for a second inference on a second performance task executed on the second federated endpoint.

13. The system of claim 12, wherein the first trained generator is used at the second federated endpoint for the second inference to generate first synthetic samples for second inference real samples in a second inference dataset.

14. The system of claim 13, wherein the second performance task is a second classification task.

15. The system of claim 14, wherein a second classifier executes the second classification task at the second federated endpoint for the second inference using a combination of the first synthetic samples and the second inference real samples.

16. The system of claim 12, further implementing actions comprising:
   training a second generator on the second federated endpoint to process, as input, the one-hot encoding supplemented with an encoding of class labels of classes of remaining sample features in the second training dataset, and generate, as output, a synthetic sample that has predicted feature values for class labels of classes of sample features in the second training dataset, wherein a predicted feature value for the target class label of the target class is hot.

17. A non-transitory computer readable storage medium impressed with computer program instructions, the instructions, when executed on a processor, implement a method comprising:
   exporting learned features between federated endpoints whose learning is confined to respective training datasets, including:
   accessing a first training dataset selected to train a first federated endpoint, and a second training dataset selected to train a second federated endpoint, wherein the first and second training datasets have first and second sample sets that share one or more shared sample features, and wherein the shared sample features are common between the first and second sample sets;
   selecting at least one shared sample feature from the shared sample features, and generating a one-hot encoding of class labels of classes of the shared sample feature, wherein the classes include a target class, and wherein a target class label of the target class is hot;
   training a first generator on the first federated endpoint to process, as input, the one-hot encoding supplemented with an encoding of class labels of classes of remaining sample features in the first training dataset, and generate, as output, a synthetic sample that has predicted feature values for class labels of classes of sample features in the first training dataset, wherein a predicted feature value for the target class label of the target class is hot; and
   using the first trained generator for a second inference on a second performance task executed on the second federated endpoint.

18. The non-transitory computer readable storage medium of claim 17, wherein the first trained generator is used at the second federated endpoint for the second inference to generate first synthetic samples for second inference real samples in a second inference dataset.

19. The non-transitory computer readable storage medium of claim 18, wherein the second performance task is a second classification task.

20. The non-transitory computer readable storage medium of claim 19, wherein a second classifier executes the second classification task at the second federated endpoint for the second inference using a combination of the first synthetic samples and the second inference real samples.

* * * * *